United States Patent
Tanaka et al.

(10) Patent No.: US 6,847,508 B2
(45) Date of Patent: Jan. 25, 2005

(54) SPIN VALVE THIN FILM MAGNETIC ELEMENT AND THIN FILM MAGNETIC HEAD

(75) Inventors: Kenichi Tanaka, Niigata-ken (JP); Masamichi Saito, Niigata-ken (JP); Yosuke Ide, Niigata-ken (JP); Naoya Hasegawa, Niigata-ken (JP); Yoshihiko Kakihara, Niigata-ken (JP); Kenji Honda, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 201 days.

(21) Appl. No.: 09/727,180

(22) Filed: Nov. 30, 2000

(65) Prior Publication Data

US 2001/0040781 A1 Nov. 15, 2001

(30) Foreign Application Priority Data

Dec. 3, 1999 (JP) .......................................... 11-345433

(51) Int. Cl.$^7$ ......................... G11B 5/127; G11B 5/339
(52) U.S. Cl. .................................................. 360/324.12
(58) Field of Search ....................... 360/324.12, 327.24, 360/327.33, 322, 324.1, 324, 313, 110

(56) References Cited

U.S. PATENT DOCUMENTS

| | | | |
|---|---|---|---|
| 5,408,377 A | 4/1995 | Gurney et al. ............... | 360/325 |
| 5,422,571 A * | 6/1995 | Gurney et al. ............... | 324/252 |
| 5,751,521 A | 5/1998 | Gill .............................. | 360/314 |
| 6,040,962 A * | 3/2000 | Kanazawa et al. ........... | 360/322 |
| 6,201,673 B1 * | 3/2001 | Rottmayer et al. ..... | 360/324.12 |
| 6,338,899 B1 * | 1/2002 | Fukuzawa et al. ........... | 324/252 |
| 6,392,849 B2 | 5/2002 | Maruyama et al. .......... | 360/314 |
| 2001/0004798 A1 * | 6/2001 | Gill ........................... | 29/603.14 |
| 2002/0004147 A1 * | 1/2002 | Ueno et al. .................. | 428/692 |
| 2002/0012207 A1 * | 1/2002 | Singleton et al. ........ | 360/324.1 |

FOREIGN PATENT DOCUMENTS

| | | |
|---|---|---|
| JP | 6-236527 | 8/1994 |
| JP | 10-105928 | 4/1998 |
| JP | 10-334422 | 12/1998 |
| JP | 3040750 | 3/2000 |

OTHER PUBLICATIONS

1996 Digests of INTERMAG '96; 1996 IEEE International Magnetics Conference; Apr. 9–12, 1996, Seattle, WA USA; Session AA–04; "Spin Valves with Synthetic Ferrimagnets;" V.S. Speriosu et al.

Japanese Office Action mailed May 21, 2004, Appl. # 11-345433.

* cited by examiner

Primary Examiner—William Klimowicz
Assistant Examiner—Julie Anne Watko
(74) Attorney, Agent, or Firm—Brinks Hofer Gilson & Lione

(57) ABSTRACT

The present invention provides a spin valve thin film magnetic element including a laminate in which an antiferromagnetic layer, a pinned magnetic layer provided in contact with the antiferromagnetic layer so that the magnetization direction is pinned by an exchange coupling magnetic field with the antiferromagnetic layer, a nonmagnetic conductive layer provided in contact with the pinned magnetic layer, a second free magnetic layer provided in contact with the nonmagnetic conductive layer, a nonmagnetic intermediate layer provided in contact with the second free magnetic layer, a first free magnetic layer provided in contact with the nonmagnetic intermediate layer and antiferromagnetically coupled with the second free magnetic layer to form a ferrimagnetic state together with the second free magnetic layer, and a backed layer provided in contact with the first free magnetic layer and having higher conductivity than the first free magnetic layer are laminated. The present invention also provides a magnetic head using the spin valve thin film magnetic element.

20 Claims, 24 Drawing Sheets

FIG. 2
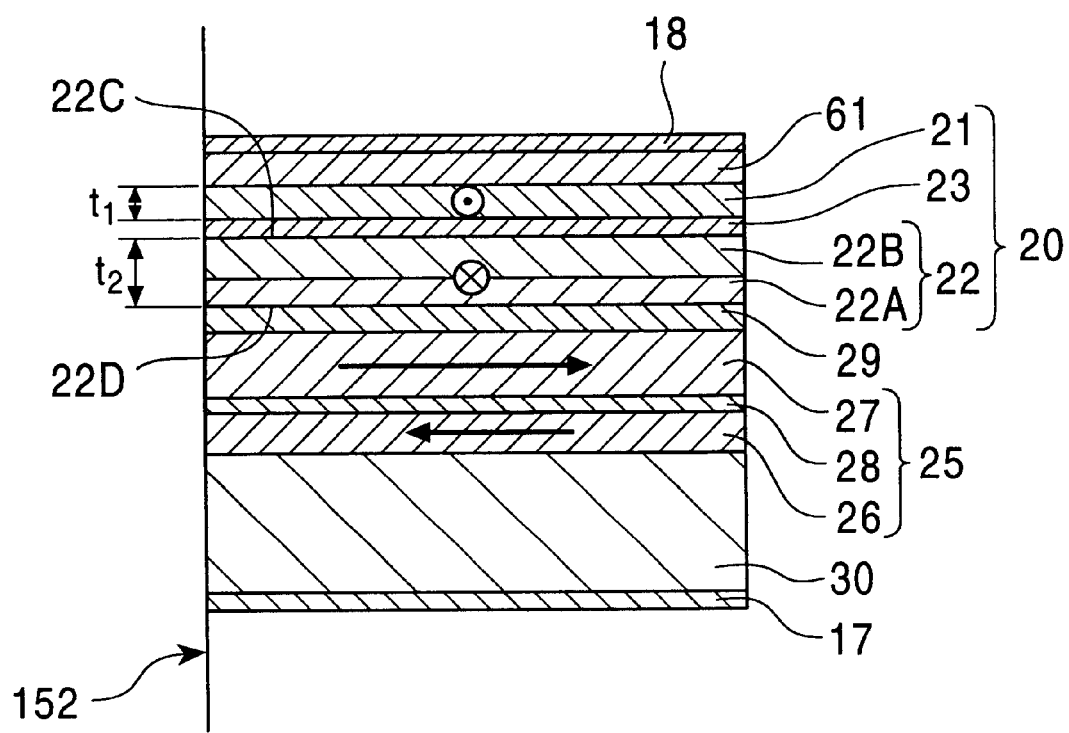
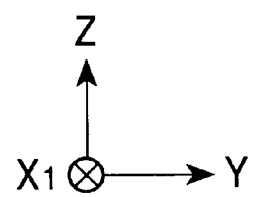

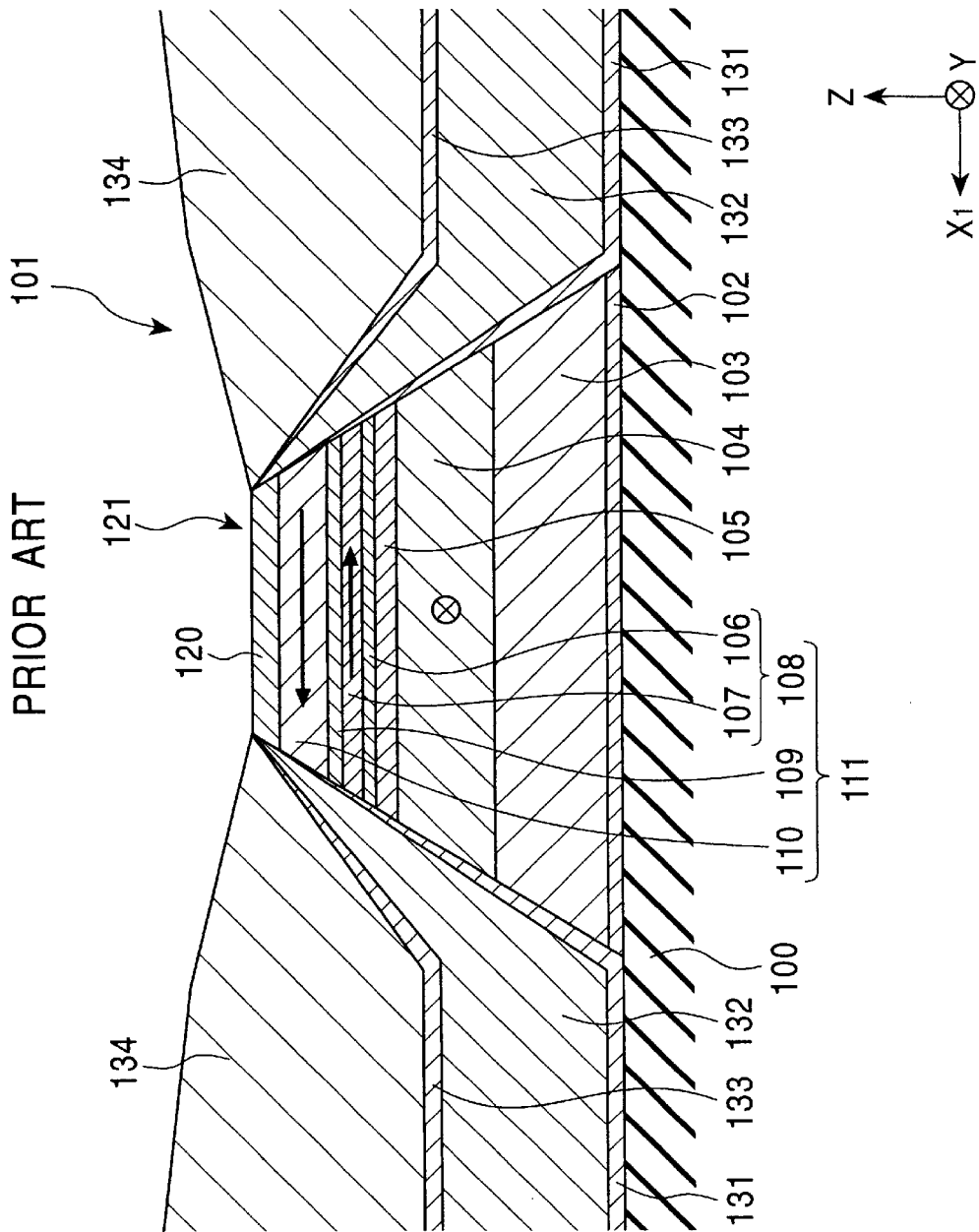

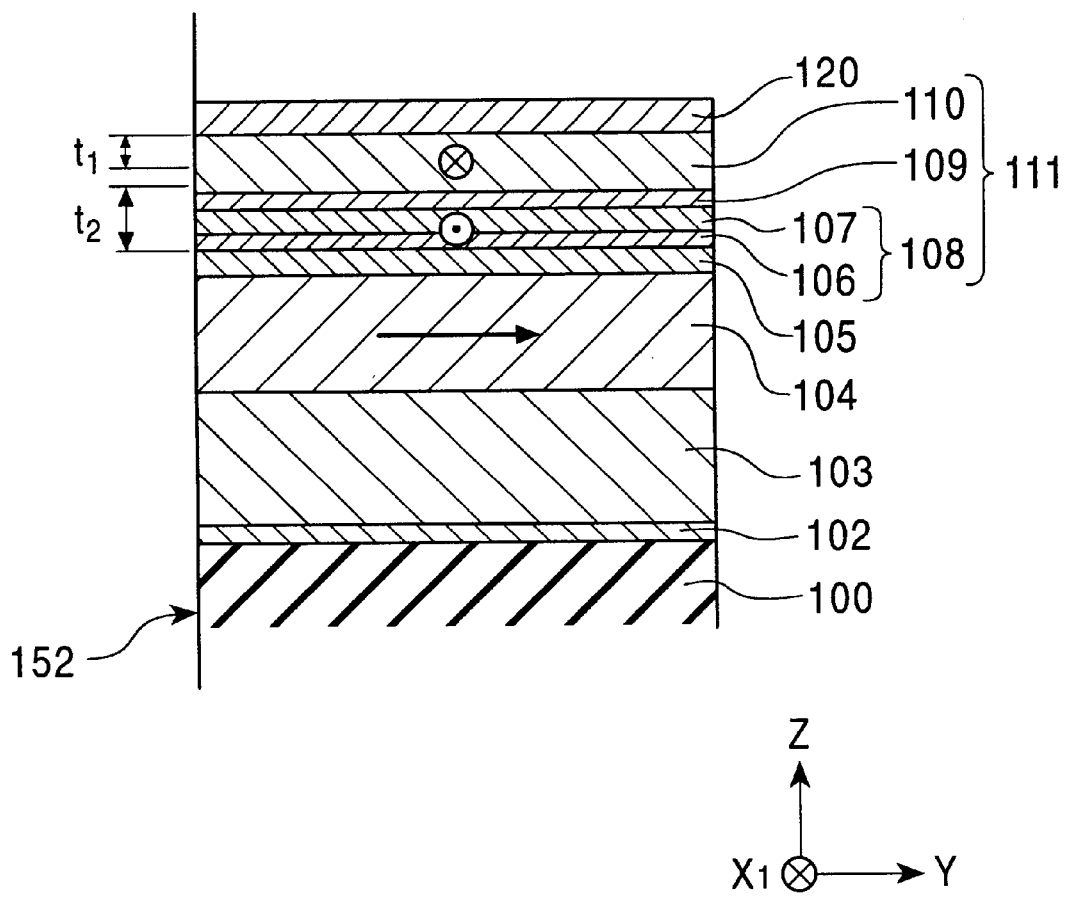

SPIN VALVE THIN FILM MAGNETIC ELEMENT AND THIN FILM MAGNETIC HEAD

BACKGROUND OF THE INVENTION

1. Field of the Invention

The present invention relates to a spin valve thin film magnetic element and a thin film magnetic head, and particularly to a spin valve thin film magnetic element and a thin film magnetic head in which the rate of change in magnetoresistance can be increased.

2. Description of the Related Art

Magnetoresistive magnetic heads include a MR (Magnetoresistive) head comprising an element exhibiting a magnetoresistive effect, and a GMR (Giant Magnetoresistive) head comprising an element exhibiting a giant magnetoresistive effect. In the MR head, the element exhibiting a magnetoresistive effect has a single layer structure comprising a magnetic material. On the other hand, in the OMR head, the element exhibiting a magnetoresistive effect has a multilayer structure in which a plurality of materials are laminated. Although there are several types of structures creating the giant magnetoresistive effect, a spin valve thin film magnetic element has a relatively simple structure and exhibits a high rate of change in resistance with an external magnetic field.

Recently, high-density magnetic recording has been increasingly demanded, and a spin valve thin film magnetic element adaptable for higher recording density has increasingly attracted attention.

A conventional spin valve thin film magnetic element is described with reference to the drawings. FIG. 25 is a schematic sectional view showing a conventional spin valve thin film magnetic element 101 as viewed from the magnetic recording medium side, and FIG. 26 is a schematic sectional view showing the conventional spin valve thin film magnetic element 101 as viewed from the track width direction.

Furthermore, shield layers are formed above and below the spin valve thin film magnetic element 101 with gap layers provided therebetween to form a reproducing thin film magnetic head comprising the spin valve thin film magnetic element 101, the gap layers and the shield layers. A recording inductive head may be laminated on the thin film magnetic head.

The thin film magnetic head is provided at the trailing side end of a floating slider together with the inductive head to constitute a thin film magnetic head which detects a recording magnetic field of a magnetic recording medium such as a hard disk or the like.

In FIGS. 25 and 26, the Z direction coincides with the movement direction of the magnetic recording medium, the Y direction coincides with the direction of a leakage magnetic field from the magnetic recording medium, and the $X_1$ direction coincide with the track width direction of the spin valve thin film magnetic element 101.

The spin valve thin film magnetic element 101 shown in FIGS. 25 and 26 is a bottom-type single spin valve thin film magnetic element comprising an antiferromagnetic layer 103, a pinned magnetic layer 104, a nonmagnetic conductive layer 105, and a free magnetic layer 111, which are laminated in turn.

In FIGS. 25 and 26, reference numeral 100 denotes an insulating layer made of $Al_2O_3$ or the like, and reference numeral 102 denotes an underlying layer made of Ta (tantalum) or the like and laminated on the insulating layer 100. The antiferromagnetic layer 103 is laminated on the underlying layer 102, the pinned magnetic layer 104 is laminated on the antiferromagnetic layer 103, and the nonmagnetic conductive layer 105 made of Cu or the like is laminated on the pinned magnetic layer 104. Furthermore, the free magnetic layer 111 is laminated on the nonmagnetic conductive layer 105, and a capping layer 120 made of Ta or the like is laminated on the free magnetic layer 111.

In this way, the layers from the underlying layer 102 to the capping layer 120 are laminated in turn to constitute a laminate 121 having a substantially trapezoidal sectional shape having a width corresponding to the track width.

The pinned magnetic layer 104 is made of, for example, a NiFe alloy or the like, and laminated in contact with the antiferromagnetic layer 103. Therefore, an exchange coupling magnetic field (exchange anisotropic magnetic field) occurs in the interface between the pinned magnetic layer 104 and the antiferromagnetic layer 103 to pin the magnetization direction of the pinned magnetic layer 104 in the Y direction shown in the drawings.

The free magnetic layer 111 comprises a nonmagnetic intermediate layer 109, and first and second free magnetic layers 110 and 108 formed with the nonmagnetic intermediate layer 109 provided therebetween. The first free magnetic layer 110 is provided on the capping layer 120 side of the nonmagnetic intermediate layer 109, and the second free magnetic layer 108 is provided on the nonmagnetic conductive layer 105 side of the nonmagnetic intermediate layer 109.

The thickness $t_1$ of the first free magnetic layer 110 is smaller than the thickness $t_2$ of the second free magnetic layer 108.

The first free magnetic layer 110 is made of a ferromagnetic material such as a NiFe alloy or the like, and the nonmagnetic intermediate layer 109 is made of a nonmagnetic material such as Ru or the like.

The second free magnetic layer 108 comprises a anti-diffusion layer 106 and a ferromagnetic layer 107. Each of the anti-diffusion layer 106 and the ferromagnetic layer 107 comprises a ferromagnetic material, and for example, the anti-diffusion layer 106 is made of Co, and the ferromagnetic layer 107 is made of a NiFe alloy. The first free magnetic layer 110 and the ferromagnetic layer 107 are preferably made of the same material.

The anti-diffusion layer 106 is provided for preventing mutual diffusion between the ferromagnetic layer 107 and the nonmagnetic conductive layer 105.

The first free magnetic layer 110 and the second free magnetic layer 108 are antiferromagnetically coupled with each other. In other words, when the magnetization direction of the first free magnetic layer 110 is oriented in the $X_1$ direction shown in the drawings by bias layers 132, the magnetization direction of the second free magnetic layer 108 is oriented in the direction opposite to the $X_1$ direction.

Since the first and second free magnetic layers 110 and 108 have the thickness relation $t_1 < t_2$, magnetization of the first free magnetic layer 110 remains so that the magnetization direction of the entire free magnetic layer 111 is oriented in the $X_1$ direction.

In this way, the first free magnetic layer 110 and the second free magnetic layer 108 are antiferromagnetically coupled with each other so that the magnetization directions are antiparallel to each other to create a synthetic ferrimagnetic state (synthetic ferrimagnetic free).

Therefore, the magnetization direction of the free magnetic layer 111 crosses the magnetization direction of the pinned magnetic layer 104.

The bias layers 132 made of, for example, a Co—Pt (cobalt-platinum) alloy are formed on both sides of the laminate 121. The bias layers 132 orient the magnetization direction of the first free magnetic layer 110 in the $X_1$ direction to bring the free magnetic layer 111 in a single magnetic domain state, suppressing Barkhousen noise of the free magnetic layer 111.

Reference numeral 134 denotes a conductive layer made of Cu or the like.

Furthermore, bias underlying layers 131 made of, for example, a nonmagnetic metal such as Cr are provided between the bias layers 132 and the insulating layer 100, and between the bias layer 132 and the laminate 121.

Furthermore, intermediate layers 133 made of, for example, a nonmagnetic metal such as Ta or Cr are provided between the bias layers 132 and the conductive layers 134.

In the spin valve thin film magnetic element 101, when the magnetization direction of the free magnetic layer 111, which is oriented in the $X_1$ direction, is changed by a leakage magnetic field from the recording medium such as a hard disk or the like, the electric resistance changes with the relation to magnetization of the pinned magnetic layer 104 which is pinned in the Y direction, and the leakage magnetic field form the recording medium is detected by a voltage change based on the change in the electric resistance.

The free magnetic layer 111 comprises the first and second free magnetic layers 110 and 108 antiferromagnetically coupled with each other, and the magnetization direction of the entire free magnetic layer 111 changes with an external magnetic field of small magnitude, thereby increasing the sensitivity of the spin valve thin film magnetic element 101.

The above-described spin valve thin film magnetic element 101 comprises the free magnetic layer 111 comprising the first and second free magnetic layers 110 and 108 put into the ferrimagnetic state, and exhibits a high rate of change in magnetoresistance when the thickness of the second free magnetic layer is 3 to 4 nm. However, in this case, the resistance of the spin valve thin film magnetic element is increased to cause the problem of decreasing reproduced output.

It is thought that a further improvement in the magnetic recording density will be required in future, and a spin valve thin film magnetic element having a higher rate of change in magnetoresistance is demanded.

SUMMARY OF THE INVENTION

The present invention has been achieved in consideration of the above situation, and an object of the present invention is to provide a spin valve thin film magnetic element which can exhibit a higher rate of change in magnetoresistance, and a thin film magnetic head comprising the spin valve thin film magnetic element to produce high reproduced output.

In order to achieve the object, the present invention has the following construction.

A spin valve thin film magnetic element of the present invention comprises a laminate comprising an antiferromagnetic layer, a pinned magnetic layer provided in contact with the antiferromagnetic layer so that the magnetization direction is pinned by an exchange coupling magnetic field with the antiferromagnetic layer, a nonmagnetic conductive layer provided in contact with the pinned magnetic layer, a second free magnetic layer provided in contact with the nonmagnetic conductive layer, a nonmagnetic intermediate layer provided in contact with the second free magnetic layer, a first free magnetic layer provided in contact with the nonmagnetic intermediate layer and antiferromagnetically coupled with the second free magnetic layer to form a ferrimagnetic state together with the second free magnetic layer, and a backed layer provided in contact with the first free magnetic layer and having higher conductivity than the first free magnetic layer.

The antiferromagnetic layer is preferably made of any one of alloys represented by the formula X—Mn (wherein X represents one element selected from Pt, Pd, Ru, Ir, Rh, and Os), and alloys represented by the formula X'—Pt—Mn (wherein X' represents at least one element selected from Pd, Cr, Ni, Ru, Ir, Rh, Os, Au, and Ag).

The backed layer preferably comprises one element of Au, Ag, and Cu.

The thickness of the backed layer is preferably in the range of 0.3 to 2.5 nm.

The spin valve thin film magnetic element comprises the free magnetic layer comprising the first and second free magnetic layers antiferromagnetically coupled with each other, and the nonmagnetic intermediate layer.

The free magnetic layer is referred to as a so-called synthetic ferrimagnetic free layer in which the first and second free magnetic layers are antiferromagnetically coupled with each other to create the ferrimagnetic state, and thus the magnetization direction of the entire free magnetic layer changes with an external magnetic field of small magnitude. Therefore, the thickness of the entire free magnetic layer is not excessively decreased, thereby improving the rate of change in magnetoresistance while maintaining the sensitivity of the spin valve thin film magnetic element high.

Since the spin valve thin film magnetic element comprises the backed layer provided in contact with the first free magnetic layer, the rate of change in magnetoresistance can be increased.

Therefore, the spin valve thin film magnetic element of the present invention comprises the synthetic ferrimagnetic free layer and the backed layer, and can thus exhibit a significant increase in the rate of change in magnetoresistance as compared with a conventional spin valve thin film magnetic element.

Although the cause of an increase in the rate of change in magnetoresistance due to the backed layer is briefly described below, the principle of the giant magnetoresistive effect of the spin valve thin film magnetic element is first described in brief.

When a sensing current is passed through the spin valve thin film magnetic element, conduction electrons mainly move to the nonmagnetic conductive layer having low electric resistance. The conduction electrons include two types of electrons, i.e., up-spin electrons and down-spin electrons, which are stochastically equivalent in amount.

The rate of change in magnetoresistance of the spin valve thin film magnetic element shows a positive correlation to a difference between the mean free paths of the two types of conduction electrons.

The up-spin conduction electrons quite possibly move from the nonmagnetic conductive layer to the free magnetic layer to increase the mean free path when the magnetization direction of the free magnetic layer is parallel to the magnetization direction of the pinned magnetic layer with an external magnetic field applied.

On the other hand, the down-spin conduction electrons are always scattered at the interface between the nonmagnetic conductive layer and the free magnetic layer and maintained in a state in which the probability of movement to the free magnetic layer is low, and the mean free path is shorter than that of the up-spin conduction electrons.

In this way, the mean free path of the up-spin conduction electrons is increased by the action of the external magnetic field, as compared with the mean free path of the down-spin conduction electrons, thereby increasing the difference between the mean free paths to increase the rate of change in magnetoresistance of the spin valve thin film magnetic element.

By laminating the backed layer on the first free magnetic layer which constitutes the free magnetic layer, the up-spin conduction electrons moving in the free magnetic layer can be moved to the backed layer, further extending the mean free path of the up-spin conduction electrons. Namely, a so-called spin filter effect can be exhibited, and the difference between the mean free paths of the conduction electrons can be increased, thereby improving the rate of change in magnetoresistance of the spin valve thin film magnetic element.

In the spin valve thin film magnetic element of the present invention, the thickness of the second free magnetic layer provided in contact with the nonmagnetic conductive layer side is larger than that of the first free magnetic layer.

Assuming that the saturation magnetization and thickness of the second free magnetic layer are $M_2$ and $t_2$, and the saturation magnetization and thickness of the first free magnetic layer are $M_1$ and $t_1$, respectively, $M_2 \cdot t_2 > M_1 \cdot t_1$ may be satisfied.

In this spin valve thin film magnetic element, the thickness or $M_2 \cdot t_2$ of the second free magnetic layer of the two magnetic layers constituting the free magnetic layer, which are provided on the nonmagnetic conductive layer side, is larger than the thickness or $M_1 \cdot t_1$ of the first free magnetic layer, the magnetic thickness of the second free magnetic layer is larger than that of the first free magnetic layer to increase the spin flop magnetic field of the free magnetic layer, maintaining the ferrimagnetic state of the free magnetic layer while stably maintaining the antiferromagnetic coupling between the first and second free magnetic layers. Therefore, the sensitivity of the spin valve thin film magnetic element can be increased.

Furthermore, in the spin valve thin film magnetic element of the present invention, a protecting layer made of a transition metal, which does not dissolve in the backed layer, is arranged on the side of the backed layer opposite to the side in contact with the first free magnetic layer.

As the transition metal of the protecting layer, for example, Hf, Mo, V, Cr, Nb, Ta, and W can be used.

In the spin valve thin film magnetic element, the protecting layer made of a transition metal, which does not dissolve in the backed layer, is arranged to prevent diffusion solid solution between the backed layer and the protecting layer, preventing disturbance of the plane of the first free magnetic layer, which is opposite to the first free magnetic layer. Therefore, the substantial thickness of the backed layer is not decreased so that the mean free path of the up-spin conduction electrons is not shortened, thereby improving the spin filter effect to increase the rate of change in magnetoresistance.

Furthermore, in the spin valve thin film magnetic element of the present invention, a mirror reflecting layer made of an insulating material is arranged on the side of the backed layer, which is opposite to the side in contact with the first free magnetic layer.

Examples of the insulating material constituting the mirror reflecting layer include oxides such as $\alpha$-$Fe_2O_3$, NiO, CoO, Co—Fe—O, Co—Fe—Ni—O, $Al_2O_3$, Al—X—O (X=B, Si, N, Ti, V, Cr, Mn, Fe, Co, Ni), T-O (T=Ti, V, Cr, Zr, Nb, Mo, Hf, W), and the like, nitrides such as Al—N, Al-D-N, (D=B, Si, O, Ti, V, Cr, Fe, Co, Ni), L-N (L=Ti, V, Cr, Zr, Mo, Hf, Ta, W), and the like.

In the spin valve thin film magnetic element, the mirror reflecting layer made of an insulating material is arranged on the side of the backed layer, which is opposite to the side in contact with the first free magnetic layer, to form a potential barrier at the interface with the backed layer, thereby reflecting the up-spin conduction electrons moving in the backed layer while maintaining the spin direction. Namely, the up-spin conduction electrons can be mirror-reflected to extend the mean free path of the up-spin conduction electrons, thereby increasing the difference from the mean free path of the down-spin conduction electrons. Therefore, the rate of change in magnetoresistance of the spin valve thin film magnetic element can be improved.

In the spin valve thin film magnetic element of the present invention, a pair of bias layers for orienting the magnetization direction of the second free magnetic layer are provided adjacent to the second free magnetic layer on both sides of the laminate so that surfaces, which define the bias layers on one of the sides in the thickness direction, are butted against the sides of the laminate at any hierarchy position between the two surfaces which define the second free magnetic layer in the thickness direction, the surfaces which define the bias layers on the other side in the thickness direction being butted against the sides of the laminate at a hierarchy position on the nonmagnetic conductive layer side of the second free magnetic layer.

In the spin valve thin film magnetic element, the bias layers are provided at a hierarchy position on the nonmagnetic conductive layer side of the second free magnetic layer so that the bias layers are adjacent to the second free magnetic layer, but not the first free magnetic layer. Therefore, the magnetization of the first free magnetic layer which is manifested by antiferromagnetic coupling with the second free magnetic layer is not disturbed by the bias magnetic field of each of the bias layers, and the first free magnetic layer is not put into a multidomain state, thereby decreasing the Barkhausen noise of the spin valve thin film magnetic element.

Since the surfaces of the bias layers are butted against the sides of the laminate at any hierarchy position between the two surfaces which define the second free magnetic layer in the thickness direction, the dipolar magnetic field of the bias layers is not applied to the first and second free magnetic layers, and the first and second free magnetic layers are not put into the multidomain state, thereby decreasing the Barkhausen noise of the spin valve thin film magnetic element.

Furthermore, in the spin valve thin film magnetic element of the present invention, a pair of conductive layers are laminated on the pair of the bias layers on both sides of the laminate, for supplying a sensing current to the nonmagnetic conductive layer.

In this spin valve thin film magnetic element, the pair of conductive layers are laminated on the bias layers on both sides of the laminate, and thus no insulator is present between the conductive layers and the laminate, thereby sufficiently supplying a sensing current to the nonmagnetic conductive layer.

Furthermore, in the spin valve thin film magnetic element of the present invention, the pair of the conductive layers are formed to extend from both sides of the laminate to a center of one of the two surfaces which define the laminate in the thickness direction, and adhere to the one surface.

In this spin valve thin film magnetic element, the pair of the conductive layers are formed to extend from both sides of the laminate to the center of one surface thereof and adhere to the one surface, and thus the contact area between the conductive layers and the laminate is increased, thereby efficiently supplying a sensing current to the laminate.

Furthermore, in the spin valve thin film magnetic element of the present invention, the pinned magnetic layer comprises a nonmagnetic layer, and first and second pinned magnetic layer with the nonmagnetic layer provided therebetween so that the magnetization directions of the first and second pinned magnetic layers are antiparallel, and the first and second pinned magnetic layers are brought into a ferrimagnetic state.

In this spin valve thin film magnetic element, the first and second pinned magnetic layers, which constitute the pinned magnetic layer, are brought into a ferrimagnetic state to leave a little spontaneous magnetization of the entire pinned magnetic layer, and the spontaneous magnetization is further amplified by an exchange coupling magnetic field to strongly pin the magnetization direction of the entire pinned magnetic layer.

A thin film magnetic head of the present invention comprises the above-described spin valve thin film magnetic element.

The thin film magnetic head comprises the spin valve thin film magnetic element exhibiting a high rate of change in magnetoresistance and high output, and can thus easily detect a weak external magnetic field and can comply with higher magnetic recording density.

BRIEF DESCRIPTION OF THE DRAWINGS

FIG. 2 is a schematic sectional view of the spin valve thin film magnetic element shown in FIG. 1, as viewed from the track width direction;

FIG. 25 is a schematic sectional view of a conventional spin valve thin film magnetic element, as viewed from the magnetic recording medium side; and FIG. 26 is a schematic sectional view of a conventional spin valve thin film magnetic element, as viewed from the track width direction;

DESCRIPTION OF THE PREFERRED EMBODIMENTS

Embodiments of the present invention will be described below with reference to the drawings.

First Embodiment

Figure 1:
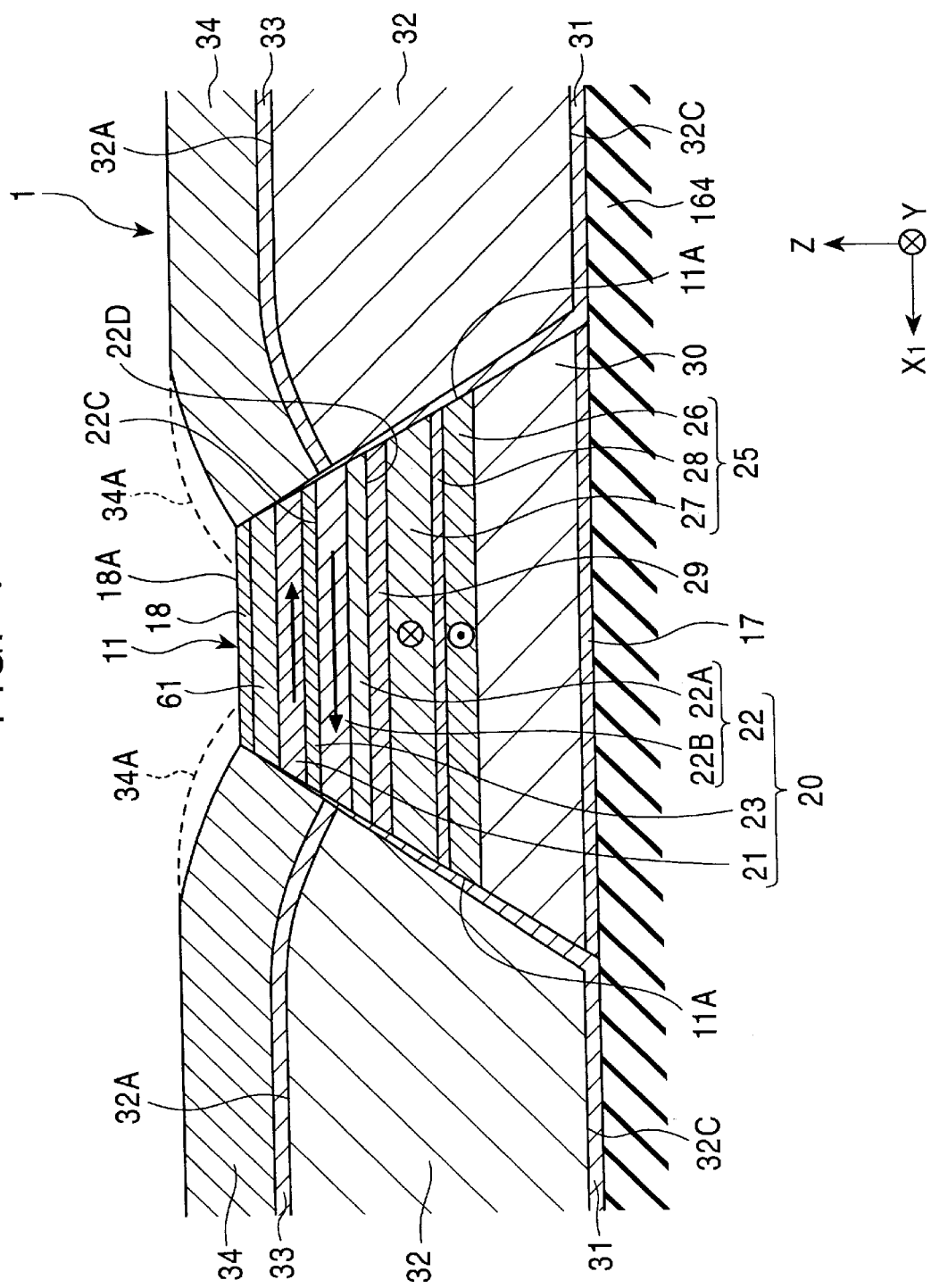
FIG. 1 is a schematic sectional view of a spin valve thin film magnetic element according to a first embodiment of the present invention, as viewed from the magnetic recording medium side.

FIG. 1 is a schematic sectional view of a spin valve thin film magnetic element 1 according to a first embodiment of the present invention, as viewed from the magnetic recording medium side, and FIG. 2 is a schematic sectional view of the spin valve thin film magnetic element 1, as viewed from the track width direction.

Figure 3:
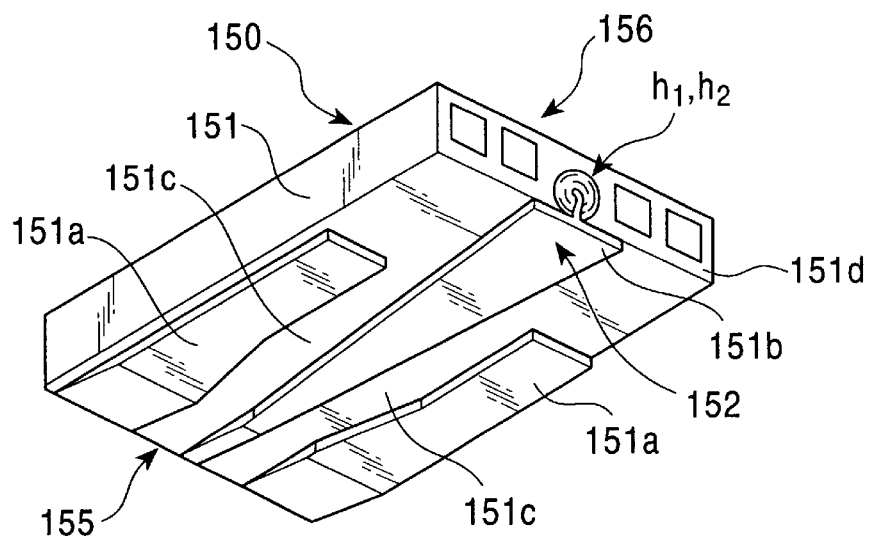
FIG. 3 is a perspective view of a floating magnetic head comprising a thin film magnetic head of the present invention.
Figure 4:
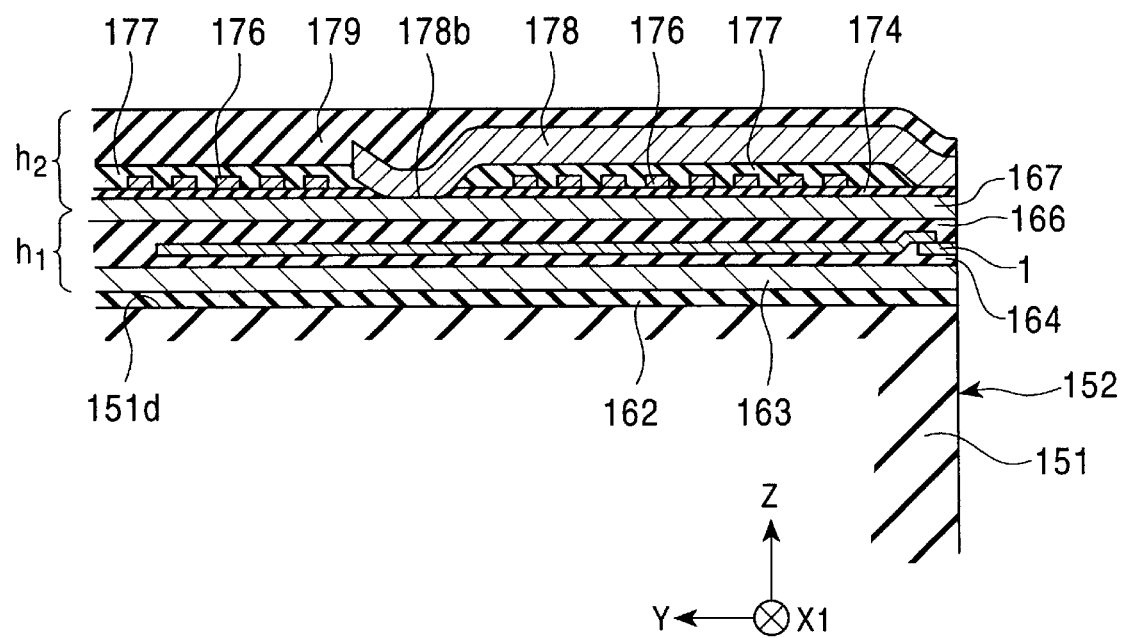
FIG. 4 is a schematic sectional view of the principal portion of the floating magnetic head shown in FIG. 3.

FIGS. 3 and 4 a floating magnetic head 150 comprises a thin film magnetic head comprising the spin valve thin film magnetic element 1.

The floating magnetic head 150 shown in FIG. 3 mainly comprises a slider 151, a thin film magnetic head $h_1$ according to the present invention and an inductive head $h_2$, which are provided on the end surface 151d of the slider 151. Reference numeral 155 denotes the leading side of the slider 151 on the upstream side in the movement direction of the magnetic recording medium, and reference numeral 156 denotes the trailing side. In the slider 151, rails 151a and 151b are formed on the surface 152 facing the medium, the air grooves 151c being formed between the rails.

As shown in FIGS. 3 and 4, the thin film magnetic head $h_1$ of the present invention comprises an insulating layer 162 formed on the end surface 151d of the slider 151, a lower shield layer 163 laminated on the insulating layer 162, a lower gap layer 164 laminated on the lower shield layer 163, the spin valve thin film magnetic element 1 of the present invention, which is formed on the lower gap layer 164 to be exposed from the medium-facing surface 152, an upper gap layer 166 covering the spin valve thin film magnetic element 1, and an upper shield layer 167 covering the upper gap layer 166.

The upper shield layer 167 also serves as a lower core layer of the inductive head $h_2$, which will be described below.

The inductive head $h_2$ comprises the lower core layer (upper shield layer) 167, a gap layer 174 laminated on the lower core layer 167, a coil 176, an upper insulating layer 177 covering the coil 176, and an upper core layer 178 joined to the gap layer 174 and joined to the lower core layer 167 on the coil 176 side.

The coil 176 is patterned in a planar spiral shape. The base portion 178b of the upper core layer 178 is magnetically connected to the lower core layer 167 in the substantially central portion of the coil 176.

Furthermore, a core protecting layer 179 made of alumina or the like is laminated on the upper core layer 178.

In FIGS. 1, 2 and 4, the Z direction coincides with the movement direction of the magnetic recording medium, the Y direction coincides with the direction of a leakage magnetic field from the magnetic recording medium, and the $X_1$ direction coincides with the track width direction of the spin valve thin film magnetic element 1.

The spin valve thin film magnetic element 1 shown in FIGS. 1 and 2 is a bottom-type single spin valve thin film magnetic element comprising an antiferromagnetic layer 30, a pinned magnetic layer 25, a nonmagnetic conductive layer 29, a free magnetic layer 20, and a backed layer 61, which are laminated in turn.

In FIGS. 1 and 2, reference numeral 164 denotes a lower gap layer made of $Al_2O_3$ or the like, and reference numeral 17 denotes an underlying layer made of Ta (tantalum) or the like and laminated on the lower gap layer 164. The antiferromagnetic layer 30 is laminated on the underlying layer 17, the pinned magnetic layer 25 is laminated on the antiferromagnetic layer 30, and the nonmagnetic conductive layer 29 made of Cu or the like is laminated on the pinned magnetic layer 25. The free magnetic layer 20 is laminated on the nonmagnetic conductive layer 29, the backed layer 61 is laminated on the free magnetic layer 20, and a capping layer 18 made of Ta or the like is laminated on the backed layer 61.

In this way, the layers from the underlying layer 17 to the capping layer 18 are laminated in turn to form a laminate 11 having a substantially trapezoidal sectional shape having a width corresponding to the track width.

The free magnetic layer 20 comprises a nonmagnetic intermediate layer 23, and first and second free magnetic layers 21 and 22 antiferromagnetically coupled with each other with the nonmagnetic intermediate layer 23 provided therebetween.

The pinned magnetic layer 25 comprises a nonmagnetic layer 28, and first and second pinned magnetic layers 26 and 27 with the nonmagnetic layer 28 provided therebetween.

A pair of bias layers 32 made of, for example, a Co—Pt (cobalt-platinum) alloy are formed on both sides of the laminate 11 in the $X_1$ direction, i.e., both sides in the track width direction.

The bias layers 32 are butted against both sides 11A of the laminate 11, and particularly butted against both sides 11A of the laminate 11 so as to contact the layer portion in which the layers from the antiferromagnetic layer 30 to the second free magnetic layer 22 are laminated.

Namely, the upper surfaces 32A of the bias layers 32, which are the surfaces defining the bias layers 32 on one of both sides in the thickness direction, are butted against the sides 11A of the laminate 11 at any hierarchy position between the upper surface 22C and the lower surface 22D which are the two surfaces defining the second free magnetic layer 22 in the thickness direction, and the lower surfaces 32C of the bias layers 32, which are the surfaces defining the bias layers 32 on the other side in the thickness direction, are butted against the sides 11A of the laminate 11 at the same hierarchy position as the antiferromagnetic layer 30 on the nonmagnetic conductive layer 29 side of the second free magnetic layer 22.

In this way, the bias layers 32 are located at least on both sides of the second free magnetic layer 22 so as to be adjacent to the second free magnetic layer 22, but not the first free magnetic layer 21.

Therefore, the bias magnetic field of each of the bias layers 32 is applied only to the second free magnetic layer 22 to orient the magnetization direction of the second free magnetic layer 22 in the $X_1$ direction. Also, the magnetization direction of the first free magnetic layer 21 is oriented in the direction opposite to the $X_1$ direction.

At this time, since the bias layers 32 are not adjacent to the first free magnetic layer 21, magnetization of the first free magnetic layer 21 is not disturbed by the bias magnetic field of the bias layers 32, and the first free magnetic layer 21 is not put into the multidomain state.

Therefore, the entire free magnetic layer 20 can be put into the single magnetic domain state, thereby decreasing the Barkhausen noise.

Reference numeral 34 denotes a conductive layer made of Cr, Ta, Cu, Au, or the like. The conductive layers 34 are laminated on the bias layers 32.

Namely, the conductive layers 34 are formed to butt against both sides 11A of the laminate 11 at positions above the bias layers 32.

The conductive layers 34 may be formed not only to butt against both sides 11A of the laminate 11 at positions above the bias layers 32 but also to extend from both sides of a surface which defines the laminate 11 in the thickness direction, i.e., the upper surface 18A of the capping layer 18, toward the center thereof so that the conductive layers 34 are adhered to the upper surface to cover the laminate 11, as shown by broken lines 34A.

The conductive layers 34 are provided for applying a sensing current to the laminate 11.

Particularly, the conductive layers 34A are formed to extend from both sides of the laminate 11 toward the center of the upper surface 18A of the capping layer 18 so that the they are adhered to the surface of the laminate 11, thereby increasing the contact area between the conductive layers 34A and the laminate 11. Therefore, the sensing current can be efficiently supplied to the laminate 11.

The bias underlying layers 31 made of, for example, a nonmagnetic metal such as Cr are provided between the bias layers 32 and the lower gap layer 164, and between the bias layer 32 and the laminate 11.

By forming the bias layers 32 on the bias underlying layers 32 made of Cr having a body centered crystal structure (bcc structure), the coercive force and remanence ratio of the bias layers 32 can be increased to increase the bias magnetic field required for bringing the second free magnetic layer into the single magnetic domain state.

Furthermore, the intermediate layers 33 made of, for example, a nonmagnetic metal such as Ta or Cr are provided between the bias layers 32 and the conductive layers 34 (34A).

In the use of Cr for the conductive layers 34 (34A), the intermediate layers 33 made of Ta functions as a diffusion barrier to a thermal process such as resist curing in a subsequent step, and can prevent deterioration in the magnetic properties of the bias layers 32. In the use of Ta for the conductive layers 34 (34A), the intermediate layers 33 made of Cr have the effect of facilitating deposition of Ta crystals having the body-centered structure with lower resistance on Cr.

The antiferromagnetic layer 30 is preferably made of a PtMn alloy. The PtMn alloy has excellent corrosion resistance, a high blocking temperature and a high exchange coupling magnetic field, as compared with a NiMn alloy and FeMn alloy conventionally used for antiferromagnetic layers.

The antiferromagnetic layer 30 may also be made of an alloy represented by the formula X—Mn (wherein X represents one element selected from Pt, Pd, Ru, Ir, Rh, and Os), or an alloy represented by the formula X'—Pt—Mn (wherein X' represents at least one element selected from Pd, Cr, Ni, Ru, Ir, Rh, Os, Au, and Ag).

In the PtMn alloy or an alloy represented by the formula X—Mn, the amount of Pt or X is preferably in the range of 37 to 63 atomic %, more preferably in the range of 44 to 57 atomic %.

Furthermore, in an alloy represented by the formula X'—Pt—Mn, the amount of X' is preferably in the range of 37 to 63 atomic %, more preferably in the range of 44 to 57 atomic %.

By using an alloy having the appropriate composition in the above-described range for the antiferromagnetic layer 30, and heat-treating the alloy in a magnetic field, the antiferromagnetic layer 30 producing a high exchange coupling magnetic field can be obtained. Particularly, use of the PtMn alloy can produce the excellent antiferromagnetic layer 30 having an exchange coupling magnetic field of over $6.4 \times 10^4$ A/m, and a blocking temperature of 653 K (380° C.) where the exchange coupling magnetic field is lost.

The pinned magnetic layer 25 comprises the nonmagnetic layer 28, and the first and second pinned magnetic layers 26 and 27 with the nonmagnetic layer 28 provided therebetween. The first pinned magnetic layer 26 is provided in contact with the antiferromagnetic layer 30 on the antiferromagnetic layer 30 side of the nonmagnetic layer 28, and the second pinned magnetic layer 27 is provided in contact with the nonmagnetic conductive layer 29 on the nonmagnetic conductive layer 29 side of the nonmagnetic layer 28.

An exchange coupling magnetic field (exchange anisotropic magnetic field) occurs in the interface between the first pinned magnetic layer 26 and the antiferromagnetic layer 30 to pin the magnetization direction of the first pinned magnetic layer 26 in the direction opposite to the Y direction.

The first and second pined magnetic layers 26 and 27 preferably have slightly different thicknesses. In FIGS. 1 and 2, the thickness of the second pinned magnetic layer 27 is larger than that of the first pinned magnetic layer 26.

The magnetization direction of the first pinned magnetic layer 26 is pinned in the direction opposite to the Y direction by the exchange coupling magnetic field with the antiferromagnetic layer 30, and the magnetization direction of the second pinned magnetic layer 27 is pinned in the Y direction by antiferromagnetic coupling with the first pinned magnetic layer 26.

Since the magnetization directions of the first and second pinned magnetic layers 26 and 27 are antiparallel to each other, the magnetic moments of the first and second pinned magnetic layers 26 and 27 are canceled by each other. However, the second pinned magnetic layer 27 has a slightly lager thickness to slightly leave the spontaneous magnetization of the pinned magnetic layer 25, creating the ferrimagnetic state. The spontaneous magnetization is further amplified by the exchange coupling magnetic field with the antiferromagnetic layer 30 to pin the magnetization direction of the pinned magnetic layer 25 in the Y direction.

Each of the first and second pinned magnetic layers 26 and 27 is made of a ferromagnetic material, for example, such as a NiFe alloy, Co, a CoNiFe alloy, a CoFe alloy, a CoNi alloy, or the like, preferably made of Co. The first and second pinned magnetic layers 26 and 27 are preferably made of the same material.

The nonmagnetic layer 28 is made of a nonmagnetic material, preferably made of one of Ru, Rh, Ir, Cr, Re, and Cu, or an alloy thereof, and more preferably made of Ru.

The nonmagnetic conductive layer 29 is a layer which prevents magnetic coupling between the pinned magnetic layer 25 and the free magnetic layer 20, and in which the sensing current mainly flows. The nonmagnetic conductive layer 29 is preferably made of a nonmagnetic material having conductivity, such as Cu, Cr, Au, Ag, or the like, more preferably made of Cu.

As shown in FIGS. 1 and 2, the free magnetic layer 20 comprises the nonmagnetic intermediate layer 23, and the first and second free magnetic layer 21 and 22 with the nonmagnetic intermediate layer 23 provided therebetween. The first free magnetic layer 21 is provided in contact with the backed layer 61 on the backed layer 61 side of the nonmagnetic intermediate layer 23, and the second free magnetic layer 22 is provided in contact with the nonmagnetic conductive layer 29 on the nonmagnetic conductive layer 29 side of the nonmagnetic intermediate layer 23.

The first free magnetic layer 21 is made of a ferromagnetic material, for example, such as a NiFe alloy, Co, a CoNiFe alloy, a CoFe alloy, a CoNi alloy, or the like, preferably made of a NiFe alloy.

The nonmagnetic intermediate layer 23 is made of a nonmagnetic material, preferably made of one of Ru, Rh, Ir, Cr, Re, and Cu, or an alloy thereof, and more preferably made of Ru.

The second free magnetic layer 22 comprises an anti-diffusion layer 22A and a ferromagnetic layer 22B. The anti-diffusion layer 22A is made of a ferromagnetic material, for example, Co, and prevents mutual diffusion between the ferromagnetic layer 22B and the nonmagnetic conductive layer 29.

The ferromagnetic layer 22B is made of a ferromagnetic material, for example, a NiFe alloy, Co, a CoNiFe alloy, a CoFe alloy, a CoNi alloy, or the like, and preferably made of a NiFe alloy.

The second free magnetic layer 22 may comprise a single layer.

The thickness $t_2$ of the second free magnetic layer 22 is larger than the thickness $t_1$ of the first free magnetic layer 21.

The thickness $t_2$ of the second free magnetic layer 22 is preferably in the range of 2.5 to 4.5 nm. The second free magnetic layer having a thickness $t_2$ out of this range is undesirable because the rate of change in magnetoresistance of the spin valve thin film magnetic element 1 cannot be increased.

The thickness $t_1$ of the first free magnetic layer 21 is preferably in the range of 0.5 to 2.5 nm.

Assuming that the saturation magnetizations of the first and second free magnetic layers 21 and 22 are $M_1$ and $M_2$, respectively, the magnetic thicknesses of the first and second free magnetic layers 21 and 22 are $M_1 \cdot t_1$ and $M_2 \cdot t_2$, respectively.

Since the second free magnetic layer 22 comprises the anti-diffusion layer 22A and the ferromagnetic layer 22B, the magnetic thickness $M_2 \cdot t_2$ of the second free magnetic layer 22 corresponds to the total of the magnetic thickness $M_{21} \cdot t_2$ of the anti-diffusion layer 22A and $M_{22} \cdot t_{22}$ of the ferromagnetic layer 22B.

Namely, $M_2 \cdot t_2 = M_{21} \cdot t_{21} + M_{22} \cdot t_{22}$ is established.

Here, $M_{21}$ and $t_{21}$ represent the saturation magnetization and thickness of the anti-diffusion layer 22A, and $M_{22}$ and $t_{22}$ represent the saturation magnetization and thickness of the ferromagnetic layer 22B, respectively.

For example, with the anti-diffusion layer 22A made of Co, and the ferromagnetic layer 22B made of a NiFe alloy, the saturation magnetization $M_{21}$ of the anti-diffusion layer 22A is greater than the saturation magnetization $M_{22}$ of the ferromagnetic layer 22B.

The free magnetic layer 20 is formed to satisfy the relation $M_2 \cdot t_2 > M_1 \cdot t_1$ between the magnetic thicknesses of the first and second free magnetic layers 21 and 22.

Also, the first and second free magnetic layers 21 and 22 are antiferromagnetically coupled with each other. Namely, when the magnetization direction of the second free magnetic layer 22 is oriented in the $X_1$ direction by the bias layers 32, the magnetization direction of the first free magnetic layer 21 is oriented in the direction opposite to the $X_1$ direction.

Since the magnetic thicknesses of the first and second free magnetic layers 21 and 22 have the relation $M_2 \cdot t_2 > M_1 \cdot t_1$, the magnetization of the second free magnetic layer 22 remains to orient the magnetization direction of the entire free magnetic layer 20 in the $X_1$ direction. In this case, the effective thickness of the free magnetic layer 20 is ($M_2 \cdot t_2 - M_1 \cdot t_1$).

In this way, the first and second free magnetic layers 21 and 22 are antiferromagnetically coupled with each other so that the magnetization directions thereof are antiparallel to each other, and the magnetic thicknesses have the relation $M_2 \cdot t_2 > M_1 \cdot t_1$. As a result, the first and second free magnetic layers 21 and 22 are brought into the synthetic ferrimagnetic state.

Therefore, the magnetization direction of the free magnetic layer 20 crosses the magnetization direction of the pinned magnetic layer 25.

In the spin valve thin film magnetic element 1, when the magnetization direction of the free magnetic layer 20, which is oriented in the $X_1$ direction, is changed by a leakage magnetic field from the recording medium such as a hard disk or the like, the electric resistance changes with the relation to magnetization of the pinned magnetic layer 25, which is pinned in the Y direction, so that the leakage magnetic field from the recording medium is detected by a change in voltage based on the change in the electric resistance value.

Since the magnetic thicknesses of the first and second free magnetic layers 21 and 22 have the relation $M_2 \cdot t_2 > M_1 \cdot t_1$, the spin flop magnetic field of the free magnetic layer 20 can be increased.

The spin flop magnetic field represents the magnitude of an external magnetic field which loses the antiparallel state of the magnetization directions of two magnetic layers when applied to the two magnetic layers having antiparallel magnetization directions.

Figure 5:
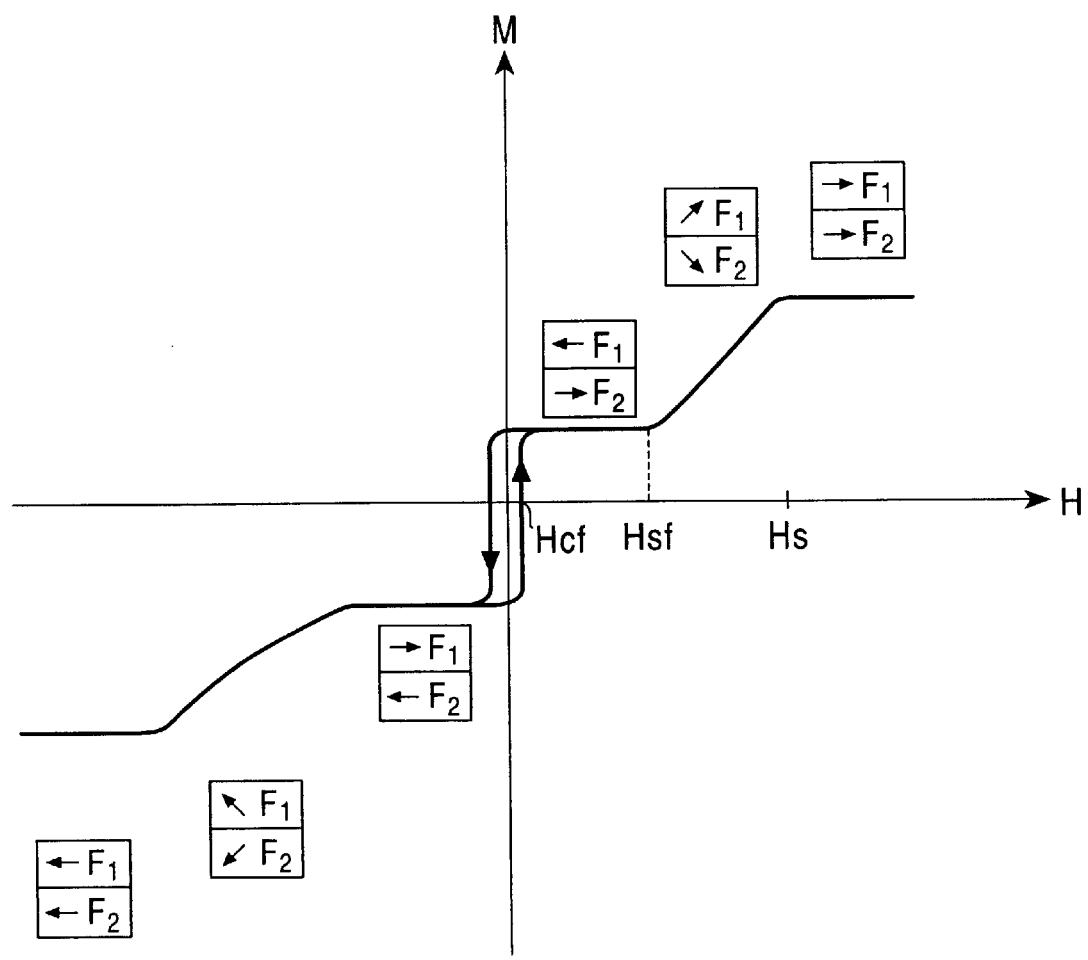
FIG. 5 is a graph showing a M-H curve of the free magnetic layer of the spin valve thin film magnetic element shown in FIG. 1.

FIG. 5 is a schematic drawing showing a M-H curve of the free magnetic layer 20. This M-H curve shows changes in magnetization M of the free magnetic layer 20 with the external magnetic field applied to the free magnetic layer 20 having the construction shown in FIG. 1 in the track width direction.

In FIG. 5, arrow F1 denotes the magnetization direction of the first free magnetic layer 21, and arrow F2 denotes the magnetization direction of the second free magnetic layer 22.

As shown in FIG. 5, with a small external magnetic field H, the first and second free magnetic layers 21 and 22 are antiferromagnetically coupled with each other, i.e., the directions of the arrows F1 and F2 are antiparallel to each other, while with an external magnetic field H of magnitude exceeding a predetermined value, the antiferromagnetic coupling between the first and second free magnetic layers 21 and 22 is broken to fail to maintain the ferrimagnetic state. This is spin flop transition. The spin flop magnetic field means the magnitude of the external magnetic field which causes the spin flop transition, and is denoted by Hsf in FIG. 5. In FIG. 5, Hcf denotes the coercive force of magnetization of the free magnetic layer 20.

Where the magnetic thicknesses of the first and second free magnetic layers 21 and 22 have the relation $M_2 \cdot t_2 > M_1 \cdot t_1$, the spin flop magnetic field Hsf of the free magnetic layer 20 is increased. Therefore, the magnetic field range in which the free magnetic layer 20 maintains the ferrimagnetic state is widened, and thus the free magnetic layer 20 can stably maintain the ferrimagnetic state.

Furthermore, even when the second free magnetic layer 22 comprises the anti-diffusion layer 22A, the magnetic thicknesses $M_1 \cdot t_1$ and $M_2 \cdot t_2$ of the first and second free magnetic layers 21 and 22, respectively, can be appropriately controlled to decrease the effective magnetic thickness ($M_2 \cdot t_2 - M_1 \cdot t_1$) of the free magnetic layer 20. Therefore, the magnetization direction of the free magnetic layer 20 easily changes with an external magnetic field of small magnitude, increasing the sensitivity of the spin valve thin film magnetic element 1.

The backed layer 61 is formed in contact with the side of the free magnetic layer 20 opposite to the side in contact with the nonmagnetic conductive layer 29, i.e., in contact with the first free magnetic layer 21.

The backed layer 61 preferably has higher conductivity than the first free magnetic layer 21, and specifically, it is preferably made of one element of Au, Ag and Cu, more preferably Cu. The thickness of the backed layer 61 is preferably in the range of 0.3 to 2.5 nm.

The backed layer 61 is formed in contact with the first free magnetic layer 21 so that the spin valve thin film magnetic element 1 of this embodiment exhibits the so-called spin filter effect, increasing the rate of change in magnetoresistance.

Although the cause for an increase in the rate of change in magnetoresistance of the spin valve thin film magnetic element 1 due to the backed layer 61 is briefly described below, the principle of the giant magnetoresistive effect of the spin valve thin film magnetic element 1 is first described in brief.

Figure 6:
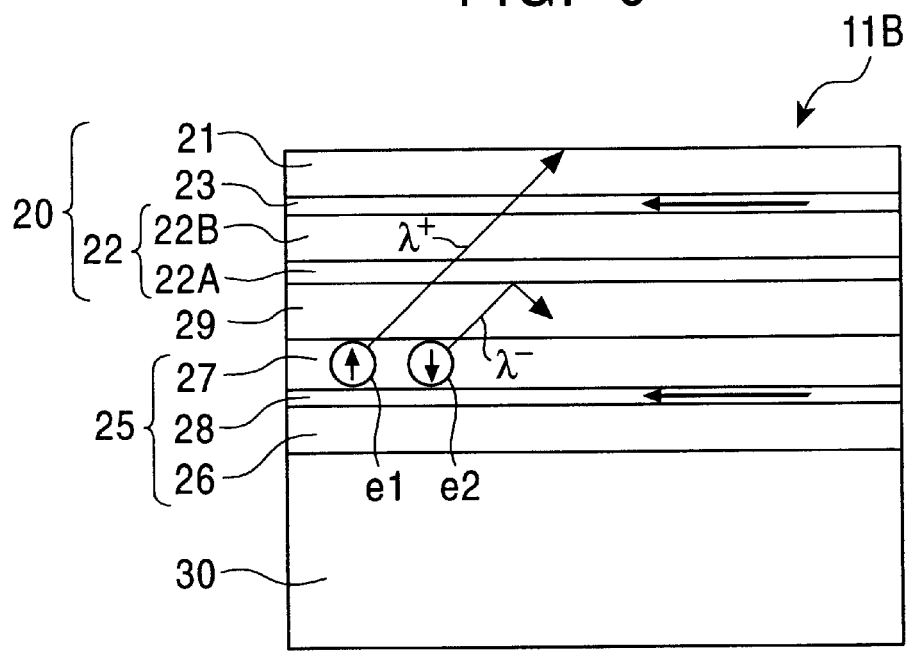
FIG. 6 is a schematic drawing illustrating the operation of a spin valve thin film magnetic element.

FIG. 6 shows a laminate 11B in which the antiferromagnetic layer 30, the pinned magnetic layer 25 (the first pinned magnetic layer 26, the nonmagnetic layer 28, and the second pinned magnetic layer 27), the nonmagnetic conductive layer 29, and the free magnetic layer 20 (the second free magnetic layer 22 (the anti-diffusion layer 22A and the ferromagnetic layer 22B), the nonmagnetic intermediate layer 23, the first pinned magnetic layer 21) are laminated in turn.

In FIG. 6, the magnetization direction of the free magnetic layer 20 is oriented in the leftward direction by the external magnetic field, and the magnetization direction of the pinned magnetic layer 25 is pinned in the leftward direction by the exchange coupling magnetic field with the antiferromagnetic layer 30.

When the sensing current is passed through the laminate 11B shown in FIG. 6, the conduction electrons mainly move in the nonmagnetic conductive layer 29 having low electric resistance. The conduction electrons include two types of conduction electrons including up-spin and down-spin conduction electrons which are substantially stochastically equivalent in amount. In FIG. 6, the up-spin conduction electrons are denoted by reference character $e_1$, and the down-spin conduction electrons are denoted by reference character $e_2$.

The rate of change in magnetoresistance of the spin valve thin film magnetic element shows a positive correlation to the difference between the mean free paths of the two types of conduction electrons $e_1$ and $e_2$.

The up-spin conduction electrons $e_1$ quite possibly move from the nonmagnetic conductive layer 29 to the free magnetic layer 20 when the magnetization directions of the pinned magnetic layer 25 and the free magnetic layer 20 are made parallel to each other by the external magnetic field, and the mean free path ($\lambda^+$) becomes relatively long.

On the other hand, the down-spin conduction electrons $e_2$ are always scattered in the interface between the nonmagnetic conductive layer 29 and the free magnetic layer 20 (the second free magnetic layer 22), and maintained in a state where the probability of movement to the fee magnetic layer 20 is low, and the mean free path ($\lambda^-$) remains shorter than the mean free path ($\lambda^+$) of the up-spin conduction electrons $e_1$.

In this way, the mean free path ($\lambda^+$) of the up-spin conduction electrons $e_1$ is longer than the mean free path ($\lambda^-$) of the down-spin conduction electrons $e_2$ due to the action of the external magnetic field to increase the difference ($\lambda^+-\lambda^-$) between the paths, thereby increasing the rate of change in magnetoresistance of the laminate 11B.

Figure 7:
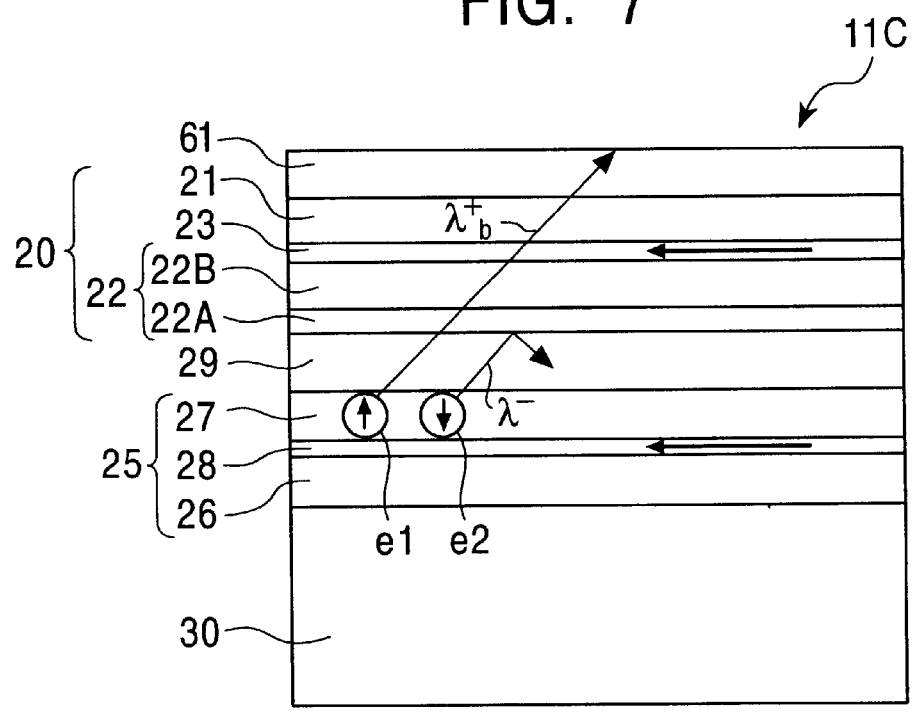
FIG. 7 is a schematic drawing illustrating the operation of a spin valve thin film magnetic element comprising a backed layer.

FIG. 7 shows a laminate 11C in which the backed layer 61 is laminated on the first free magnetic layer 21, which constitutes the free magnetic layer 20. When the sensing current is passed through the laminate 11C, the up-spin conduction electrons $e_1$ moving in the free magnetic layer 20 move to the backed layer 61 to further extend the mean free path ($\lambda^+$) of the up-spin conduction electrons $e_1$ to ($\lambda_b^+$). Namely, the spin filter effect can be exhibited, and the difference ($\lambda_b^+-\lambda^-$) between the mean free paths is longer than the difference ($\lambda^+-\lambda^-$) of the case shown in FIG. 6, further improving the rate of change in magnetoresistance.

Therefore, in the laminate 11C shown in FIG. 7, the rate of change in magnetoresistance can be more increased than the laminate 11B shown in FIG. 6 without the backed layer 61, improving the reproduced output of the spin valve thin film magnetic element.

Furthermore, the backed layer 61 is nonmagnetic and does not substantially increase the thickness of the free magnetic layer 20, and thus the magnetic thickness of the free magnetic layer 20 and the electric resistance of the free magnetic layer 20 are not increased, thereby improving the reproduced output of the spin valve thin film element 1.

As described above, the thickness of the backed layer 61 is preferably in the range of 0.3 to 2.5 nm. With the backed layer 61 having a thickness of less than 0.3 nm, the mean free path of the up-spin conduction electrons $e_1$ cannot be sufficiently extended, and the rate of change in magnetoresistance cannot be increased. With the backed layer 61 having a thickness of over 2.5 nm, the sensing current readily flows into not only the nonmagnetic conductive layer 29 but also into the backed layer 61, thereby undesirably causing a shunt current of the sensing current.

Next, the method of manufacturing the spin valve thin film magnetic element 1 is described with reference to FIGS. 8 to 11.

Figure 8:
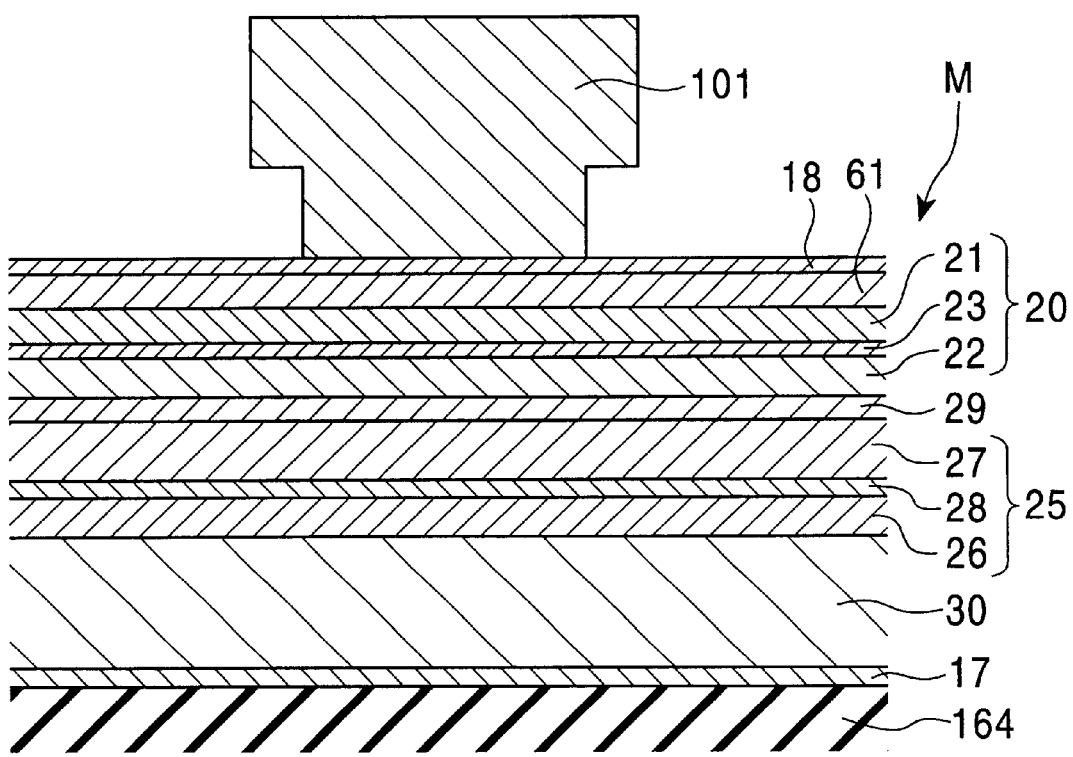
FIG. 8 is a schematic drawing illustrating a step of the method of manufacturing the spin valve thin film magnetic element according to the first embodiment of the present invention.
Figure 9:
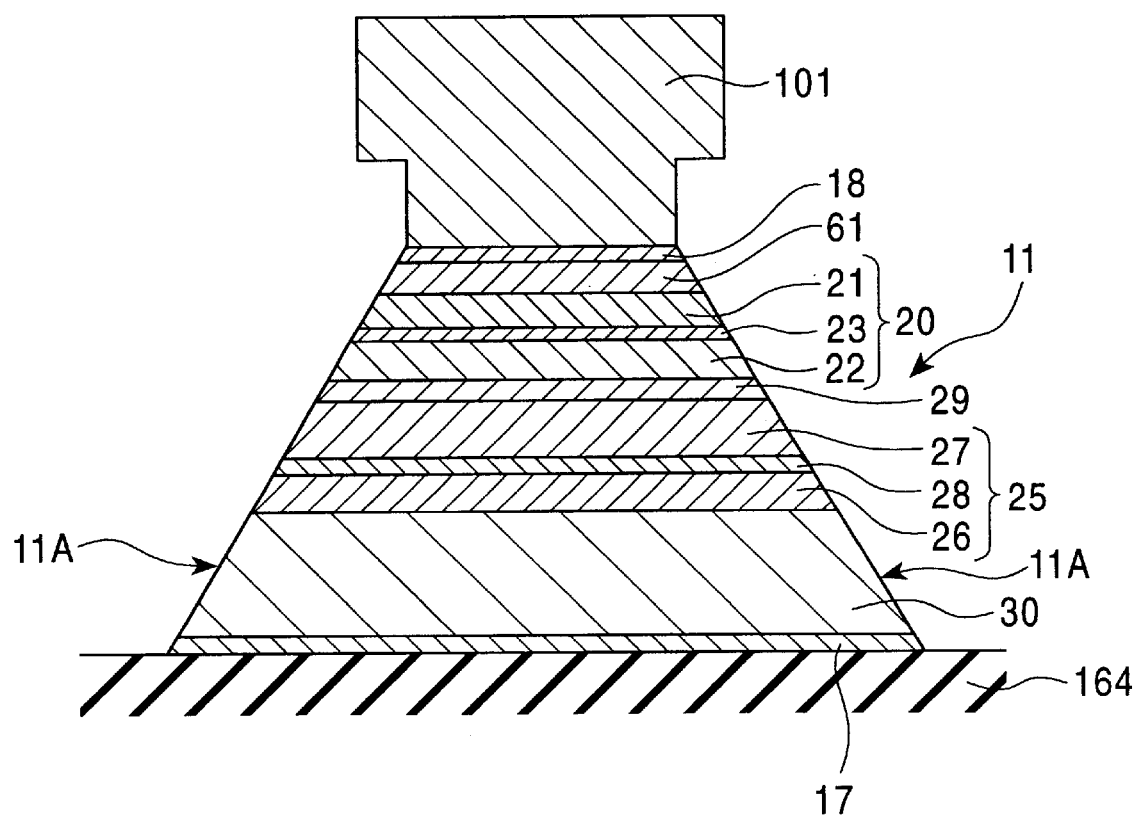
FIG. 9 is a schematic drawing illustrating a step of the method of manufacturing the spin valve thin film magnetic element according to the first embodiment of the present invention.

First, as shown in FIG. 8, the underlying layer 17, the antiferromagnetic layer 30, the pinned magnetic layer 25 (the first pinned magnetic layer 26, the nonmagnetic layer 28, the second pinned magnetic layer 27), the nonmagnetic conductive layer 29, the free magnetic layer 20 (the second free magnetic layer 22, the nonmagnetic intermediate layer 23, the first free magnetic layer 21), and the backed layer 61 are successively laminated to form a layered film M, and liftoff resist 101 is formed on the layered film M. Next, the portions not covered with the liftoff resist 101 are removed by ion milling to form the laminate 11 having an isosceles trapezoidal shape having inclined surfaces as the sides 11A, as shown in FIG. 9.

Figure 10:
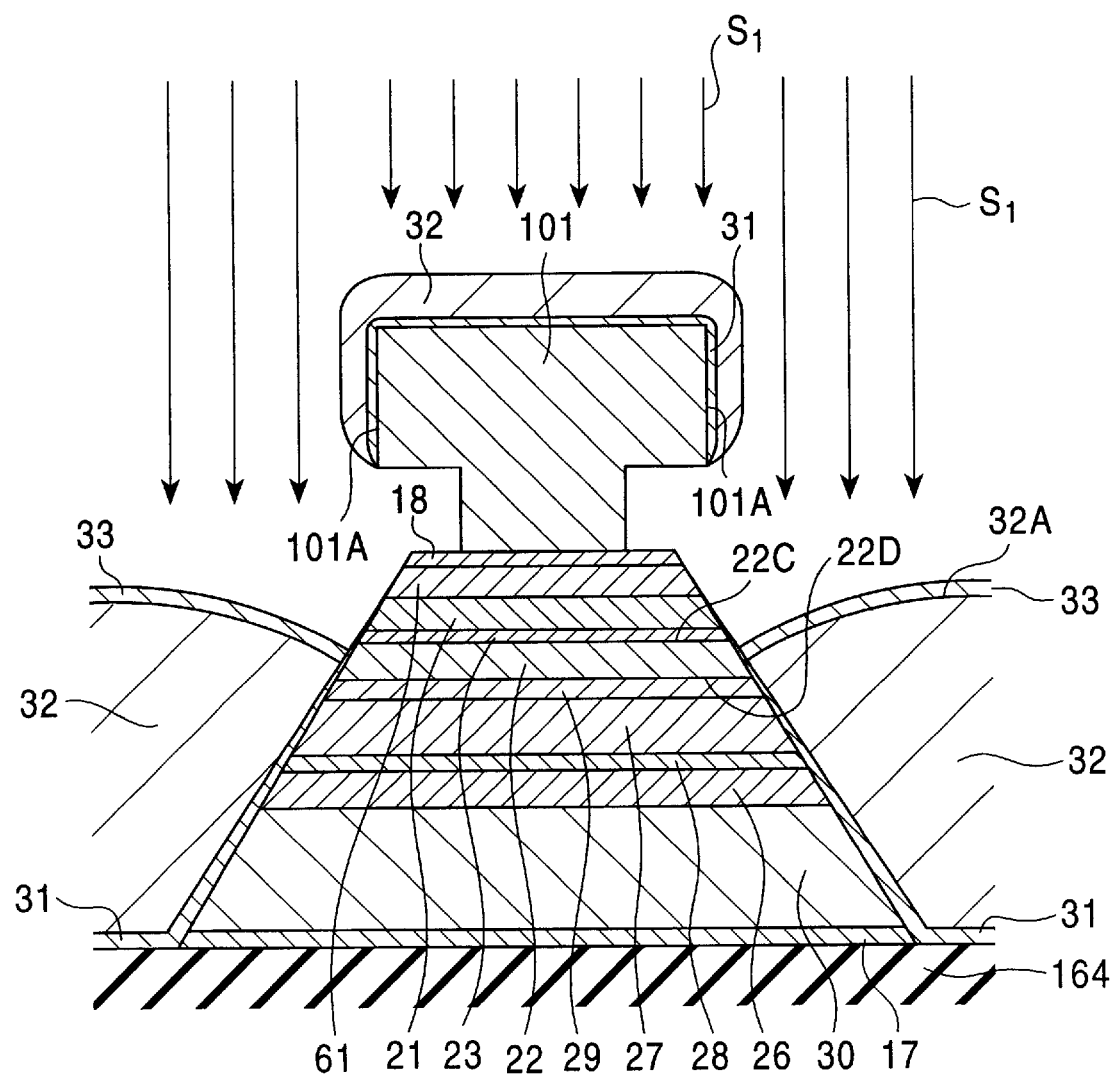
FIG. 10 is a schematic drawing illustrating a step of the method of manufacturing the spin valve thin film magnetic element according to the first embodiment of the present invention.

Next, as shown in FIG. 10, the bias underlying layers 31 are formed on the liftoff resist 101 and both sides of the laminate 11 to extend from the sides 11A of the laminate 11 to the top of the lower gap layer 164.

Then, the bias layers 32 are laminated on the bias underlying layers 31 and the liftoff resist 101. The bias layers 32 laminated on both sides of the laminate 11 are formed to be located at the same hierarchy position as at least the second free magnetic layer 22.

The bias layers 32 are formed so that the upper surfaces 32A thereof are located at any hierarchy position between the upper surface 22C and the lower surface 22D of the second free magnetic layer 22.

Then, the intermediate layers 33 are laminated on the hard bias layers 32.

The hard bias layers 32 can be formed by a sputtering method so that the upper surfaces 32A of the hard bias layers 32 are butted against the second free magnetic layer 22 and are parallel to the upper surface 22C of the second free magnetic layer 22. Therefore, the hard bias layers 32 are preferably formed by a method in which the target of a sputtering apparatus is preferably opposed to the lower gap layer 164 in parallel therewith, and the sputtered particles have loci S1 with a narrow angle distribution, and good linearity.

Where the sputtered particles sputtered from the target have the loci S1 with a narrow angle distribution, and good linearity, the sputtered particles less enter the portions directly below the edges 101A of the liftoff resist 101. As a result, the hard bias layers 32 are not laminated on the portions of the laminate 11, which are located at a hierarchy position above the second free magnetic layer 22, to prevent the upper surfaces 32A of the hard bias layers 32 from reaching the top of the laminate 11, thereby preventing the hard bias layers 32 from covering the portions of the sides 11A of the laminate 11, which are located above the second free magnetic layer 22.

Specifically, the hard bias layers 32 are preferably formed by, for example, any one of an ion beam sputtering method, a long slow sputtering method, and a collimation sputtering method, or a combination thereof.

Figure 11:
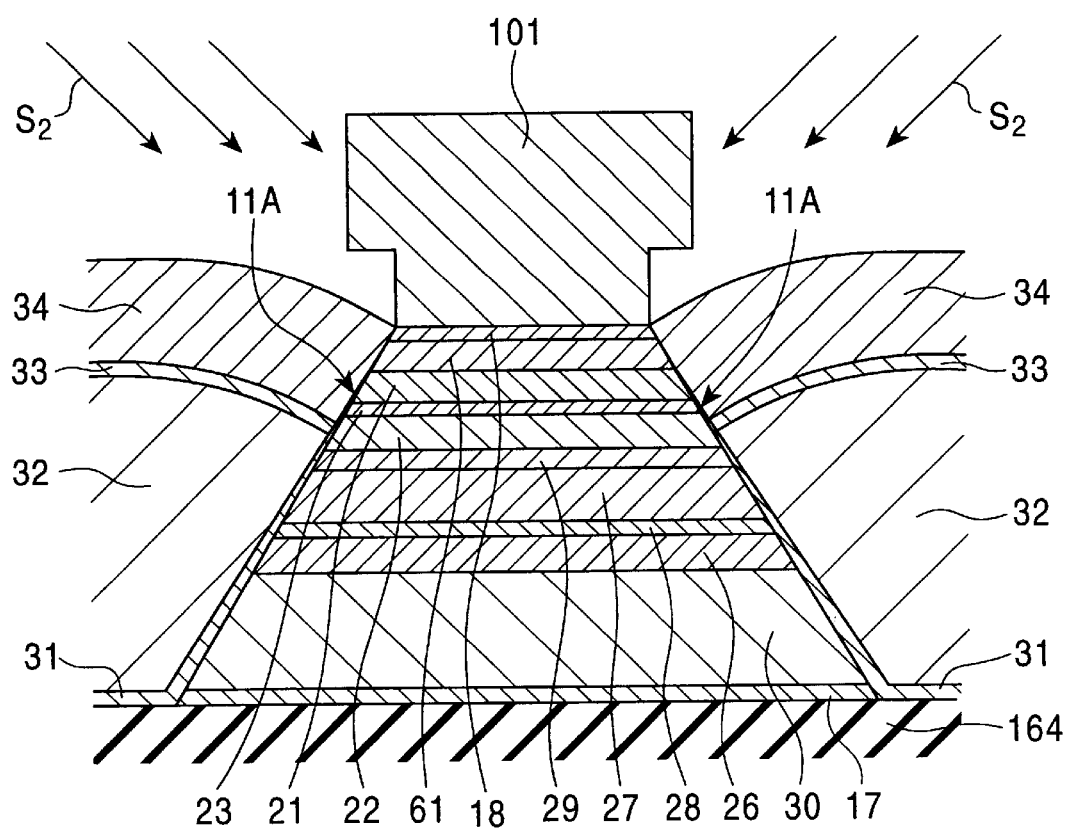
FIG. 11 is a schematic drawing illustrating a step of the method of manufacturing the spin valve thin film magnetic element according to the first embodiment of the present invention.

Then, as shown in FIG. 11, the conductive layers 34 are formed on the intermediate layers 33.

The conductive layers 34 are preferably formed in contact with the sides 11A of the laminate 11 by, for example, any one of the ion beam sputtering method, the long slow sputtering method, and the collimation sputtering method, or a combination thereof, in which the target is opposed to the lower gap layer 164 at an angle. Also, the conductive layers are preferably formed by a conventional sputtering method having a wide angular distribution.

As shown in FIG. 11, the conductive layers 34 are formed by the sputtered particles not obstructed by the liftoff resist 101. At this time, sputtering is performed with the target opposed to the lower gap layer 164 at an angle or the sputtered particles having loci S2 with a wide angular distribution so that many sputtered particles enter the portions directly below the edges 101A of the liftoff resist 101. As a result, the conductive layers 34 are formed in contact with the sides 11A of the laminate 11.

Then, the liftoff resist 101 is removed.

Figure 12:
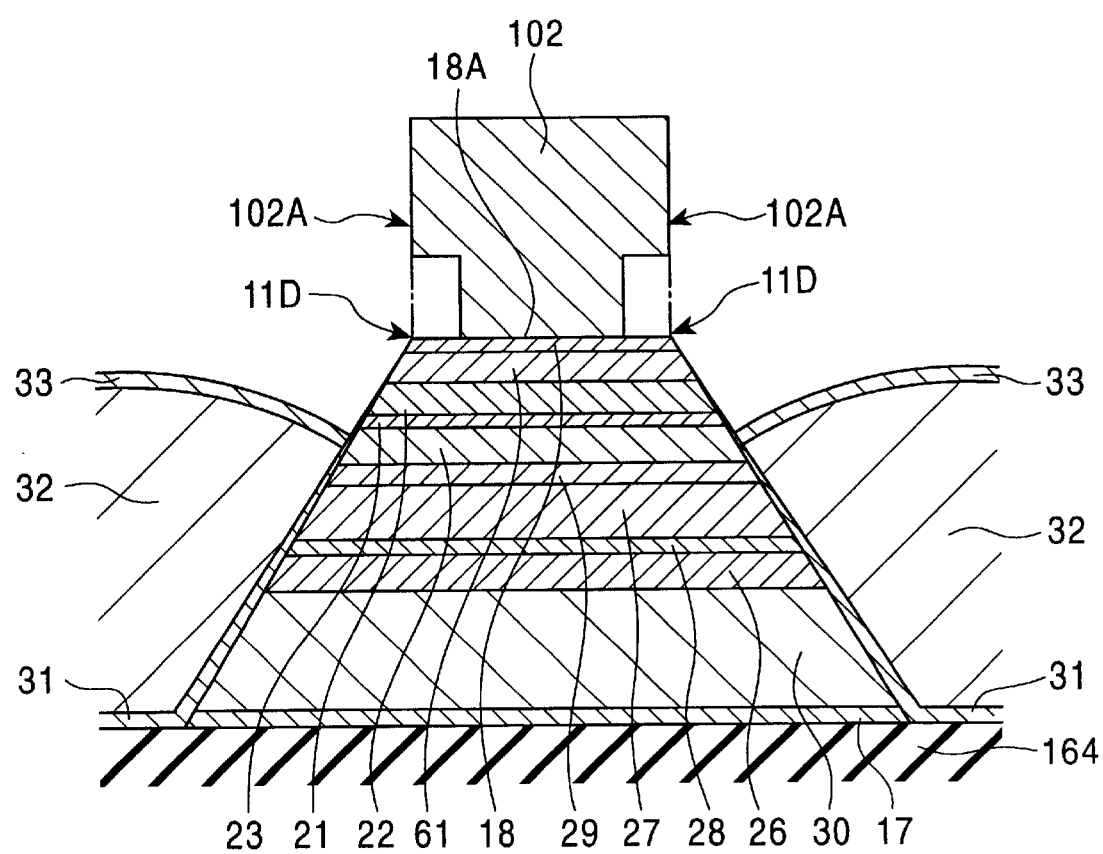
FIG. 12 is a schematic drawing illustrating a step of the method of manufacturing the spin valve thin film magnetic element according to the first embodiment of the present invention.

The conductive layers 34A formed to cover both sides of the laminate 11 as shown by the broken lines in FIG. 1 are formed by using the liftoff resist 102 shown in FIG. 12.

Namely, the liftoff resist 101 is removed after the bias layers 32 and the intermediate layers 33 are formed, as shown in FIG. 10, the liftoff resist 102 smaller than the liftoff resist 101 is formed on the upper surface 18A of the capping layer 18, as shown in FIG. 12. The liftoff resist 102 is formed so that the both edges 102A thereof are located above the junction portions 11D between the upper surface 18A of the capping layer 18 and the sides 11A of the laminate 11, and both sides of the supper surface 18A of the capping layer 18 are exposed.

Figure 13:
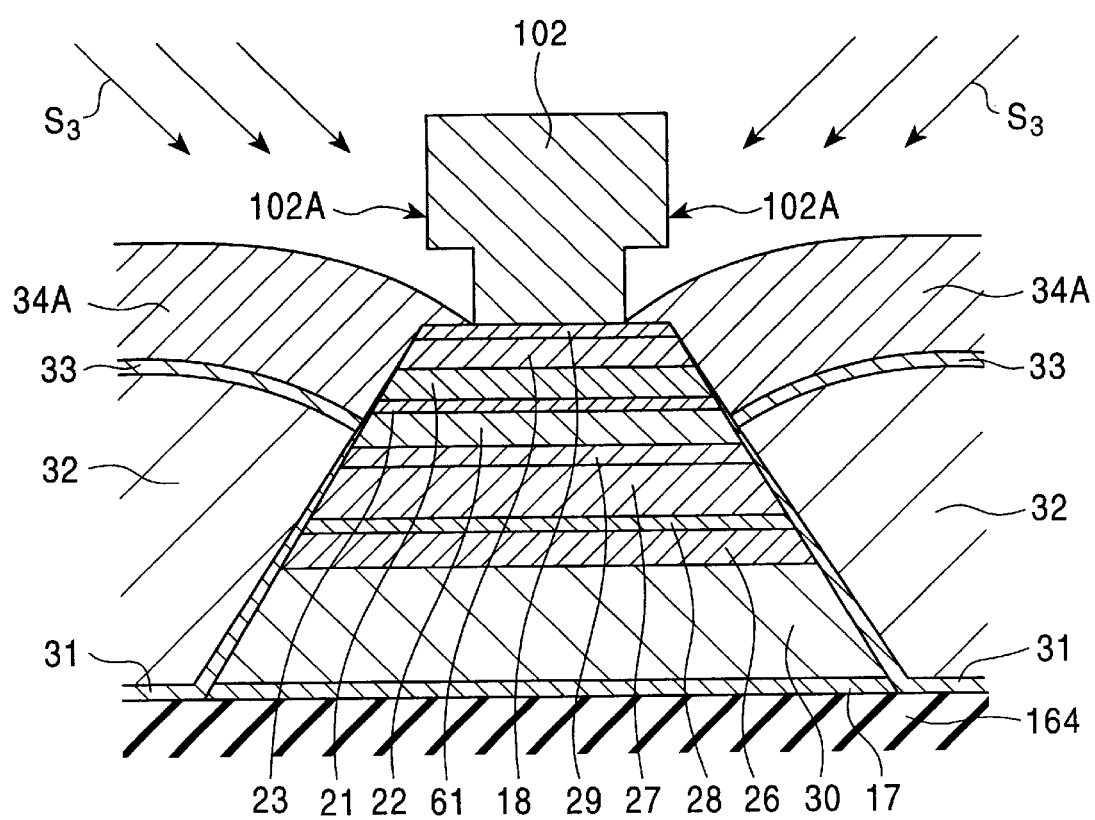
FIG. 13 is a schematic drawing illustrating a step of the method of manufacturing the spin valve thin film magnetic element according to the first embodiment of the present invention.

Next, as shown in FIG. 13, the conductive layers 34A are formed on the intermediate layers 33 and both sides of the upper surface 18A of the capping layer 18.

The conductive layers 34A are preferably formed to contact the sides 11A of the laminate 11, and extend from both sides of the laminate 11 toward the center of the top thereof to cover both sides of the upper surface 18A of the capping layer 18. For example, the conductive layers 34A are preferably formed by any one of the ion beam sputtering method, the long slow sputtering method, and the collimation sputtering method, or a combination thereof, in which the target is opposed to the lower gap layer 164 at an angle. Also, the conductive layers are preferably formed by a conventional sputtering method having a wide angular distribution.

As shown in FIG. 13, the conductive layers 34A are formed by the sputtered particles not obstructed by the liftoff resist 102. At this time, sputtering is performed with the target opposed to the lower gap layer 164 at an angle or the sputtered particles having loci S3 with a wide angular distribution so that many sputtered particles enter the portions directly below the edges 102A of the liftoff resist 102. As a result, the conductive layers 34A are formed to contact the sides 11A of the laminate 11 and cover both sides of the upper surface 18A of the capping layer 18.

Then, the liftoff resist 102 is removed.

By the above-described method, the spin valve thin film magnetic element 1 is produced, in which the conductive layers 34 are provided in contact with both sides 11A of the laminate 11, or the conductive layers 34A are provided in contact with both sides 11A of the laminate 11 to extent from both sides of the laminate 11 toward the center of the top thereof.

In the spin valve thin film magnetic element 1, the backed layer 61 is laminated on the free magnetic layer 20 so that the up-spin conduction electrons $e_1$ can move from the free magnetic layer 20 to the backed layer 61 to extend the mean free path $\lambda^+$ of the up-spin conduction electrons $e_1$ to $\lambda_b^+$, i.e., the spin filter effect is exhibited, thereby increasing the rate of change in magnetoresistance.

Also, the spin valve thin film magnetic element 1 comprises the free magnetic layer 20 comprising the first and second free magnetic layers 21 and 22 put into the ferrimagnetic state with the nonmagnetic intermediate layer 23 provided therebetween, i.e., the so-called synthetic ferrimagnetic free layer. Therefore, the magnetization direction of the entire free magnetic layer 20 can be changed with an external magnetic field of small magnitude, and the thickness of the free magnetic layer 20 is not excessively decreased, increasing the sensitivity of the spin valve thin film magnetic element 1.

Therefore, the spin valve thin film magnetic element 1 can exhibit an improvement in sensitivity to an external magnetic field due to the synthetic ferrimagnetic layer, and an improvement in the rate of change in magnetoresistance due to the spin filter effect.

Furthermore, the spin valve thin film magnetic element 1 comprises the pinned magnetic layer 25 comprising the first and second pinned magnetic layers 26 and 27 put into the ferrimagnetic state with the intermediate layer 28 provided therebetween. Therefore, the magnetization direction of the pinned magnetic layer 25 can be strongly pinned in one direction by the exchange coupling magnetic field between the antiferromagnetic layer 30 and the pinned magnetic layer 25, thereby increasing the thermal stability of the spin valve thin film magnetic element 1.

Second Embodiment

A second embodiment of the present invention will be described below with reference to the drawings.

Figure 14:
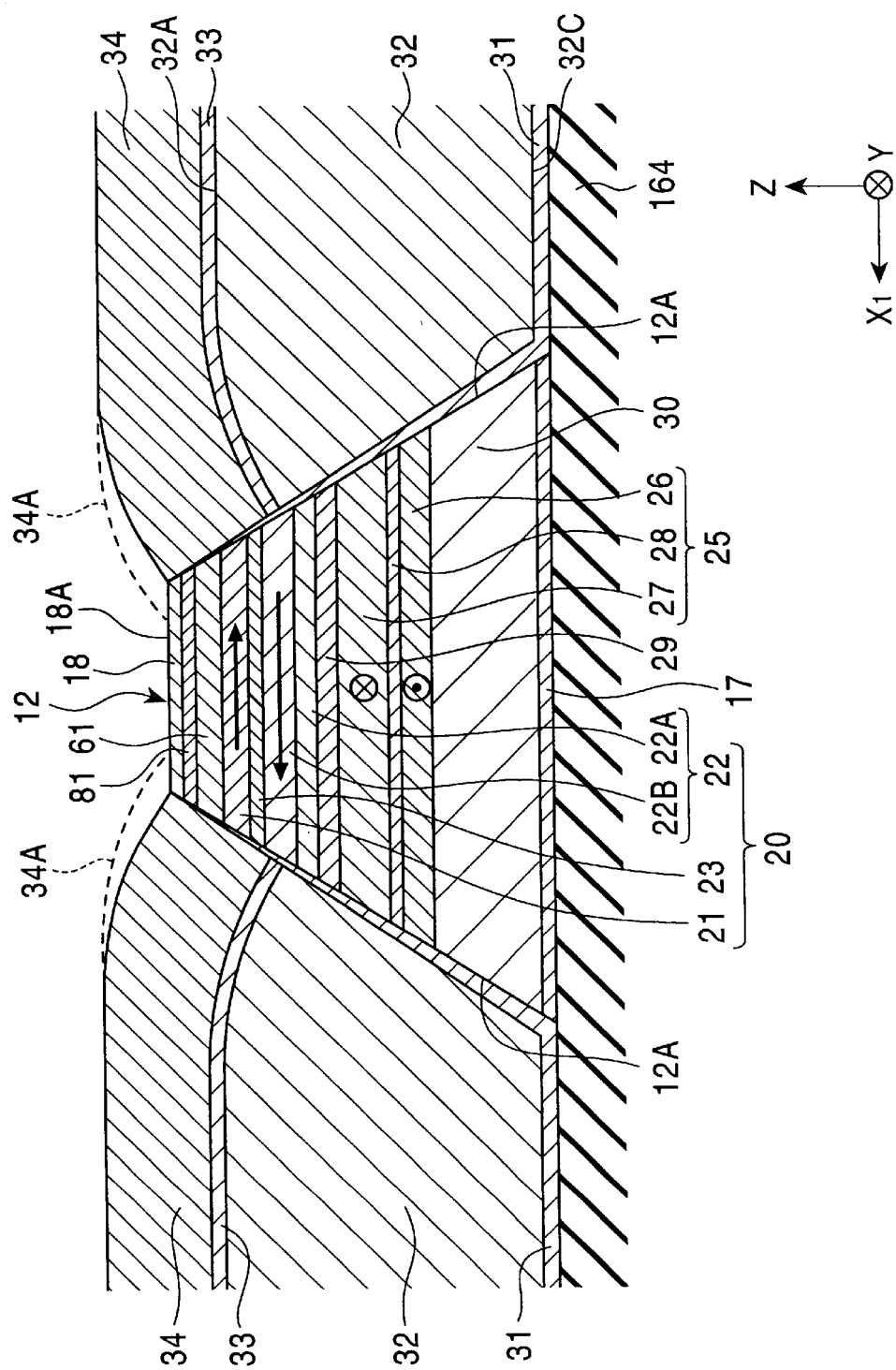
FIG. 14 is a schematic sectional view of a spin valve thin film magnetic element according to a second embodiment of the present invention, as viewed from the magnetic recording medium side.
Figure 15:
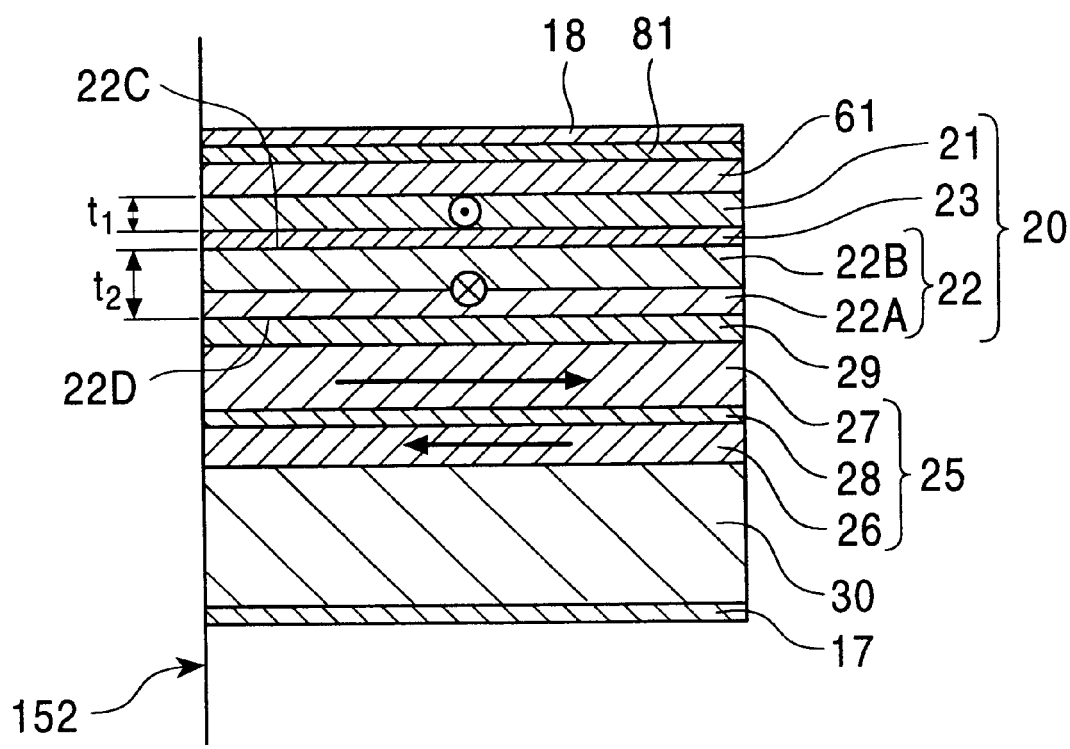
FIG. 15 is a schematic sectional view of the spin valve thin film magnetic element shown in FIG. 14, as viewed from the track width direction.

FIG. 14 is a schematic sectional view of a spin valve thin film magnetic element 2 according to the second embodiment of the present invention, as viewed from the magnetic recording medium side, and FIG. 15 is a schematic sectional view of the spin valve thin film magnetic element 2, as viewed from the track width direction.

Of the components shown in FIGS. 14 and 15, the same components as those shown in FIGS. 1 and 2 are denoted by the same reference numerals, and a description thereof is omitted or a brief description thereof is made.

In FIGS. 14 and 15, the Z direction coincides with the movement direction of the magnetic recording medium, the Y direction coincides with the direction of a leakage magnetic field from the magnetic recording medium, and the $X_1$ direction coincides with the track width direction of the spin valve thin film magnetic element 2.

Like the spin valve thin film magnetic element 1 of the first embodiment, the spin valve thin film magnetic element 2 shown in FIGS. 14 and 15 is provided on the thin film magnetic head $h_1$ to constitute a floating magnetic head.

Like the spin valve thin film magnetic element 1 of the first embodiment, the spin valve thin film magnetic element 2 is a bottom-type single spin valve thin film magnetic element comprising an underlying layer 17, an antiferromagnetic layer 30, a pinned magnetic layer 25, a nonmagnetic conductive layer 29, a free magnetic layer 20, a backed layer 61, and a capping layer 18, which are laminated in turn.

The spin valve thin film magnetic element 2 is different from the spin valve thin film magnetic element 1 in that a protecting layer 81 made of a transition metal is formed between the backed layer 61 and the capping layer 18.

In this way, the layers from the underlying layer 17 to the capping layer 18 are laminated in turn to form a laminate 12 having a substantially trapezoidal sectional shape having a width corresponding to the track width.

The free magnetic layer 20 comprises a nonmagnetic intermediate layer 23, and first and second free magnetic layers 21 and 22 with the nonmagnetic intermediate layer 23 provided therebetween.

The pinned magnetic layer 25 comprises a nonmagnetic layer 28, and first and second pinned magnetic layers 26 and 27 with the nonmagnetic layer 28 provided therebetween.

A pair of bias layers 32 are formed on both sides of the laminate 11 in the $X_1$ direction.

The bias layers 32 are butted against both sides 12A of the laminate 12 so as to contact the layer portion in which the layers from the antiferromagnetic layer 30 to the second free magnetic layer 22 are laminated.

Namely, the upper surfaces 32A of the bias layers 32 are butted against the sides 12A of the laminate 12 at any hierarchy position between the upper surface 22C and the lower surface 22D of the second free magnetic layer 22, and the lower surfaces 32C of the bias layers 32 are butted against the sides 12A of the laminate 12 at the same hierarchy position as the antiferromagnetic layer 30 on the nonmagnetic conductive layer 29 side of the second free magnetic layer 22.

In this way, the bias layers 32 are located at least on both sides of the second free magnetic layer 22 so as to be adjacent to the second free magnetic layer 22, but not the first free magnetic layer 21.

Therefore, the bias magnetic field of each of the bias layers 32 is applied only to the second free magnetic layer 22 to orient the magnetization direction of the second free magnetic layer 22 in the $X_1$ direction. Also, the magnetization direction of the first free magnetic layer 21 is oriented in the direction opposite to the $X_1$ direction.

At this time, since the bias layers 32 are not adjacent to the first free magnetic layer 21, the magnetization of the first free magnetic layer 21 is not disturbed by the bias magnetic field of the bias layers 32, and the first free magnetic layer 21 is not put into the multidomain state.

Therefore, the entire free magnetic layer 20 can be put into the single magnetic domain state, thereby decreasing the Barkhausen noise.

Reference numeral 34 denotes a conductive layer made of Cr, Ta, Cu, Au, or the like. The conductive layers 34 are laminated on the bias layers 32.

Namely, the conductive layers 34 are formed to butt against both sides 12A of the laminate 12 at positions above the bias layers 32.

The conductive layers 34 may be formed not only to butt against both sides 12A of the laminate 12 at positions above the bias layers 32 but also to extend from both sides of the surface which defines the laminate 12 on one side in the thickness direction, i.e., the upper surface 18A of the capping layer 18, toward the center thereof so that the conductive layers 34 are adhered to the upper surface to cover the laminate 12, as shown by broken lines 34A.

The conductive layers 34 (34A) are provided for applying a sensing current to the laminate 12.

Particularly, the conductive layers 34A are formed to extend from both sides of the laminate 12 toward the center of the upper surface 18A of the capping layer 18 so that the they are adhered to the surface of the laminate 12, thereby increasing the contact area between the conductive layers 34A and the laminate 12. Therefore, the sensing current can be efficiently supplied to the laminate 12.

Furthermore, bias underlying layers 31 are provided between the bias layers 32 and the lower gap layer 164, and between the bias layer 32 and the laminate 12. Also, intermediate layers 33 are provided between the bias layers 32 and the conductive layers 34 (34A).

The antiferromagnetic layer 30 is preferably made of a PtMn alloy. The PtMn alloy has excellent corrosion resistance, a high blocking temperature and a high exchange coupling magnetic field, as compared with a NiMn alloy and FeMn alloy conventionally used for antiferromagnetic layers.

The antiferromagnetic layer 30 has the same composition as the antiferromagnetic layer of the first embodiment.

The pinned magnetic layer 25 comprises the nonmagnetic layer 28, and the first and second pinned magnetic layers 26 and 27 with the nonmagnetic layer 28 provided therebetween. The first pinned magnetic layer 26 is provided in contact with the antiferromagnetic layer 30 on the antiferromagnetic layer 30 side of the nonmagnetic layer 28, and the second pinned magnetic layer 27 is provided in contact with the nonmagnetic conductive layer 29 on the nonmagnetic conductive layer 29 side of the nonmagnetic layer 28.

An exchange coupling magnetic field (exchange anisotropic magnetic field) occurs in the interface between the first pinned magnetic layer 26 and the antiferromagnetic layer 30 to pin the magnetization direction of the first pinned magnetic layer 26 in the direction opposite to the Y direction.

The thickness of the second pinned magnetic layer 27 is larger than that of the first pinned magnetic layer 26.

The magnetization direction of the first pinned magnetic layer 26 is pinned in the direction opposite to the Y direction by the exchange coupling magnetic field with the antiferromagnetic layer 30, and the magnetization direction of the second pinned magnetic layer 27 is pinned in the Y direction by antiferromagnetic coupling with the first pinned magnetic layer 26.

Since the magnetization directions of the first and second pinned magnetic layers 26 and 27 are antiparallel to each other, the magnetic moments of the first and second pinned magnetic layers 26 and 27 are canceled by each other. However, the second pinned magnetic layer 27 has a slightly lager thickness to slightly leave the spontaneous magnetization of the pinned magnetic layer 25, creating the ferrimagnetic state. The spontaneous magnetization is further amplified by the exchange coupling magnetic field with the antiferromagnetic layer 30 to pin the magnetization direction of the pinned magnetic layer 25 in the Y direction.

Each of the first and second pinned magnetic layers 26 and 27 is made of the same ferromagnetic material as the first and second pinned magnetic layers of the first embodiment. The nonmagnetic layer 28 is made of the same nonmagnetic material as the nonmagnetic layer of the first embodiment.

The nonmagnetic conductive layer 29 is preferably made of a nonmagnetic material having conductivity, such as Cu, Cr, Au, Ag, or the like, more preferably made of Cu.

As shown in FIGS. 14 and 15, the free magnetic layer 20 comprises the nonmagnetic intermediate layer 23, and the first and second free magnetic layer 21 and 22 with the nonmagnetic intermediate layer 23 provided therebetween. The first free magnetic layer 21 is provided in contact with the backed layer 61 on the backed layer 61 side of the nonmagnetic intermediate layer 23, and the second free magnetic layer 22 is provided in contact with the nonmagnetic conductive layer 29 on the nonmagnetic conductive layer 29 side of the nonmagnetic intermediate layer 23.

The first free magnetic layer 21 and the nonmagnetic intermediate layer 23 are made the same materials as the first free magnetic layer and the nonmagnetic intermediate layer of the first embodiment.

The second free magnetic layer 22 comprises an anti-diffusion layer 22A and a ferromagnetic layer 22B. The anti-diffusion layer 22A and the ferromagnetic layer 22B are made of the same materials as the anti-diffusion layer and the ferromagnetic layer of the first embodiment.

The thickness $t_2$ of the second free magnetic layer 22 is larger than the thickness $t_1$ of the first free magnetic layer 21.

The thickness $t_2$ of the second free magnetic layer 22 is preferably in the range of 2.5 to 4.5 nm. The second free magnetic layer having a thickness $t_2$ out of this range is undesirable because the rate of change in magnetoresistance of the spin valve thin film magnetic element 2 cannot be increased.

The thickness $t_1$ of the first free magnetic layer 21 is preferably in the range of 0.5 to 2.5 nm.

Assuming that the saturation magnetizations of the first and second free magnetic layers 21 and 22 are $M_1$ and $M_2$, respectively, the magnetic thicknesses of the first and second free magnetic layers 21 and 22 are $M_1 \cdot t_1$ and $M_2 \cdot t_2$, respectively.

The free magnetic layer 20 is formed to satisfy the relation $M_2 \cdot t_2 > M_1 \cdot t_1$ between the magnetic thicknesses of the first and second free magnetic layers 21 and 22.

Also, the first and second free magnetic layers 21 and 22 are antiferromagnetically coupled with each other. Namely, when the magnetization direction of the second free magnetic layer 22 is oriented in the $X_1$ direction by the bias layers 32, the magnetization direction of the first free magnetic layer 21 is oriented in the direction opposite to the $X_1$ direction.

Since the magnetic thicknesses of the first and second free magnetic layers 21 and 22 have the relation $M_2 \cdot t_2 > M_1 \cdot t_1$, the magnetization of the second free magnetic layer 22 remains to orient the magnetization direction of the entire free magnetic layer 20 in the $X_1$ direction. In this case, the effective thickness of the free magnetic layer 20 is ($M_2 \cdot t_2 - M_1 \cdot t_1$).

In this way, the first and second free magnetic layers 21 and 22 are antiferromagnetically coupled with each other so that the magnetization directions thereof are antiparallel to each other, and the magnetic thicknesses have the relation $M_2 \cdot t_2 > M_1 \cdot t_1$. As a result, the first and second free magnetic layers 21 and 22 are brought into the synthetic ferrimagnetic state.

Therefore, the magnetization direction of the free magnetic layer 20 crosses the magnetization direction of the pinned magnetic layer 25.

Since the magnetic thicknesses of the first and second free magnetic layers 21 and 22 have the relation $M_2 \cdot t_2 > M_1 \cdot t_1$, the spin flop magnetic field of the free magnetic layer 20 can be increased. Therefore, the magnetic field range in which the free magnetic layer 20 maintains the ferrimagnetic state is widened, and thus the free magnetic layer 20 can stably maintain the ferrimagnetic state.

In the spin valve thin film magnetic element 2, when the magnetization direction of the free magnetic layer 20, which is oriented in the $X_1$ direction, is changed by a leakage magnetic field from the recording medium such as a hard disk or the like, the electric resistance changes with the relation to magnetization of the pinned magnetic layer 25, which is pinned in the Y direction, so that the leakage magnetic field from the recording medium is detected by a change in voltage based on the change in the electric resistance value.

The backed layer 61 is formed in contact with the side of the free magnetic layer 20 opposite to the side in contact with the nonmagnetic conductive layer 29, i.e., in contact with the first free magnetic layer 21.

The backed layer 61 is made of the same material as the backed layer of the first embodiment.

The backed layer 61 is formed in contact with the first free magnetic layer 21 so that the spin valve thin film magnetic element 2 of this embodiment exhibits the same spin filter effect as the spin valve thin film magnetic element 1 of the first embodiment, increasing the rate of change in magnetoresistance.

Namely, the up-spin conduction electrons moving in the free magnetic layer 20 move to the backed layer 61 to further extend the mean free path of the up-spin conduction electrons to ($\lambda_b^+$). Namely, the spin filter effect can be exhibited, and the difference ($\lambda_b^+ - \lambda^-$) between the mean free paths is increased, further improving the rate of change in magnetoresistance of the spin valve thin film magnetic element 2 to increase reproduced output.

Furthermore, the protecting layer 81 made of a transition metal, which does not dissolve in the backed layer 61 and the capping layer 18, is provided on the side of the backed layer 61 opposite to the side in contact with the first free magnetic layer, i.e., between the backed layer 61 and the capping layer 18.

As the transition metal which forms the protecting layer 81, for example, Hf, MO, V, Cr, Nb, Ta, and W can be used. These transition metals are elements which do not dissolve in the constituent element Au, Ag, or Cu of the backed layer 61, and the constituent element Ta of the capping layer 18. By forming the protecting layer 81 of such a transition metal, it is possible to prevent mutual diffusion between the backed layer 61 and the capping layer 18.

Therefore, the side of the backed layer 61, which is opposite to the side in contact with the first free magnetic layer 21, is not disturbed, and the effective thickness of the backed layer 61 is not decreased. As a result, the mean free path of the up-spin conduction electrons is not shortened, thereby further improving the spin filter effect to increase the rate of change in magnetoresistance of the spin valve thin film magnetic element 2.

The spin valve thin film magnetic element 2 is produced by the same method as the spin valve thin film magnetic element 1 except that the underlying layer 17, the antiferromagnetic layer 30, the first pinned magnetic layer 26, the nonmagnetic layer 28, the second pinned magnetic layer 27, the nonmagnetic conductive layer 29, the second free magnetic layer 22, the nonmagnetic intermediate layer 23, the first free magnetic layer 21, the backed layer 61, the protecting layer 81, and the capping layer 18 are laminated in turn to form a layered film.

Like the spin valve thin film magnetic element 1 of the first embodiment, the spin valve thin film magnetic element 2 can exhibit an improvement in sensitivity to an external magnetic field due to the synthetic ferrimagnetic layer, and an improvement in the rate of change in magnetoresistance due to the spin filter effect. Also, the spin valve thin film magnetic element 2 has the following effect.

The spin valve thin film magnetic element 2 comprises the protecting layer 81 made of a transition metal, which does not dissolve in the backed layer 61 and the capping layer 18, and provided between both layers, thereby preventing mutual diffusion between the backed layer 61 and the capping layer 18. Therefore, the interface of the backed layer 61, which is opposite to the side in contact with the first free magnetic layer 21, is not disturbed, and the effective thickness of the backed layer 61 is not decreased. As a result, the mean free path of the up-spin conduction electrons is not shortened, thereby further improving the spin filter effect to further increase the rate of change in magnetoresistance of the spin valve thin film magnetic element 2.

Third Embodiment

A third embodiment of the present invention will be described below with reference to the drawings.

Figure 16:
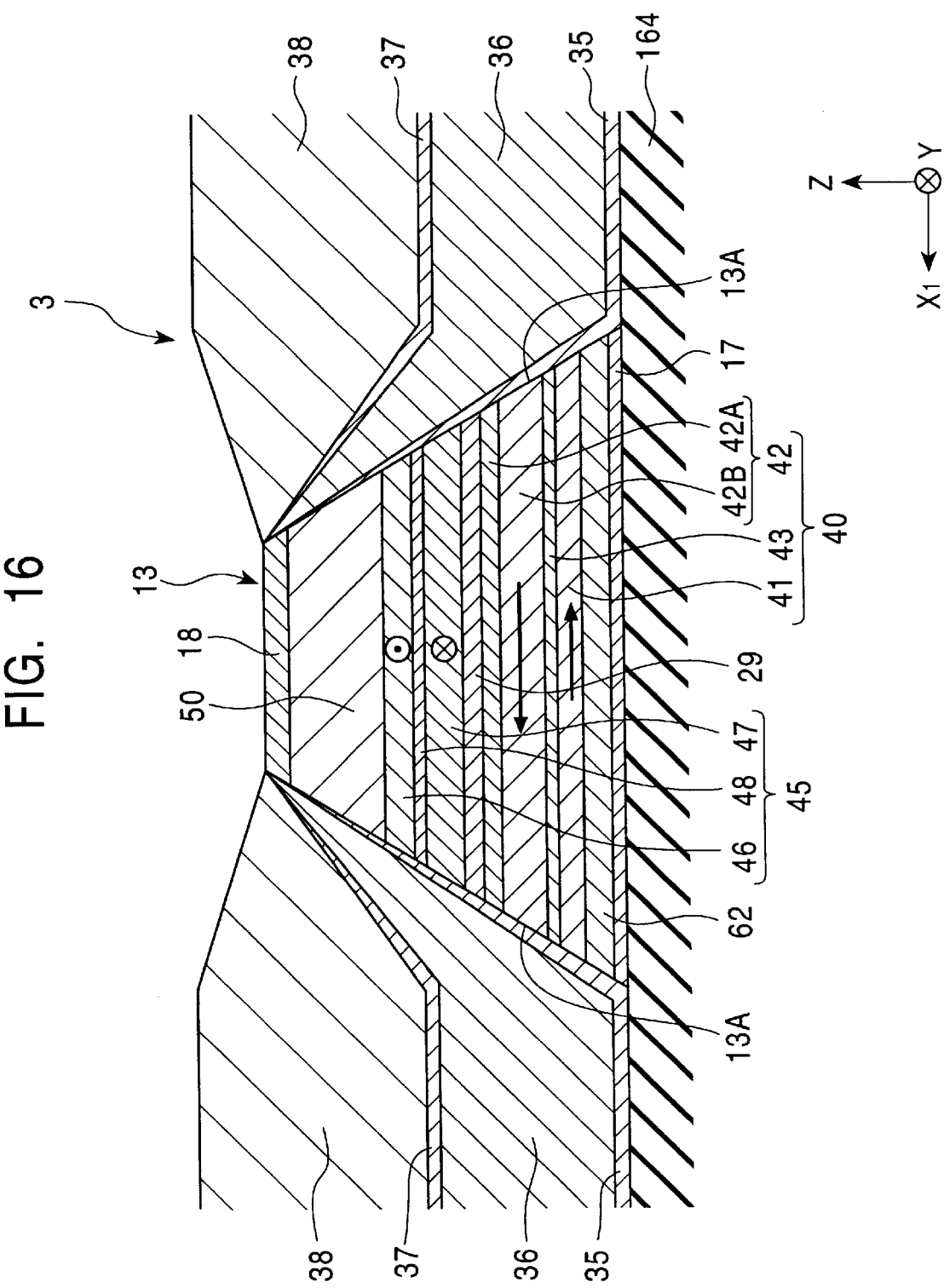
FIG. 16 is a schematic sectional view of a spin valve thin film magnetic element according to a third embodiment of the present invention, as viewed from the magnetic recording medium side.
Figure 17:
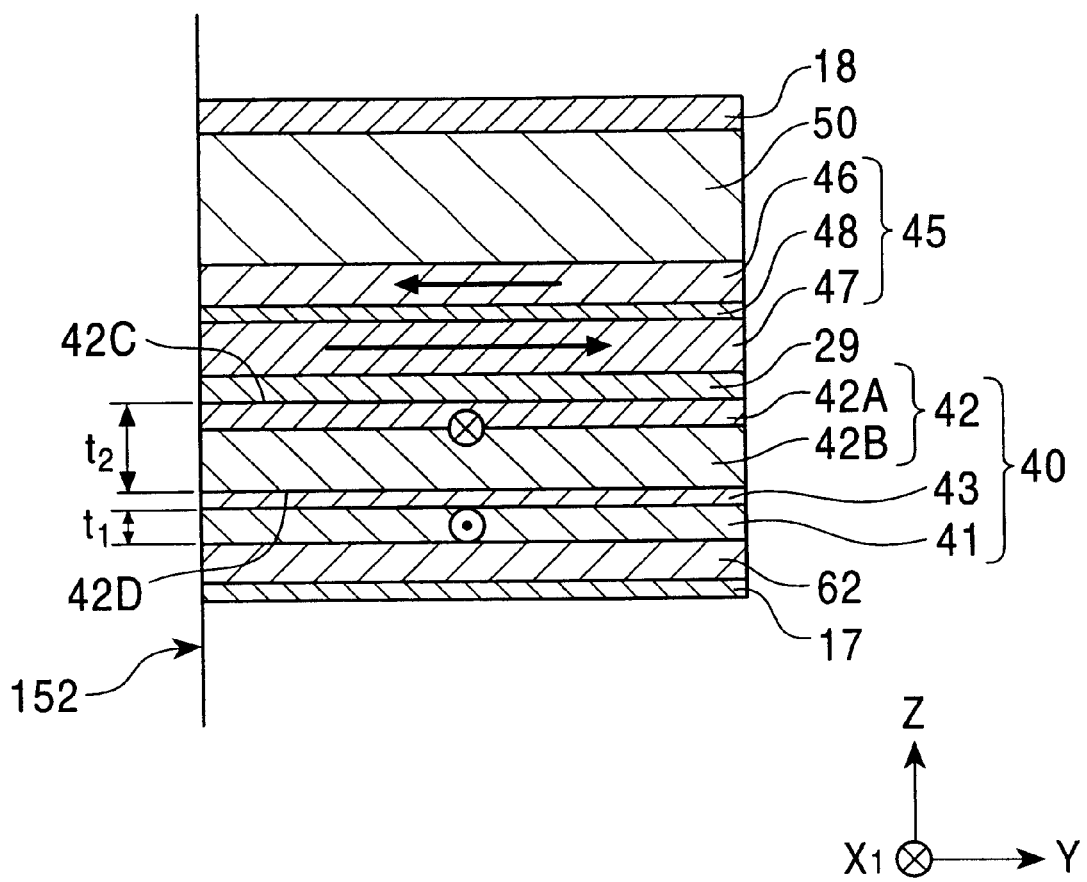
FIG. 17 is a schematic sectional view of the spin valve thin film magnetic element shown in FIG. 16, as viewed from the track width direction.

FIG. 16 is a schematic sectional view of a spin valve thin film magnetic element 3 according to the third embodiment of the present invention, as viewed from the magnetic recording medium side, and FIG. 17 is a schematic sectional view of the spin valve thin film magnetic element 3, as viewed from the track width direction.

Of the components shown in FIGS. 16 and 17, the same components as those shown in FIGS. 1, 2, 14 and 15 are denoted by the same reference numerals as in FIGS. 1, 2, 14 and 15, and a description thereof is omitted or a brief description thereof is made.

In FIGS. 16 and 17, the Z direction coincides with the movement direction of the magnetic recording medium, the Y direction coincides with the direction of a leakage magnetic field from the magnetic recording medium, and the $X_1$ direction coincides with the track width direction of the spin valve thin film magnetic element 3.

Like the spin valve thin film magnetic element 1 of the first embodiment, the spin valve thin film magnetic element 3 shown in FIGS. 16 and 17 is provided on the thin film magnetic head $h_1$ to constitute a floating magnetic head.

The spin valve thin film magnetic element 3 is a top-type single spin valve thin film magnetic element comprising a free magnetic layer 40, a nonmagnetic conductive layer 29, a pinned magnetic layer 45, and an antiferromagnetic layer 50, which are laminated in turn.

In FIGS. 16 and 17, reference numeral 164 denotes a lower gap layer, and reference numeral 17 denotes an underlying layer laminated on the lower gap layer 164. A backed layer 62 is laminated on the underlying layer 17, the free magnetic layer 40 is laminated on the backed layer 62, and the nonmagnetic conductive layer 29 is laminated on the free magnetic layer 40. The pinned magnetic layer 45 is laminated on the nonmagnetic conductive layer 29, the antiferromagnetic layer 50 is laminated on the pinned magnetic layer 45, and a capping layer 18 is laminated on the antiferromagnetic layer 50.

In this way, the layers from the underlying layer 17 to the capping layer 18 are laminated in turn to form a laminate 13 having a substantially trapezoidal sectional shape having a width corresponding to the track width.

A pair of bias layers 36 are formed on both sides of the laminate 13, i.e., both sides in the track width direction, i.e., both sides in the $X_1$ direction. The bias layers 36 are formed to extend from the top of the lower gap layer 164 to both sides 13A of the laminate 13. The bias layers 36 orient the magnetization direction of the free magnetic layer 40 to decrease the Barkhausen noise of the free magnetic layer 40.

Reference numeral 38 denotes a conductive layer. The conductive layers 38 are laminated on the bias layers 36, for applying the sensing current to the laminate 13.

Also, bias underlying layers 35 are provided between the bias layers 36 and the lower gap layer 164, and between the bias layer 36 and both sides 13A of the laminate 13.

Furthermore, intermediate layers 37 are provided between the bias layers 36 and the conductive layers 38.

The bias underlying layers 35, the bias layers 36, the intermediate layers 37 and the conductive layers 38 are made of the same materials as the bias underlying layers 31, the bias layers 32, the intermediate layers 33 and the conductive layers 34 of the first or second embodiment.

The antiferromagnetic layer 50 is preferably made of a PtMn alloy. The PtMn alloy has excellent corrosion resistance, a high blocking temperature and a high exchange coupling magnetic field, as compared with a NiMn alloy and FeMn alloy conventionally used for antiferromagnetic layers.

The antiferromagnetic layer 50 may also be made of an alloy represented by the formula X—Mn (wherein X represents one element selected from Pt, Pd, Ru, Ir, Rh, and Os), or an alloy represented by the formula X'—Pt—Mn (wherein X' represents at least one element selected from Pd, Cr, Ni, Ru, Ir, Rh, Os, Au, and Ag).

In the PtMn alloy or an alloy represented by the formula X—Mn, the amount of Pt or X is preferably in the range of 37 to 63 atomic %, more preferably in the range of 47 to 57 atomic %.

Furthermore, in an alloy represented by the formula X'—Pt—Mn, the amount of X' is preferably in the range of 37 to 63 atomic %, more preferably in the range of 47 to 57 atomic %.

By using an alloy having the appropriate composition in the above-described range for the antiferromagnetic layer 50, and heat-treating the alloy in a magnetic field, the antiferromagnetic layer 50 producing a high exchange coupling magnetic field can be obtained. Particularly, use of the PtMn alloy can produce the excellent antiferromagnetic layer 50 having an exchange coupling magnetic field of over $6.4 \times 10^4$ A/m, and a blocking temperature of 653 K (380° C.) where the exchange coupling magnetic field is lost.

The pinned magnetic layer 45 comprises a nonmagnetic layer 48, and first and second pinned magnetic layers 46 and 47 with the nonmagnetic layer 48 provided therebetween. The first pinned magnetic layer 46 is provided in contact with the antiferromagnetic layer 50 on the antiferromagnetic layer 50 side of the nonmagnetic layer 48, and the second pinned magnetic layer 47 is provided in contact with the nonmagnetic conductive layer 29 on the nonmagnetic conductive layer 29 side of the nonmagnetic layer 48.

An exchange coupling magnetic field (exchange anisotropic magnetic field) occurs in the interface between the first pinned magnetic layer 46 and the antiferromagnetic layer 50 to pin the magnetization direction of the first pinned magnetic layer 46 in the direction opposite to the Y direction.

The first and second pined magnetic layers 46 and 47 preferably have slightly different thicknesses. In FIG. 16, the thickness of the second pinned magnetic layer 47 is larger than that of the first pinned magnetic layer 46.

The magnetization direction of the first pinned magnetic layer 46 is pinned in the direction opposite to the Y direction by the exchange coupling magnetic field with the antiferromagnetic layer 50, and the magnetization direction of the second pinned magnetic layer 47 is pinned in the Y direction by antiferromagnetic coupling with the first pinned magnetic layer 46.

Since the magnetization directions of the first and second pinned magnetic layers 46 and 47 are antiparallel to each other, the magnetic moments of the first and second pinned magnetic layers 46 and 47 are canceled by each other. However, the second pinned magnetic layer 47 has a slightly lager thickness to slightly leave the spontaneous magnetization of the pinned magnetic layer 45, creating the ferrimagnetic state. The spontaneous magnetization is further amplified by the exchange coupling magnetic field with the antiferromagnetic layer 50 to pin the magnetization direction of the pinned magnetic layer 45 in the Y direction.

Each of the first and second pinned magnetic layers 46 and 47 is made of the same ferromagnetic material as the first and second pinned magnetic layers 26 and 27 of the first or second embodiment. The first and second pinned magnetic layers 46 and 47 are preferably made of the same material.

The nonmagnetic layer 48 is made of the same nonmagnetic material as the nonmagnetic layer 28 of the first or second embodiment.

The nonmagnetic conductive layer 29 is made of the same material as the nonmagnetic conductive layer of the first or second embodiment.

As shown in FIG. 16, the free magnetic layer 40 comprises a nonmagnetic intermediate layer 43, and first and second free magnetic layer 41 and 42 with the nonmagnetic intermediate layer 43 provided therebetween. The first free magnetic layer 41 is provided on the underlying layer 17 side of the nonmagnetic intermediate layer 43, and the second free magnetic layer 42 is provided on the nonmagnetic conductive layer 29 side of the nonmagnetic intermediate layer 43.

The first free magnetic layer 41 is made the same material as the first free magnetic layer 21 of the first or second embodiment.

The nonmagnetic intermediate layer 43 is made the same nonmagnetic material as the nonmagnetic intermediate magnetic layer 23 of the first or second embodiment.

The second free magnetic layer 42 comprises an anti-diffusion layer 42A and a ferromagnetic layer 42B.

The anti-diffusion layer 42A prevents mutual diffusion between the ferromagnetic layer 42B and the nonmagnetic conductive layer 29, and is made of the same material as the anti-diffusion layer 22A of the first or second embodiment.

The ferromagnetic layer 42B is made of the same ferromagnetic material as the ferromagnetic layer 22B of the first or second embodiment.

The thickness $t_2$ of the second free magnetic layer 42 is larger than the thickness $t_1$ of the first free magnetic layer 41.

The thickness $t_2$ of the second free magnetic layer 42 is preferably in the range of 2.5 to 4.5 nm. The second free magnetic layer 42 having a thickness $t_2$ out of this range is undesirable because the rate of change in magnetoresistance of the spin valve thin film magnetic element 3 cannot be increased.

The thickness $t_1$ of the first free magnetic layer 41 is preferably in the range of 0.5 to 2.5 nm.

Assuming that the saturation magnetizations of the first and second free magnetic layers 41 and 42 are $M_1$ and $M_2$, respectively, the magnetic thicknesses of the first and second free magnetic layers 41 and 42 are $M_1 \cdot t_1$ and $M_2 \cdot t_2$, respectively.

The free magnetic layer 40 is formed to satisfy the relation $M_2 \cdot t_2 > M_1 \cdot t_1$ between the magnetic thicknesses of the first and second free magnetic layers 41 and 42.

Also, the first and second free magnetic layers 41 and 42 are antiferromagnetically coupled with each other. Namely, when the magnetization direction of the second free magnetic layer 42 is oriented in the $X_1$ direction by the bias layers 36, the magnetization direction of the first free magnetic layer 41 is oriented in the direction opposite to the $X_1$ direction.

In this way, the first and second free magnetic layers 41 and 42 are antiferromagnetically coupled with each other so that the magnetization directions thereof are antiparallel to each other, and the magnetic thicknesses have the relation $M_2 \cdot t_2 > M_1 \cdot t_1$. As a result, the first and second free magnetic layers 41 and 42 are brought into the synthetic ferrimagnetic state.

Therefore, the magnetization direction of the free magnetic layer 40 crosses the magnetization direction of the pinned magnetic layer 45.

In the spin valve thin film magnetic element 3, when the magnetization direction of the free magnetic layer 40, which is oriented in the $X_1$ direction, is changed by a leakage magnetic field from the recording medium such as a hard disk or the like, the electric resistance changes with the relation to magnetization of the pinned magnetic layer 45, which is pinned in the Y direction, so that the leakage magnetic field from the recording medium is detected by a change in voltage based on the change in the electric resistance value.

Since the magnetic thicknesses of the first and second free magnetic layers 41 and 42 have the relation $M_2 \cdot t_2 > M_1 \cdot t_1$, the spin flop magnetic field of the free magnetic layer 40 can be increased. Therefore, the magnetic field range in which the free magnetic layer 40 maintains the ferrimagnetic state is widened, and thus the free magnetic layer 40 can stably maintain the ferrimagnetic state.

The backed layer 62 is formed in contact with the side of the free magnetic layer 40 opposite to the side in contact with the nonmagnetic conductive layer 29, i.e., in contact with the first free magnetic layer 41.

The backed layer 62 is made of the same material as the backed layer 61 of the first or second embodiment. The thickness of the backed layer 62 is preferably in the range of 0.3 to 2.5 nm for the same reason as the backed layer 61 of the first embodiment.

The backed layer 62 is formed in contact with the first free magnetic layer 41 so that the spin valve thin film magnetic element 3 of this embodiment exhibits the same spin filter effect as the spin valve thin film magnetic element 1 or 2 of the first or second embodiment, increasing the rate of change in magnetoresistance.

Namely, the up-spin conduction electrons moving in the free magnetic layer 40 move to the backed layer 62 to further extend the mean free path of the up-spin conduction electrons. Namely, the spin filter effect can be exhibited, and the difference between the mean free paths is further increased, improving the rate of change in magnetoresistance of the spin valve thin film magnetic element 3 to increase reproduced output.

The spin valve thin film magnetic element 3 is produced by substantially the same method as the spin valve thin film magnetic element 1 or 2 of the first or second embodiment except that the underlying layer 17, the backed layer 62, the first free magnetic layer 41, the nonmagnetic intermediate layer 43, the second free magnetic layer 42, the nonmagnetic conductive layer 29, the second pinned magnetic layer 47, the nonmagnetic layer 48, the first pinned magnetic layer 46, the antiferromagnetic layer 50, and the capping layer 18 are laminated in turn to form a layered film.

The spin valve thin film magnetic element 3 can produce substantially the same effect as the spin valve thin film magnetic element 1 of the first embodiment.

Fourth Embodiment

A fourth embodiment of the present invention will be described below with reference to the drawings.

Figure 18:
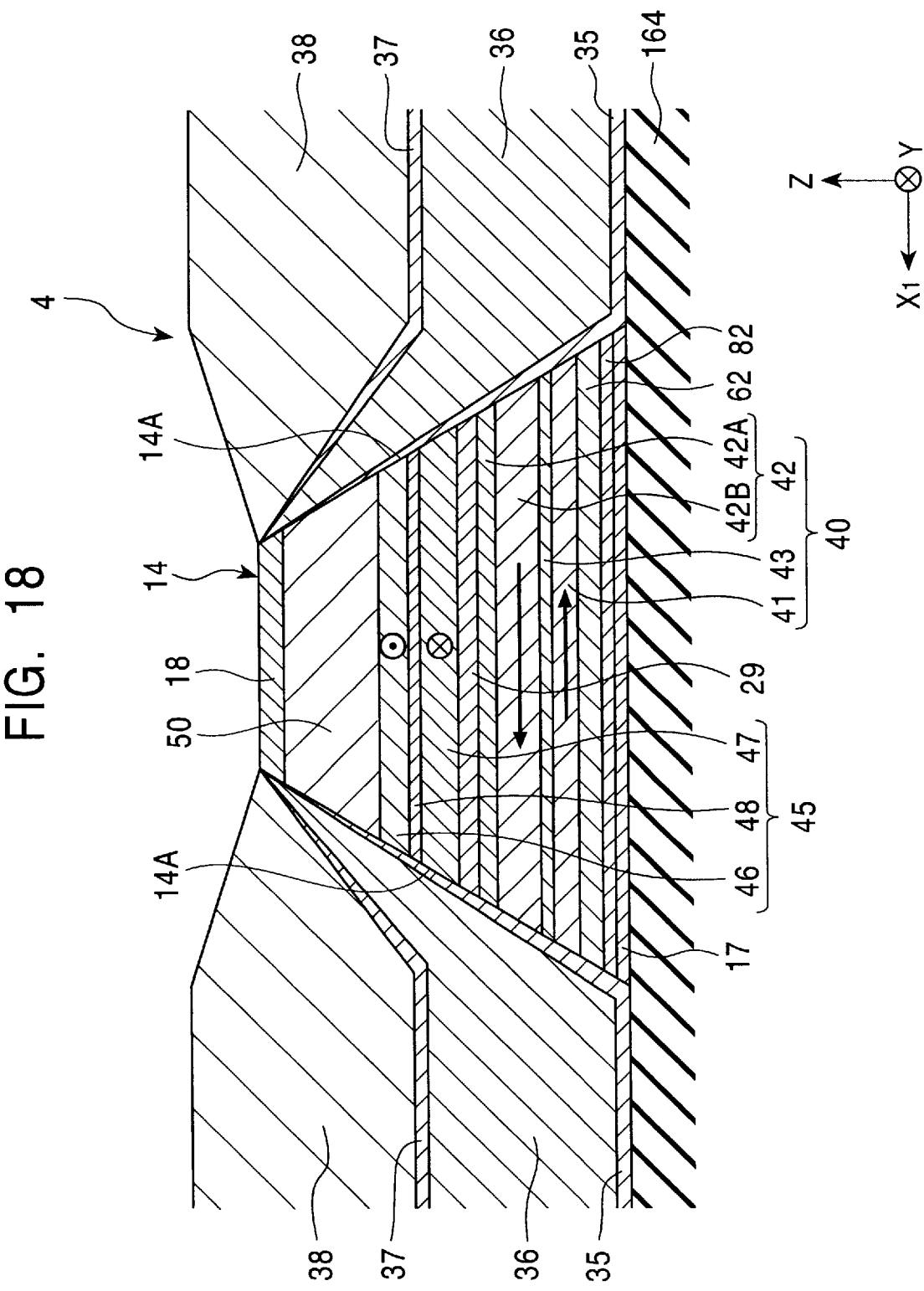
FIG. 18 is a schematic sectional view of a spin valve thin film magnetic element according to a fourth embodiment of the present invention, as viewed from the magnetic recording medium side.
Figure 19:
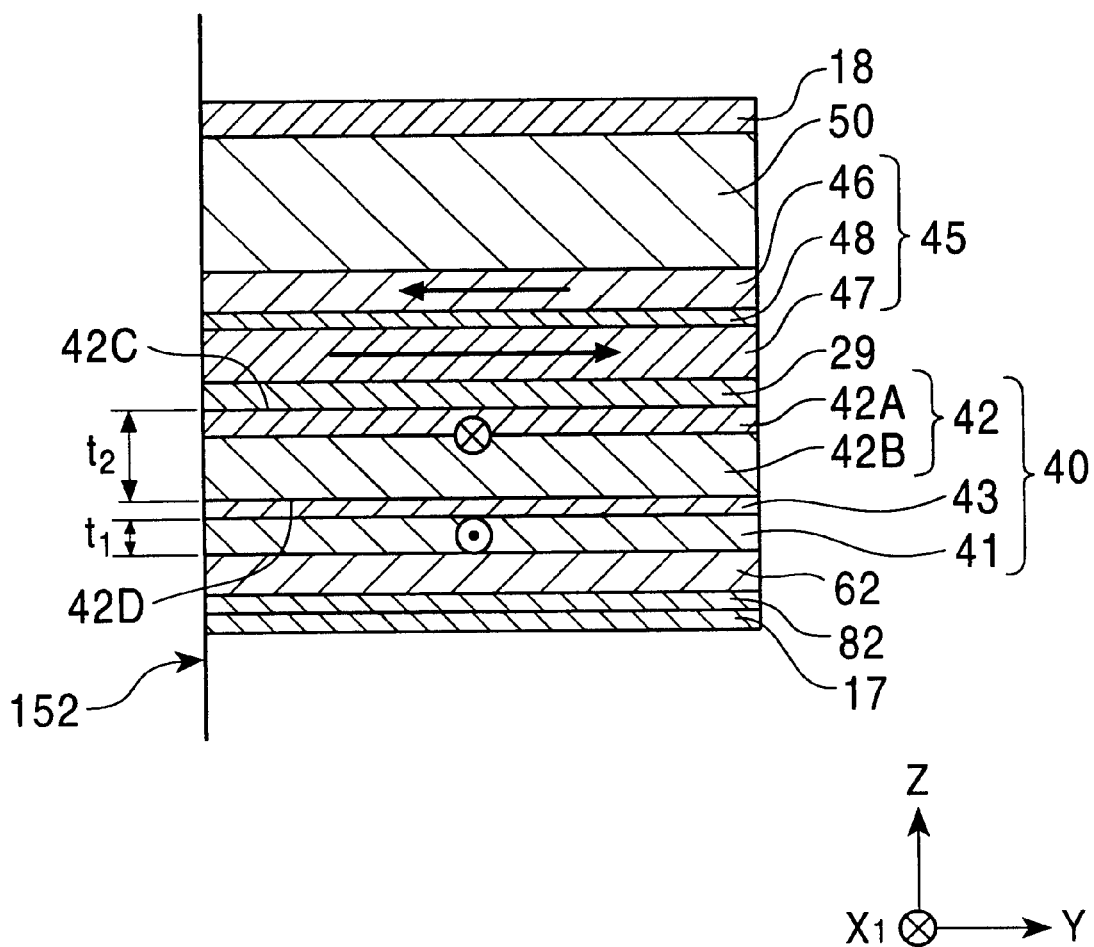
FIG. 19 is a schematic sectional view of the spin valve thin film magnetic element shown in FIG. 18, as viewed from the track width direction.

FIG. 18 is a schematic sectional view of a spin valve thin film magnetic element 4 according to the fourth embodiment of the present invention, as viewed from the magnetic recording medium side, and FIG. 19 is a schematic sectional view of the spin valve thin film magnetic element 4, as viewed from the track width direction.

Of the components shown in FIGS. 18 and 19, the same components as those shown in FIGS. 1, 2, and 14 to 17 are denoted by the same reference numerals as in FIGS. 1, 2, and 14 to 17, and a description thereof is omitted or a brief description thereof is made.

In FIGS. 18 and 19, the Z direction coincides with the movement direction of the magnetic recording medium, the Y direction coincides with the direction of a leakage magnetic field from the magnetic recording medium, and the $X_1$ direction coincides with the track width direction of the spin valve thin film magnetic element 4.

Like the spin valve thin film magnetic element 1 of the first embodiment, the spin valve thin film magnetic element 4 shown in FIGS. 18 and 19 is provided on the thin film magnetic head $h_1$ to constitute a floating magnetic head.

The spin valve thin film magnetic element 4 is a top-type single spin valve thin film magnetic element comprising a free magnetic layer 40, a nonmagnetic conductive layer 29, a pinned magnetic layer 45, and an antiferromagnetic layer 50, which are laminated in turn.

In FIGS. 18 and 19, reference numeral 164 denotes a lower gap layer, and reference numeral 17 denotes an underlying layer laminated on the lower gap layer 164. A protecting layer 82 made of a transition metal is laminated on the underlying layer 17, a backed layer 62 is laminated on the protecting layer 82, the free magnetic layer 40 is laminated on the backed layer 62, and the nonmagnetic conductive layer 29 is laminated on the free magnetic layer 40. The pinned magnetic layer 45 is laminated on the nonmagnetic conductive layer 29, the antiferromagnetic layer 50 is laminated on the pinned magnetic layer 45, and a capping layer 18 is laminated on the antiferromagnetic layer 50.

In this way, the layers from the underlying layer 17 to the capping layer 18 are laminated in turn to form a laminate 14 having a substantially trapezoidal sectional shape having a width corresponding to the track width.

A pair of bias layers 36 are formed on both sides of the laminate 14 in the $X_1$ direction, i.e., both sides in the track width direction. The bias layers 36 are formed to extend from the top of the lower gap layer 164 to both sides 14A of the laminate 14. The bias layers 36 orient the magnetization direction of the free magnetic layer 40 to decrease the Barkhausen noise of the free magnetic layer 40.

Reference numeral 38 denotes a conductive layer. The conductive layers 38 are laminated on the bias layers 36, for applying the sensing current to the laminate 14.

Also, bias underlying layers 35 are provided between the bias layers 36 and the lower gap layer 164, and between the bias layer 36 and both sides 14A of the laminate 14.

Furthermore, intermediate layers 37 are provided between the bias layers 36 and the conductive layers 38.

The bias underlying layers 35, the bias layers 36, the intermediate layers 37 and the conductive layers 38 are made of the same materials as the bias underlying layers 31, the bias layers 32, the intermediate layers 33 and the conductive layers 34 of the first or second embodiment.

The antiferromagnetic layer 50 has a composition equivalent to that of the antiferromagnetic layer of the third embodiment.

The pinned magnetic layer 45 comprises a nonmagnetic layer 48, and first and second pinned magnetic layers 46 and 47 with the nonmagnetic layer 48 provided therebetween. The first pinned magnetic layer 46 is provided in contact with the antiferromagnetic layer 50 on the antiferromagnetic layer 50 side of the nonmagnetic layer 48, and the second pinned magnetic layer 47 is provided in contact with the nonmagnetic conductive layer 29 on the nonmagnetic conductive layer 29 side of the nonmagnetic layer 48.

An exchange coupling magnetic field (exchange anisotropic magnetic field) occurs in the interface between the first pinned magnetic layer 46 and the antiferromagnetic layer 50 to pin the magnetization direction of the first pinned magnetic layer 46 in the direction opposite to the Y direction.

The thickness of the second pinned magnetic layer 47 is larger than that of the first pinned magnetic layer 46.

The magnetization direction of the first pinned magnetic layer 46 is pinned in the direction opposite to the Y direction by the exchange coupling magnetic field with the antiferromagnetic layer 50, and the magnetization direction of the second pinned magnetic layer 47 is pinned in the Y direction by antiferromagnetic coupling with the first pinned magnetic layer 46.

Since the magnetization directions of the first and second pinned magnetic layers 46 and 47 are antiparallel to each other, the magnetic moments of the first and second pinned magnetic layers 46 and 47 are canceled by each other. However, the second pinned magnetic layer 47 has a slightly lager thickness to slightly leave the spontaneous magnetization of the pinned magnetic layer 45, creating the ferrimagnetic state. The spontaneous magnetization is further amplified by the exchange coupling magnetic field with the antiferromagnetic layer 50 to pin the magnetization direction of the pinned magnetic layer 45 in the Y direction.

Each of the first and second pinned magnetic layers 46 and 47 is made of the same ferromagnetic material as the first and second pinned magnetic layers 26 and 27 of the first or second embodiment. The first and second pinned magnetic layers 46 and 47 are preferably made of the same material.

The nonmagnetic layer 48 is made of the same nonmagnetic material as the nonmagnetic layer 28 of the first or second embodiment.

The nonmagnetic conductive layer 29 is made of the same material as the nonmagnetic conductive layer of the first or second embodiment.

As shown in FIGS. 18 and 19, the free magnetic layer 40 comprises a nonmagnetic intermediate layer 43, and first and second free magnetic layer 41 and 42 with the nonmagnetic intermediate layer 43 provided therebetween. The first free magnetic layer 41 is provided on the underlying layer 17 side of the nonmagnetic intermediate layer 43, and the second free magnetic layer 42 is provided on the nonmagnetic conductive layer 29 side of the nonmagnetic intermediate layer 43.

The first free magnetic layer 41 is made the same material as the first free magnetic layer 21 of the first or second embodiment.

The nonmagnetic intermediate layer 43 is made the same nonmagnetic material as the nonmagnetic intermediate magnetic layer 23 of the first or second embodiment.

The second free magnetic layer 42 comprises an anti-diffusion layer 42A and a ferromagnetic layer 42B.

The anti-diffusion layer 42A prevents mutual diffusion between the ferromagnetic layer 42B and the nonmagnetic conductive layer 29, and is made of the same material as the anti-diffusion layer 22A of the first or second embodiment.

The ferromagnetic layer 42B is made of the same ferromagnetic material as the ferromagnetic layer 22B of the first or second embodiment.

The thickness $t_2$ of the second free magnetic layer 42 is larger than the thickness $t_1$ of the first free magnetic layer 41.

The thickness $t_2$ of the second free magnetic layer 42 is preferably in the range of 2.5 to 4.5 nm. The second free magnetic layer 42 having a thickness $t_2$ out of this range is undesirable because the rate of change in magnetoresistance of the spin valve thin film magnetic element 4 cannot be increased.

The thickness $t_1$ of the first free magnetic layer 41 is preferably in the range of 0.5 to 2.5 nm.

Assuming that the saturation magnetizations of the first and second free magnetic layers 41 and 42 are $M_1$ and $M_2$, respectively, the magnetic thicknesses of the first and second free magnetic layers 41 and 42 are $M_1 \cdot t_1$ and $M_2 \cdot t_2$, respectively.

The free magnetic layer 40 is formed to satisfy the relation $M_2 \cdot t_2 > M_1 \cdot t_1$ between the magnetic thicknesses of the first and second free magnetic layers 41 and 42.

Also, the first and second free magnetic layers 41 and 42 are antiferromagnetically coupled with each other. Namely, when the magnetization direction of the second free magnetic layer 42 is oriented in the $X_1$ direction by the bias layers 36, the magnetization direction of the first free magnetic layer 41 is oriented in the direction opposite to the $X_1$ direction.

In this way, the first and second free magnetic layers 41 and 42 are antiferromagnetically coupled with each other so that the magnetization directions thereof are antiparallel to each other, and the magnetic thicknesses have the relation $M_2 \cdot t_2 > M_1 \cdot t_1$. As a result, the first and second free magnetic layers 41 and 42 are brought into the synthetic ferrimagnetic state.

Therefore, the magnetization direction of the free magnetic layer 40 crosses the magnetization direction of the pinned magnetic layer 45.

In the spin valve thin film magnetic element 4, when the magnetization direction of the free magnetic layer 40, which is oriented in the $X_1$ direction, is changed by a leakage magnetic field from the recording medium such as a hard disk or the like, the electric resistance changes with the relation to magnetization of the pinned magnetic layer 45, which is pinned in the Y direction, so that the leakage magnetic field from the recording medium is detected by a change in voltage based on the change in the electric resistance value.

Since the magnetic thicknesses of the first and second free magnetic layers 41 and 42 have the relation $M_2 \cdot t_2 > M_1 \cdot t_1$, the spin flop magnetic field of the free magnetic layer 40 can be increased. Therefore, the magnetic field range in which the free magnetic layer 40 maintains the ferrimagnetic state is widened, and thus the free magnetic layer 40 can stably maintain the ferrimagnetic state.

The backed layer 62 is formed in contact with the side of the free magnetic layer 40 opposite to the side in contact with the nonmagnetic conductive layer 29, i.e., in contact with the first free magnetic layer 41.

The backed layer 62 is made of the same material as the backed layer 61 of the first or second embodiment. The thickness of the backed layer 62 is preferably in the range of 0.3 to 2.5 nm for the same reason as the backed layer 61 of the first embodiment.

The backed layer 62 is formed in contact with the first free magnetic layer 41 so that the spin valve thin film magnetic element 4 of this embodiment exhibits the same spin filter effect as the spin valve thin film magnetic element 1 or 2 of the first or second embodiment, increasing the rate of change in magnetoresistance.

Namely, the up-spin conduction electrons moving in the free magnetic layer 40 move to the backed layer 62 to further extend the mean free path of the up-spin conduction electrons. Namely, the spin filter effect can be exhibited, and the difference between the mean free paths is further increased, improving the rate of change in magnetoresistance of the spin valve thin film magnetic element 4 to increase reproduced output.

Furthermore, the protecting layer 82 made of a transition metal, which does not dissolve in the backed layer 62 and the underlying layer 17, is provided on the side of the backed layer 62 opposite to the side in contact with the first free magnetic layer 41, i.e., between the backed layer 62 and the underlying layer 17.

As the transition metal which forms the protecting layer 82, for example, Hf, Mo, V, Cr, Nb, Ta, and W can be used. These transition metals are elements which do not dissolve in the constituent element Au, Ag, or Cu of the backed layer 62, and the constituent element Ta of the underlying layer 17. By forming the protecting layer 82 of such a transition metal, it is possible to prevent mutual diffusion between the backed layer 62 and the underlying layer 17.

Therefore, the side of the backed layer 62, which is opposite to the side in contact with the first free magnetic layer 41, is not disturbed, and the effective thickness of the backed layer 62 is not decreased. As a result, the mean free path of the up-spin conduction electrons is not shortened, thereby further improving the spin filter effect to increase the rate of change in magnetoresistance of the spin valve thin film magnetic element 4.

The spin valve thin film magnetic element 4 is produced by substantially the same method as the spin valve thin film magnetic element 1 or 2 of the first or second embodiment except that the underlying layer 17, the protecting layer 82, the backed layer 62, the first free magnetic layer 41, the nonmagnetic intermediate layer 43, the second free magnetic layer 42, the nonmagnetic conductive layer 29, the second pinned magnetic layer 47, the nonmagnetic layer 48, the first pinned magnetic layer 46, the antiferromagnetic layer 50, and the capping layer 18 are laminated in turn to form a layered film, and that the bias layer 36 and the conductive layers 37 are formed by the sputtering method using sputtered particles having a wide locus angular distribution.

The spin valve thin film magnetic element 4 can produce substantially the same effect as the spin valve thin film magnetic elements 1 and 2 of the first and the second embodiments.

Fifth Embodiment

A fifth embodiment of the present invention will be described below with reference to the drawings.

Figure 20:
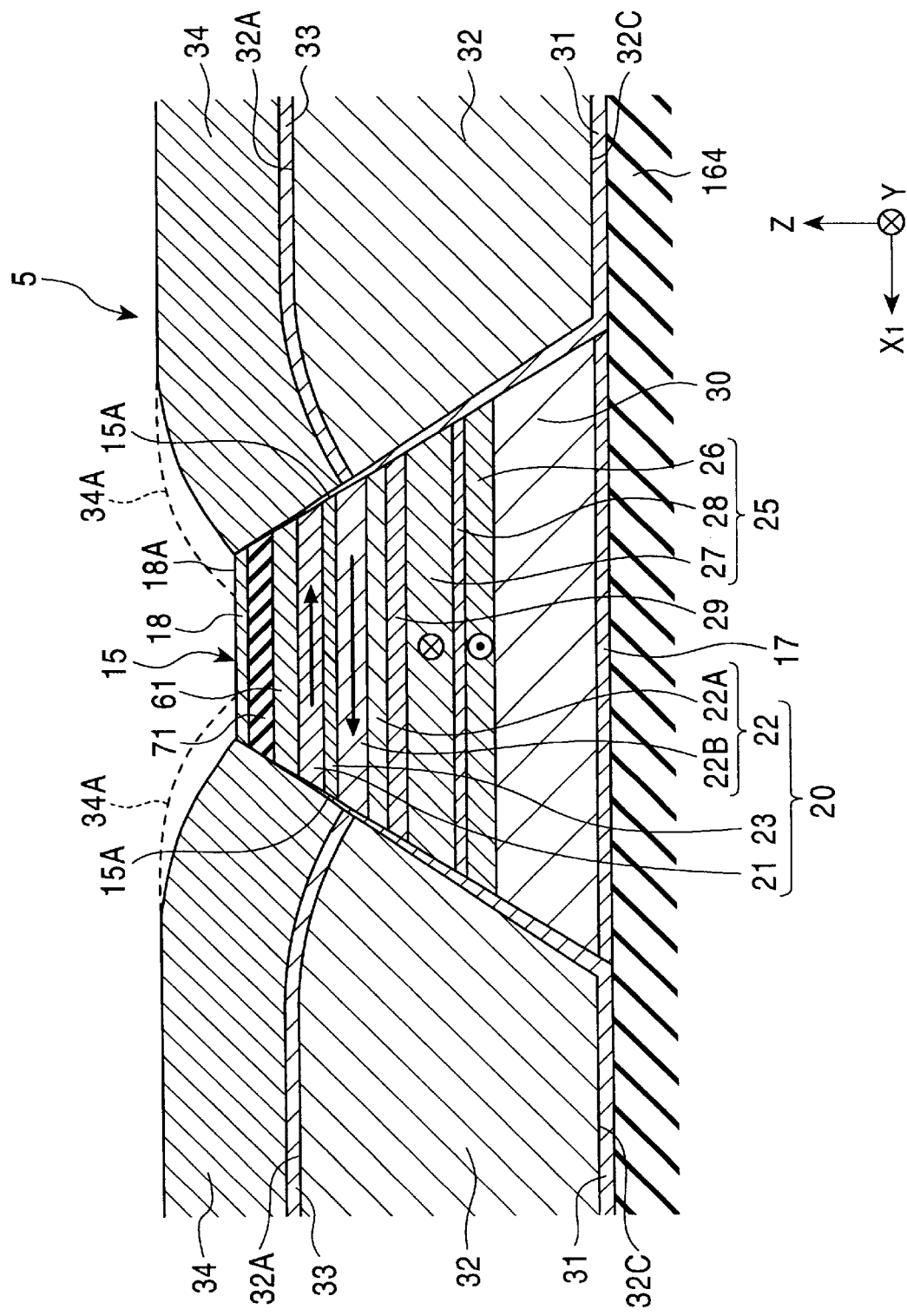
FIG. 20 is a schematic sectional view of a spin valve thin film magnetic element according to a fifth embodiment of the present invention, as viewed from the magnetic recording medium side.
Figure 21:
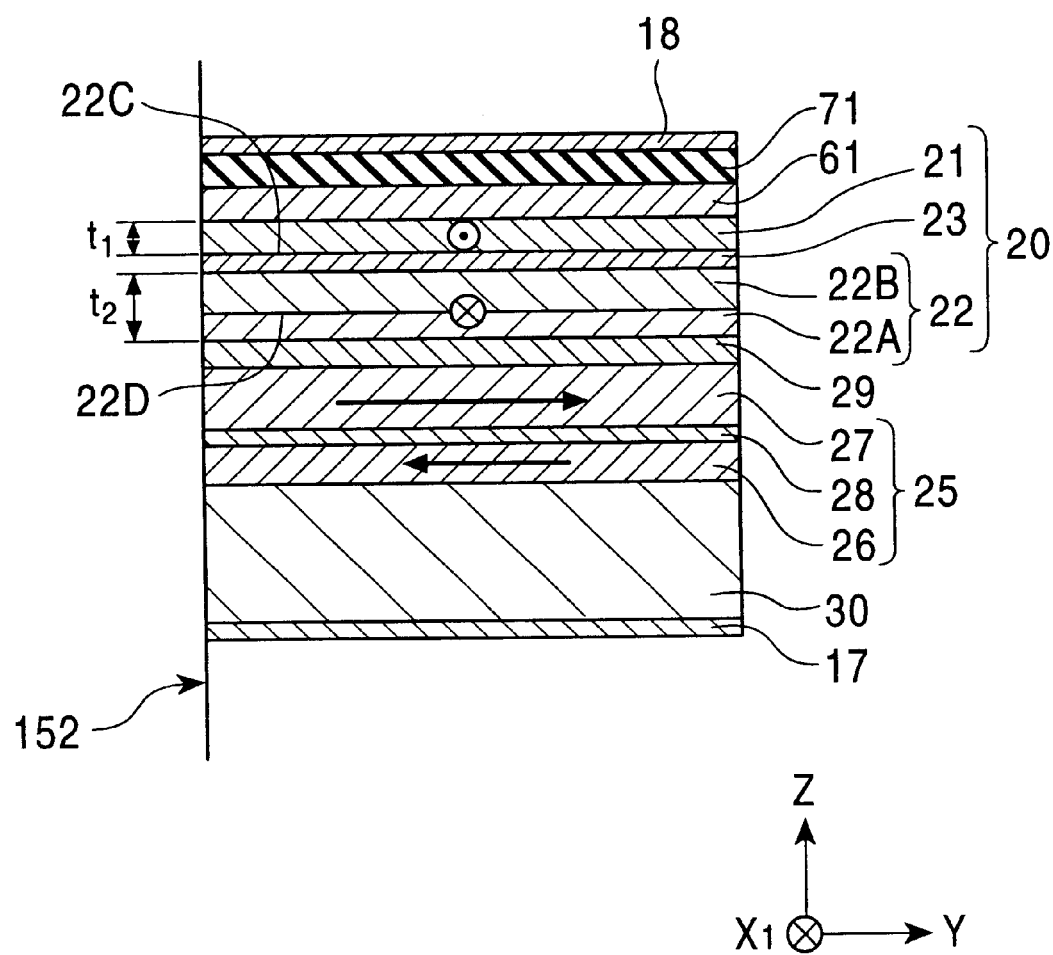
FIG. 21 is a schematic sectional view of the spin valve thin film magnetic element shown in FIG. 20, as viewed from the track width direction.

FIG. 20 is a schematic sectional view of a spin valve thin film magnetic element 5 according to the fifth embodiment of the present invention, as viewed from the magnetic recording medium side, and FIG. 21 is a schematic sectional view of the spin valve thin film magnetic element 5, as viewed from the track width direction.

Of the components shown in FIGS. 20 and 21, the same components as those shown in FIGS. 1, 2, and 14 to 19 are denoted by the same reference numerals as in FIGS. 1, 2, and 14 to 19, and a description thereof is omitted or a brief description thereof is made.

In FIGS. 20 and 21, the Z direction coincides with the movement direction of the magnetic recording medium, the Y direction coincides with the direction of a leakage magnetic field from the magnetic recording medium, and the $X_1$ direction coincides with the track width direction of the spin valve thin film magnetic element 5.

Like the spin valve thin film magnetic element 1 of the first embodiment, the spin valve thin film magnetic element 5 shown in FIGS. 20 and 21 is provided on the thin film magnetic head $h_1$ to constitute a floating magnetic head.

Like the spin valve thin film magnetic element 1 of the first embodiment, the spin valve thin film magnetic element 5 is a bottom-type single spin valve thin film magnetic element comprising an underlying layer 17, an antiferromagnetic layer 30, a pinned magnetic layer 25, a nonmagnetic conductive layer 29, a free magnetic layer 20, a backed layer 61, and a capping layer 18, which are laminated in turn.

The spin valve thin film magnetic element 5 is different from the spin valve thin film magnetic element 1 in that a mirror reflection layer 71 made of an insulating material is formed between the backed layer 61 and the capping layer 18.

In this way, the layers from the underlying layer 17 to the capping layer 18 are laminated in turn to form a laminate 15 having a substantially trapezoidal sectional shape having a width corresponding to the track width.

The free magnetic layer 20 comprises a nonmagnetic intermediate layer 23, and first and second free magnetic layers 21 and 22 with the nonmagnetic intermediate layer 23 provided therebetween.

The pinned magnetic layer 25 comprises a nonmagnetic layer 28, and first and second pinned magnetic layers 26 and 27 with the nonmagnetic layer 28 provided therebetween.

A pair of bias layers 32 are formed on both sides of the laminate 15 in the $X_1$ direction.

The bias layers 32 are butted against both sides 15A of the laminate 15 so as to contact the layer portion in which the layers from the antiferromagnetic layer 30 to the second free magnetic layer 22 are laminated.

Namely, the upper surfaces 32A of the bias layers 32 are butted against the sides 15A of the laminate 15 at any hierarchy position between the upper surface 22C and the lower surface 22D of the second free magnetic layer, and the lower surfaces 32C of the bias layers 32 are butted against the sides 15A of the laminate 15 at the same hierarchy position as the antiferromagnetic layer 30 on the nonmagnetic conductive layer 29 side of the second free magnetic layer 22.

In this way, the bias layers 32 are located at least on both sides of the second free magnetic layer 22 so as to be adjacent to the second free magnetic layer 22, but not the first free magnetic layer 21.

Therefore, the bias magnetic field of each of the bias layers 32 is applied only to the second free magnetic layer 22 to orient the magnetization direction of the second free magnetic layer 22 in the $X_1$ direction. Also, the magnetization direction of the first free magnetic layer 21 is oriented in the direction opposite to the $X_1$ direction.

At this time, since the bias layers 32 are not adjacent to the first free magnetic layer 21, magnetization of the first free magnetic layer 21 is not disturbed by the bias magnetic field of the bias layers 32, and the first free magnetic layer 21 is not put into the multidomain state.

Therefore, the entire free magnetic layer 20 can be put into the single magnetic domain state, thereby decreasing the Barkhausen noise.

Reference numeral 34 denotes a conductive layer made of Cr, Ta, Cu, Au, or the like. The conductive layers 34 are laminated on the bias layers 32.

Namely, the conductive layers 34 are formed to butt against both sides 15A of the laminate 15 at positions above the bias layers 32.

The conductive layers 34 may be formed not only to butt against both sides 15A of the laminate 15 at positions above the bias layers 32 but also to extend from both sides of the surface which defines the laminate 15 on one side in the thickness direction, i.e., the upper surface 18A of the capping layer 18, toward the center thereof so that the conductive layers 34 are adhered to the upper surface to cover the laminate 15, as shown by broken lines 34A.

The conductive layers 34 (34A) are provided for applying a sensing current to the laminate 15.

Particularly, the conductive layers 34A are formed to extend from both sides of the laminate 15 toward the center of the upper surface 18A of the capping layer 18 so that the they are adhered to the surface of the laminate 15, thereby increasing the contact area between the conductive layers 34A and the laminate 15. Therefore, the sensing current can be efficiently supplied to the laminate 15.

The bias underlying layers 31 are provided between the bias layers 32 and the lower gap layer 164, and between the bias layer 32 and the laminate 15. Furthermore, the intermediate layers 33 are provided between the bias layers 32 and the conductive layers 34 (34A).

The antiferromagnetic layer 30 is preferably made of a PtMn alloy. The PtMn alloy has excellent corrosion resistance, a high blocking temperature and a high exchange coupling magnetic field, as compared with a NiMn alloy and FeMn alloy conventionally used for antiferromagnetic layers.

The antiferromagnetic layer 30 has a composition equivalent to that of the antiferromagnetic layer of the first embodiment.

The pinned magnetic layer 25 comprises the nonmagnetic layer 28, and the first and second pinned magnetic layers 26 and 27 with the nonmagnetic layer 28 provided therebetween. The first pinned magnetic layer 26 is provided in contact with the antiferromagnetic layer 30 on the antiferromagnetic layer 30 side of the nonmagnetic layer 28, and the second pinned magnetic layer 27 is provided in contact with the nonmagnetic conductive layer 29 on the nonmagnetic conductive layer 29 side of the nonmagnetic layer 28.

An exchange coupling magnetic field (exchange anisotropic magnetic field) occurs in the interface between the first pinned magnetic layer 26 and the antiferromagnetic layer 30 to pin the magnetization direction of the first pinned magnetic layer 26 in the direction opposite to the Y direction.

The thickness of the second pinned magnetic layer 27 is larger than that of the first pinned magnetic layer 26.

The magnetization direction of the first pinned magnetic layer 26 is pinned in the direction opposite to the Y direction by the exchange coupling magnetic field with the antiferromagnetic layer 30, and the magnetization direction of the second pinned magnetic layer 27 is pinned in the Y direction by antiferromagnetic coupling with the first pinned magnetic layer 26.

Since the magnetization directions of the first and second pinned magnetic layers 26 and 27 are antiparallel to each other, the magnetic moments of the first and second pinned magnetic layers 26 and 27 are canceled by each other. However, the second pinned magnetic layer 27 has a slightly lager thickness to slightly leave the spontaneous magnetization of the pinned magnetic layer 25, creating the ferrimagnetic state. The spontaneous magnetization is further amplified by the exchange coupling magnetic field with the antiferromagnetic layer 30 to pin the magnetization direction of the pinned magnetic layer 25 in the Y direction.

Each of the first and second pinned magnetic layers 26 and 27 is made of the same ferromagnetic material as that of the first and second pinned magnetic layers of the first embodiment.

The nonmagnetic layer 28 is made of the same nonmagnetic material as the nonmagnetic layer of the first embodiment.

The nonmagnetic conductive layer 29 is preferably made of a nonmagnetic material having conductivity, such as Cu, Cr, Au, Ag, or the like, more preferably made of Cu.

As shown in FIGS. 20 and 21, the free magnetic layer 20 comprises the nonmagnetic intermediate layer 23, and the first and second free magnetic layer 21 and 22 with the nonmagnetic intermediate layer 23 provided therebetween. The first free magnetic layer 21 is provided in contact with the backed layer 61 on the backed layer 61 side of the nonmagnetic intermediate layer 23, and the second free magnetic layer 22 is provided in contact with the nonmagnetic conductive layer 29 on the nonmagnetic conductive layer 29 side of the nonmagnetic intermediate layer 23.

The first free magnetic layer 21 and the nonmagnetic intermediate layer 23 are made of the same materials as the first free magnetic layer and the nonmagnetic intermediate layer of the first embodiment.

The second free magnetic layer 22 comprises an anti-diffusion layer 22A and a ferromagnetic layer 22B. The anti-diffusion layer 22A and the ferromagnetic layer 22B are made of the same materials as the anti-diffusion layer and the ferromagnetic layer of the first embodiment.

The thickness $t_2$ of the second free magnetic layer 22 is larger than the thickness $t_1$ of the first free magnetic layer 21.

The thickness $t_2$ of the second free magnetic layer 22 is preferably in the range of 2.5 to 4.5 nm. The second free magnetic layer having a thickness $t_2$ out of this range is undesirable because the rate of change in magnetoresistance of the spin valve thin film magnetic element 5 cannot be increased.

The thickness $t_1$ of the first free magnetic layer 21 is preferably in the range of 0.5 to 2.5 nm.

Assuming that the saturation magnetizations of the first and second free magnetic layers 21 and 22 are $M_1$ and $M_2$, respectively, the magnetic thicknesses of the first and second free magnetic layers 21 and 22 are $M_1 \cdot t_1$ and $M_2 \cdot t_2$, respectively.

The free magnetic layer 20 is formed to satisfy the relation $M_2 \cdot t_2 > M_1 \cdot t_1$ between the magnetic thicknesses of the first and second free magnetic layers 21 and 22.

Also, the first and second free magnetic layers 21 and 22 are antiferromagnetically coupled with each other. Namely, when the magnetization direction of the second free magnetic layer 22 is oriented in the $X_1$ direction by the bias layers 32, the magnetization direction of the first free magnetic layer 21 is oriented in the direction opposite to the $X_1$ direction.

Since the magnetic thicknesses of the first and second free magnetic layers 21 and 22 have the relation $M_2 \cdot t_2 > M_1 \cdot t_1$, the magnetization of the second free magnetic layer 22 remains to orient the magnetization direction of the entire free magnetic layer 20 in the $X_1$ direction. In this case, the effective thickness of the free magnetic layer 20 is $(M_2 \cdot t_2 - M_1 \cdot t_1)$.

In this way, the first and second free magnetic layers 21 and 22 are antiferromagnetically coupled with each other so that the magnetization directions thereof are antiparallel to each other, and the magnetic thicknesses have the relation $M_2 \cdot t_2 > M_1 \cdot t_1$. As a result, the first and second free magnetic layers 21 and 22 are brought into the synthetic ferrimagnetic state.

Therefore, the magnetization direction of the free magnetic layer 20 crosses the magnetization direction of the pinned magnetic layer 25.

Since the magnetic thicknesses of the first and second free magnetic layers 21 and 22 have the relation $M_2 \cdot t_2 > M_1 \cdot t_1$, the spin flop magnetic field of the free magnetic layer 20 can be increased. Therefore, the magnetic field range in which the free magnetic layer 20 maintains the ferrimagnetic state is widened, and thus the free magnetic layer 20 can stably maintain the ferrimagnetic state.

In the spin valve thin film magnetic element 5, when the magnetization direction of the free magnetic layer 20, which is oriented in the $X_1$ direction, is changed by a leakage magnetic field from the recording medium such as a hard disk or the like, the electric resistance changes with the relation to magnetization of the pinned magnetic layer 25, which is pinned in the Y direction, so that the leakage magnetic field from the recording medium is detected by a change in voltage based on the change in the electric resistance value.

The backed layer 61 is formed in contact with the side of the free magnetic layer 20 opposite to the side in contact with the nonmagnetic conductive layer 29, i.e., in contact with the first free magnetic layer 21.

The backed layer 61 is made of the same material as the backed layer of the first embodiment. Like in the first embodiment, the thickness of the backed layer 61 is preferably in the range of 0.3 to 2.5 nm.

Furthermore, the mirror reflecting layer 71 made of an insulating material is provided on the side of the backed layer 61 opposite to the side in contact with the first free magnetic layer 21, i.e., between the backed layer 61 and the capping layer 18.

Examples of the insulating material which constitutes the mirror reflecting layer 71 include oxides such as $Fe_2O_3$, NiO, CoO, Co—Fe—O, Co—Fe—Ni—O, $Al_2O_3$, Al—X—O (X=B, Si, N, Ti, V, Cr, Mn, Fe, Co, or Ni), T-O (T=Ti, V, Cr, Zr, Nb, Mo, Hf, Ta, or W), and the like, nitrides such as Al—N, Al-D-N (D=B, Si, O, Ti, V, Cr, Mn, Fe, Co, or Ni), L-N (L=Ti, V, Cr, Zr, Nb, Mo, Hf, Ta, or W), and the like.

In the spin valve thin film magnetic element 5, the rate of change in magnetoresistance can be significantly improved by the synergetic effect of the spin filter effect of the backed layer 61 and the mirror reflecting effect of the mirror reflecting layer 71.

The spin filter effect of the backed layer 61 is the same as the spin filter effect described in the first embodiment.

Namely, the up-spin conduction electrons moving from the nonmagnetic conductive layer 29 to the free magnetic layer 20 can be moved to the backed layer 61, thereby extending the mean free path of the up-spin conduction electrons.

Also, the mirror reflecting layer 71 forms a potential barrier in the interface between the backed layer 61 and the mirror reflecting layer 71 to reflect the up-spin conduction electrons moving in the backed layer 61 while maintaining the spin direction thereof at the interface between the backed layer 61 and the mirror reflecting layer 71, thereby further extending the mean free path of the up-spin conduction electrons. Namely, the so-called mirror reflecting effect is exhibited.

Figure 22:
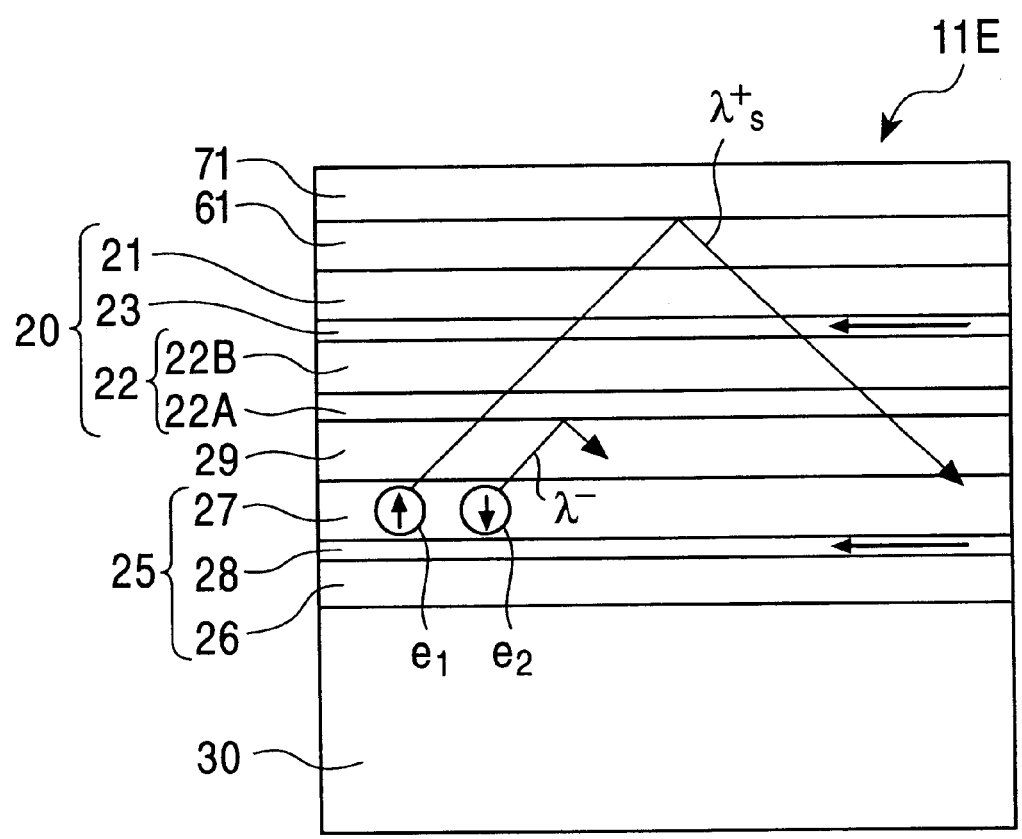
FIG. 22 is a schematic drawing illustrating the operation of a spin valve thin film magnetic element comprising a backed layer and a mirror reflecting layer.

This is schematically illustrated in FIG. 22.

FIG. 22 shows a laminate 11E in which the antiferromagnetic layer 30, the pinned magnetic layer 25 (the first pinned magnetic layer 26, the nonmagnetic layer 28, and the second pinned magnetic layer 27), the nonmagnetic conductive layer 29, the free magnetic layer 20 (the second free magnetic layer 22 (the anti-diffusion layer 22A and the ferromagnetic layer 22B), the nonmagnetic intermediate layer 23, the first pinned magnetic layer 21), the backed layer 61 and the mirror reflecting layer 71 are laminated in turn.

In FIG. 22, the magnetization direction of the free magnetic layer 20 is oriented in the leftward direction by the external magnetic field, and the magnetization direction of the pinned magnetic layer 25 is pinned in the leftward direction by the exchange coupling magnetic field with the antiferromagnetic layer 30.

When the sensing current is passed through the laminate 11E shown in FIG. 22, the conduction electrons mainly move in the nonmagnetic conductive layer 29 having low electric resistance. The conduction electrons include two types of conduction electrons including up-spin and down-spin conduction electrons which are substantially stochastically equivalent in amount. In FIG. 22, the up-spin conduction electrons are denoted by reference character $e_1$, and the down-spin conduction electrons are denoted by reference character $e_2$.

The up-spin conduction electrons $e_1$ quite possibly move from the nonmagnetic conductive layer 29 to the backed layer 61 through the free magnetic layer 20 when the magnetization directions of the pinned magnetic layer 25 and the free magnetic layer 20 are made parallel to each other by the external magnetic field.

Therefore, by laminating the backed layer 61, the mean free path of the up-spin conduction electrons $e_1$ becomes longer that the case in which the backed layer is not laminated.

The up-spin conduction electrons $e_1$ further move to the interface between the backed layer 61 and the mirror reflecting layer 71, and are mirror-reflected by the mirror reflecting layer 71, which forms the potential barrier, while maintaining the spin state to move again in the backed layer 61 and the free magnetic layer 20.

In this way, the up-spin electrons e1 pass through the free magnetic layer 20 and the backed layer 61 two times each to significantly increase the mean free path to $\lambda^+_s$.

In this case, the mean free path ($\lambda^+_s$) is about twice as long as the mean free path ($\lambda^+$) of the up-spin conduction electrons shown in FIG. 6.

On the other hand, the down-spin conduction electrons $e_2$ have the high probability that they are always scattered in the interface between the nonmagnetic conductive layer 29 and the free magnetic layer 20 (the second free magnetic layer 22), and maintained in a state where the probability of movement to the fee magnetic layer 20 is low, and the mean free path ($\lambda^-$) remains shorter than the mean free path ($\lambda^+$) of the up-spin conduction electrons $e_1$.

In this way, the mean free path ($\lambda^+$) of the up-spin conduction electrons $e_1$ is longer than the mean free path ($\lambda^-$) of the down-spin conduction electrons $e_2$ due to the action of the external magnetic field to increase the difference ($\lambda^+-\lambda^-$) between the paths, thereby increasing the rate of change in magnetoresistance of the laminate 11E.

Particularly, the mean free path ($\lambda^+_s$) of the up-spin conduction electrons $e_1$ of the laminate 11E shown in FIG. 11 is about twice as long as the mean free path ($\lambda^+$) of the laminate 11B shown in FIG. 6 to increase the ($\lambda^+_s-\lambda^-$) between the paths, thereby significantly increasing the rate of change in magnetoresistance.

In this way, the spin valve thin film magnetic element 5 of this embodiment comprises the backed layer 61 and the mirror reflecting layer 71, and can thus exhibit the spin filter effect and the mirror reflecting effect at the same time. Therefore, the mean free path of the up-spin conduction electrons $e_1$ can be significantly increased to increase the difference between the mean free paths of the up-spin electrons $e_1$ and down-spin conduction electrons $e_2$, thereby significantly improving the rate of change in magnetoresistance of the spin valve thin film magnetic element 5.

The spin valve thin film magnetic element 5 is produced by the same method as the spin valve thin film magnetic element 1 except that the underlying layer 17, the antiferromagnetic layer 30, the first pinned magnetic layer 26, the nonmagnetic layer 28, the second pinned magnetic layer 27, the nonmagnetic conductive layer 29, the second free magnetic layer 22, the nonmagnetic intermediate layer 23, the first free magnetic layer 21, the backed layer 61, the mirror reflecting layer 71, and the capping layer 18 are laminated in turn to form a layered film.

The spin valve thin film magnetic element 5 exhibits not only the same effect as the spin valve thin film magnetic element 1 of the first embodiment, but also the following effect.

The spin valve thin film magnetic element 5 can exhibit the spin filter effect and the mirror reflecting effect at the same time to significantly extend the mean free path of the up-spin conduction electrons $e_1$, thereby increasing the difference between the mean free paths of the up-spin conduction electrons $e_1$ and down-spin conduction electrons $e_2$. Therefore, the rate of change in magnetoresistance of the spin valve thin film magnetic element 5 can be significantly improved.

Therefore, the spin valve thin film magnetic element 5 can exhibit an improvement in the sensitivity to the external magnetic field due to the synthetic ferrimagnetic free layer (the free magnetic layer 20), and an improvement in the rate of change in magnetoresistance due to the spin filter effect and the mirror reflecting effect.

Sixth Embodiment

A sixth embodiment of the present invention will be described below with reference to the drawings.

Figure 23:
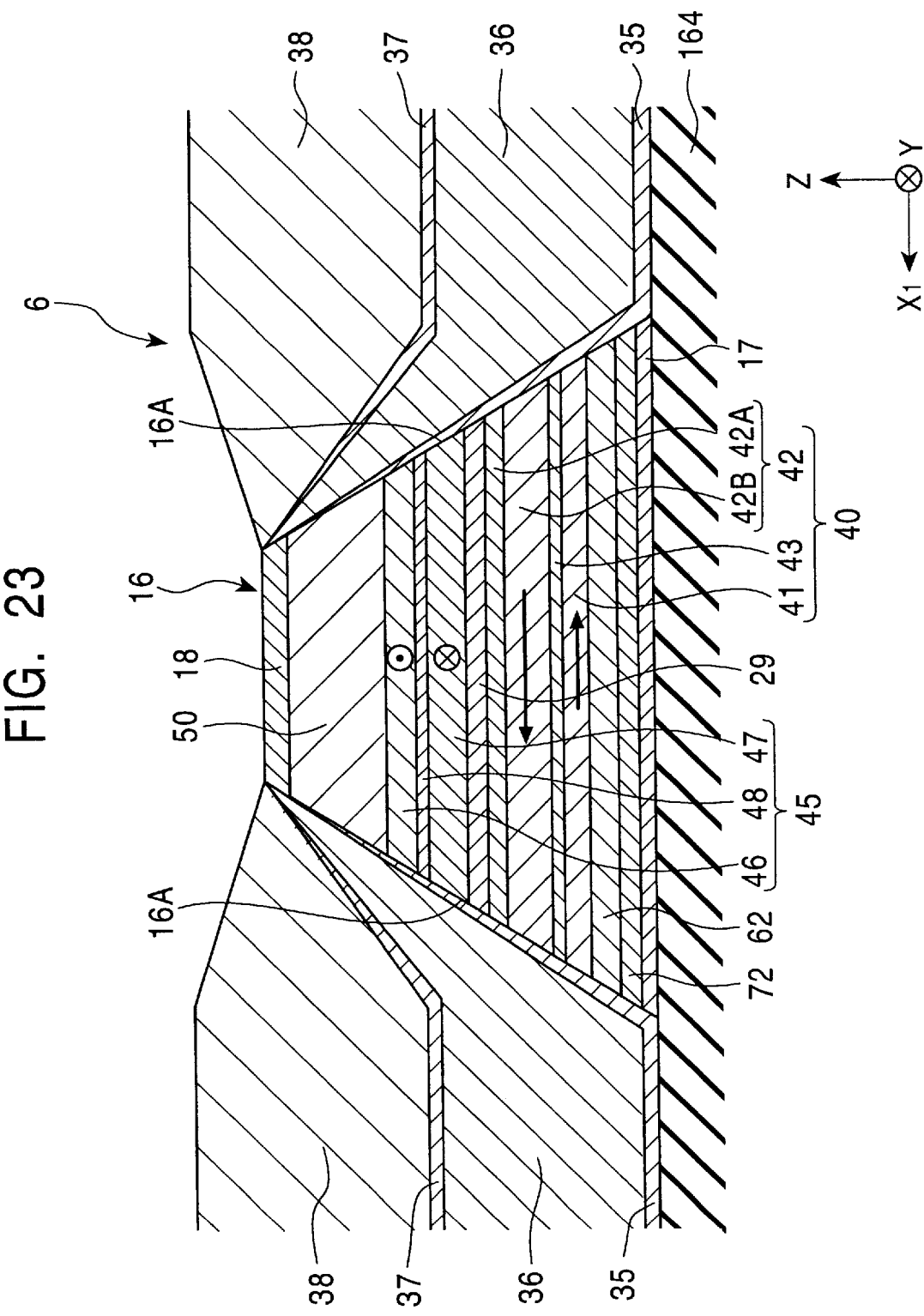
FIG. 23 is a schematic sectional view of a spin valve thin film magnetic element according to a sixth embodiment of the present invention, as viewed from the magnetic recording medium side.
Figure 24:
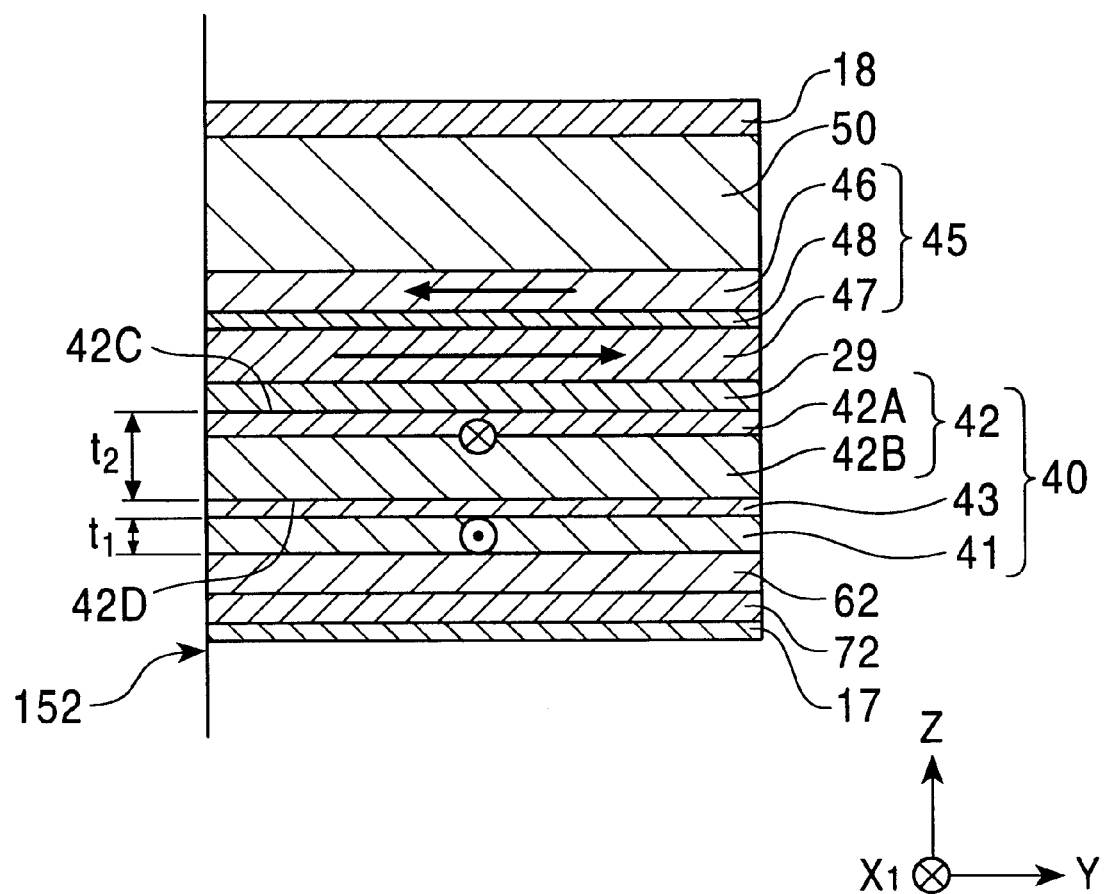
FIG. 24 is a schematic sectional view of the spin valve thin film magnetic element shown in FIG. 23, as viewed from the track width direction.

FIG. 23 is a schematic sectional view of a spin valve thin film magnetic element 6 according to the sixth embodiment of the present invention, as viewed from the magnetic recording medium side, and FIG. 24 is a schematic sectional view of the spin valve thin film magnetic element 6, as viewed from the track width direction.

Of the components shown in FIGS. 23 and 24, the same components as those shown in FIGS. 1, 2, and 14 to 21 are denoted by the same reference numerals as in FIGS. 1, 2, and 14 to 21, and a description thereof is omitted or a brief description thereof is made.

In FIGS. 23 and 24, the Z direction coincides with the movement direction of the magnetic recording medium, the Y direction coincides with the direction of a leakage magnetic field from the magnetic recording medium, and the $X_1$ direction coincides with the track width direction of the spin valve thin film magnetic element 6.

Like the spin valve thin film magnetic element 1 of the first embodiment, the spin valve thin film magnetic element 6 shown in FIGS. 23 and 24 is provided on the thin film magnetic head $h_1$ to constitute a floating magnetic head.

The spin valve thin film magnetic element 6 of this embodiment is a top-type single spin valve thin film magnetic element comprising a free magnetic layer 40, a nonmagnetic conductive layer 29, a pinned magnetic layer 45, and an antiferromagnetic layer 50, which are laminated in turn.

In FIG. 23, reference numeral 164 denotes a lower gap layer, and reference numeral 17 denotes an underlying layer laminated on the lower gap layer 164. A mirror reflecting layer 72 comprising a nonmagnetic insulating layer is laminated on the underlying layer 17, a backed layer 62 is laminated on the mirror reflecting layer 72, the free magnetic layer 40 is laminated on the backed layer 62, and the nonmagnetic conductive layer 29 is laminated on the free magnetic layer 40. The pinned magnetic layer 45 is laminated on the nonmagnetic conductive layer 29, the antiferromagnetic layer 50 is laminated on the pinned magnetic layer 45, and a capping layer 18 is laminated on the antiferromagnetic layer 50.

In this way, the layers from the underlying layer 17 to the capping layer 18 are laminated in turn to form a laminate 16 having a substantially trapezoidal sectional shape having a width corresponding to the track width.

A pair of bias layers 36 are formed on both sides of the laminate 16 in the $X_1$ direction, i.e., both sides in the track width direction. The bias layers 32 are formed to extend from the lower gap layer 164 to both sides 16A of the laminate 16. The bias layers 36 orient the magnetization direction of the free magnetic layer 40 to decrease the Barkhausen noise of the free magnetic layer 40.

Reference numeral 38 denotes a conductive layer. The conductive layers 38 are laminated on the bias layers 36 to apply a sensing current to the laminate 16.

Bias underlying layers 35 are provided between the bias layers 36 and the lower gap layer 164, and between the bias layer 36 and both sides 16A of the laminate 16.

Furthermore, intermediate layers 37 are provided between the bias layers 36 and the conductive layers 38.

The bias underlying layers 35, the bias layers 36, the intermediate layers 37 and the conductive layers 38 are made of the same materials as the bias underlying layers 31, the bias layers 32, the intermediate layers 33 and the conductive layers 34 of the first or second embodiment.

The antiferromagnetic layer 50 is preferably made of a PtMn alloy. The PtMn alloy has excellent corrosion resistance, a high blocking temperature and a high exchange coupling magnetic field, as compared with a NiMn alloy and FeMn alloy conventionally used for antiferromagnetic layers.

The antiferromagnetic layer 50 has a composition equivalent to that of the antiferromagnetic layer of the third embodiment.

The pinned magnetic layer 45 comprises a nonmagnetic layer 48, and first and second pinned magnetic layers 46 and 47 with the nonmagnetic layer 48 provided therebetween. The first pinned magnetic layer 46 is provided in contact with the antiferromagnetic layer 50 on the antiferromagnetic layer 50 side of the nonmagnetic layer 48, and the second pinned magnetic layer 47 is provided in contact with the nonmagnetic conductive layer 29 on the nonmagnetic conductive layer 29 side of the nonmagnetic layer 48.

An exchange coupling magnetic field (exchange anisotropic magnetic field) occurs in the interface between the first pinned magnetic layer 46 and the antiferromagnetic layer 50 to pin the magnetization direction of the first pinned magnetic layer 46 in the direction opposite to the Y direction.

The thickness of the second pinned magnetic layer 47 is larger than that of the first pinned magnetic layer 46.

The magnetization direction of the first pinned magnetic layer 46 is pinned in the direction opposite to the Y direction by the exchange coupling magnetic field with the antiferromagnetic layer 50, and the magnetization direction of the second pinned magnetic layer 47 is pinned in the Y direction by antiferromagnetic coupling with the first pinned magnetic layer 46.

Since the magnetization directions of the first and second pinned magnetic layers 46 and 47 are antiparallel to each other, the magnetic moments of the first and second pinned magnetic layers 46 and 47 are canceled by each other. However, the second pinned magnetic layer 47 has a slightly lager thickness to slightly leave the spontaneous magnetization of the pinned magnetic layer 45, creating the ferrimagnetic state. The spontaneous magnetization is further amplified by the exchange coupling magnetic field with the antiferromagnetic layer 50 to pin the magnetization direction of the pinned magnetic layer 45 in the Y direction.

Each of the first and second pinned magnetic layers 46 and 47 is made of the same ferromagnetic material as that of the first and second pinned magnetic layers 26 and 27 of the first or second first embodiment. The first and second pinned magnetic layers 46 and 47 are preferably made of the same material.

The nonmagnetic layer 48 is made of the same nonmagnetic material as the nonmagnetic layer 28 of the first or second embodiment.

The nonmagnetic conductive layer 29 is made of the same material as the nonmagnetic conductive layer of the first or second embodiment.

As shown in FIGS. 23 and 24, the free magnetic layer 40 comprises a nonmagnetic intermediate layer 43, and first and second free magnetic layer 41 and 42 with the nonmagnetic intermediate layer 43 provided therebetween. The first free magnetic layer 41 is provided on the underlying layer 17 side of the nonmagnetic intermediate layer 43, and the second free magnetic layer 42 is provided on the nonmagnetic conductive layer 29 side of the nonmagnetic intermediate layer 43.

The first free magnetic layer 41 is made of the same material as the first free magnetic layer 21 of the first or second embodiment.

Also the nonmagnetic intermediate layer 43 are made of the same nonmagnetic material as the nonmagnetic intermediate layer 23 of the first or second embodiment.

The second free magnetic layer 42 comprises an anti-diffusion layer 42A and a ferromagnetic layer 42B. The anti-diffusion layer 42A prevents mutual diffusion between the ferromagnetic layer 42B and the nonmagnetic conductive layer 29, and is made of the same material as the anti-diffusion layer 22A of the first or second embodiment.

Also the ferromagnetic layer 42B is made of the same ferromagnetic material as the ferromagnetic layer 22B of the first or second embodiment.

The thickness $t_2$ of the second free magnetic layer 42 is larger than the thickness $t_1$ of the first free magnetic layer 41.

The thickness $t_2$ of the second free magnetic layer 42 is preferably in the range of 2.5 to 4.5 nm. The second free magnetic layer having a thickness $t_2$ out of this range is undesirable because the rate of change in magnetoresistance of the spin valve thin film magnetic element 6 cannot be increased.

The thickness $t_1$ of the first free magnetic layer 41 is preferably in the range of 0.5 to 2.5 nm.

Assuming that the saturation magnetizations of the first and second free magnetic layers 41 and 42 are $M_1$ and $M_2$, respectively, the magnetic thicknesses of the first and second free magnetic layers 41 and 42 are $M_1 \cdot t_1$ and $M_2 \cdot t_2$, respectively.

The free magnetic layer 40 is formed to satisfy the relation $M_2 \cdot t_2 > M_1 \cdot t_1$ between the magnetic thicknesses of the first and second free magnetic layers 41 and 42.

Also, the first and second free magnetic layers 41 and 42 are antiferromagnetically coupled with each other. Namely, when the magnetization direction of the second free magnetic layer 42 is oriented in the $X_1$ direction by the bias layers 36, the magnetization direction of the first free magnetic layer 41 is oriented in the direction opposite to the $X_1$ direction.

In this way, the first and second free magnetic layers 41 and 42 are antiferromagnetically coupled with each other so that the magnetization directions thereof are antiparallel to each other, and the magnetic thicknesses have the relation $M_2 \cdot t_2 > M_1 \cdot t_1$. As a result, the first and second free magnetic layers 41 and 42 are brought into the synthetic ferrimagnetic state.

In the spin valve thin film magnetic element 6, when the magnetization direction of the free magnetic layer 40, which is oriented in the $X_1$ direction, is changed by a leakage magnetic field from the recording medium such as a hard disk or the like, the electric resistance changes with the relation to magnetization of the pinned magnetic layer 45, which is pinned in the Y direction, so that the leakage magnetic field from the recording medium is detected by a change in voltage based on the change in the electric resistance value.

Since the magnetic thicknesses of the first and second free magnetic layers 41 and 42 have the relation $M_2 \cdot t_2 > M_1 \cdot t_1$, the spin flop magnetic field of the free magnetic layer 40 can be increased. Therefore, the magnetic field range in which the free magnetic layer 40 maintains the ferrimagnetic state is widened, and thus the free magnetic layer 40 can stably maintain the ferrimagnetic state.

The backed layer 62 is formed in contact with the side of the free magnetic layer 40 opposite to the side in contact with the nonmagnetic conductive layer 29, i.e., in contact with the first free magnetic layer 41.

The backed layer 62 is made of the same material as the backed layer 61 of the first or second embodiment. For the same reason as the backed layer 61 of the first or second embodiment, the thickness of the backed layer 62 is preferably in the range of 0.3 to 2.5 nm.

Furthermore, the mirror reflecting layer 72 made of an insulating material is provided on the side of the backed layer 62 opposite to the side in contact with the first free magnetic layer 41, i.e., between the backed layer 62 and the underlying layer 17.

The mirror reflecting layer 72 is made of the same material as the mirror reflecting layer 71 of the fifth embodiment.

Like in the fifth embodiment, in the spin valve thin film magnetic element 6, the rate of change in magnetoresistance can be significantly improved by the synergetic effect of the spin filter effect of the backed layer 62 and the mirror reflecting effect of the mirror reflecting layer 72.

The spin filter effect of the backed layer 62 is the same as the spin filter effect the spin valve thin film magnetic element 1 of the first embodiment.

Namely, the up-spin conduction electrons moving from the nonmagnetic conductive layer 29 to the free magnetic layer 40 can be moved to the backed layer 62, thereby extending the mean free path of the up-spin conduction electrons.

Also, the mirror reflecting layer 72 forms a potential barrier in the interface between the backed layer 62 and the mirror reflecting layer 72 to reflect the up-spin conduction electrons moving in the backed layer 62 while maintaining the spin direction thereof at the interface between the backed layer 62 and the mirror reflecting layer 72, thereby further extending the mean free path of the up-spin conduction electrons. Namely, the so-called mirror reflecting effect is exhibited.

In this way, like the spin valve thin film magnetic element 5 of the fifth embodiment, the spin valve thin film magnetic element 6 of this embodiment comprises the backed layer 62 and the mirror reflecting layer 72, and can thus exhibit the spin filter effect and the mirror reflecting effect at the same time. Therefore, the mean free path of the up-spin conduction electrons can be significantly extended to increase the difference between the mean free paths of the up-spin electrons and down-spin conduction electrons, thereby significantly improving the rate of change in magnetoresistance of the spin valve thin film magnetic element 6.

The spin valve thin film magnetic element 6 is produced by substantially the same method as the spin valve thin film magnetic element 1 or 2 of the first or second embodiment except that the underlying layer 17, the mirror reflecting layer 72, the backed layer 62, the first free magnetic layer 41, the nonmagnetic intermediate layer 43, the second free magnetic layer 42, the nonmagnetic conductive layer 29, the second pinned magnetic layer 47, the nonmagnetic layer 48, the first pinned magnetic layer 46, the antiferromagnetic layer 50, and the capping layer 18 are laminated in turn to form a layered film, and that the bias layers 36 and the conductive layers 37 are formed by the sputtering method using sputtered particles having a wide locus angular distribution.

The spin valve thin film magnetic element 6 can produce substantially the same effect as the spin valve thin film magnetic element 5 of the fifth embodiment.

As described above, the spin valve thin film magnetic element of the present invention comprises a backed layer laminated on a second free magnetic layer so that up-spin conduction electrons can move from the free magnetic layer to the backed layer to extend the mean free path of the up-spin conduction electrons, i.e., exhibit the so-called spin filter effect. Therefore, the rate of change in magnetoresistance can be increased.

Also, the spin valve thin film magnetic element of the present invention comprises a free magnetic layer comprising first and second free magnetic layers which are brought into the ferrimagnetic state with a nonmagnetic intermediate layer provided therebetween, i.e., the so-called synthetic ferrimagnetic free layer. Therefore, the magnetization direction of the entire free magnetic layer can be changed with an external magnetic field of small magnitude. In addition, the thickness of the free magnetic layer is not excessively decreased, thereby increasing the sensitivity of the spin valve thin film magnetic element.

Furthermore, the spin valve thin film magnetic element of the present invention comprises a backed layer and a mirror reflecting layer so that the spin filter effect and the mirror reflecting effect can be exhibited at the same time, and the mean free path of up-spin conduction electrons can be significantly extended to increase the difference between the mean free paths of the up-spin and down-spin conduction electrons. Therefore, the rate of change in magnetoresistance of the spin valve thin film magnetic element can be significantly improved.

Therefore, the spin valve thin film magnetic element of the present invention can exhibit an improvement in the sensitivity to the external magnetic field due to the synthetic ferrimagnetic free layer, and an improvement in the rate of change in magnetoresistance due to the spin filter effect at the same time.

The spin valve thin film magnetic element of the present invention can also exhibit an improvement in the sensitivity to the external magnetic field due to the synthetic ferrimagnetic free layer, and an improvement in the rate of change in magnetoresistance due to the spin filter effect and the mirror reflecting effect at the same time.

In the spin valve thin film magnetic element of the present invention, the bias layers are formed to be located in the hierarchy portion on the nonmagnetic conductive layer side of the second free magnetic layer, and adjacent to the second free magnetic layer, not the first free magnetic layer. Therefore, the magnetization of the first free magnetic layer, which is exhibited by antiferromagnetic coupling with the second free magnetic layer, is not disturbed by the bias magnetic field of bias layers, and the first free magnetic layer is not put into the multidomain state, thereby decreasing the Barkhausen noise of the spin valve thin film magnetic element.

Furthermore, the surfaces of the bias layers on one side in the thickness direction are butted against the sides of the laminate at any hierarchy position between the two surfaces of the free magnetic layer, which define the free magnetic layer in the thickness direction. Therefore, the bipolar magnetic field of the bias layers is not applied to the first and second free magnetic layers, and the second free magnetic layer is not put into the multidomain state, thereby decreasing the Barkhausen noise of the spin valve thin film magnetic element.

What is claimed is:

1. A spin valve thin film magnetic element comprising a laminate comprising an antiferromagnetic layer, a pinned magnetic layer provided in contact with the antiferromagnetic layer so that the magnetization direction is pinned by an exchange coupling magnetic field with the antiferromagnetic layer, a nonmagnetic conductive layer provided in contact with the pinned magnetic layer, a second free magnetic layer provided in contact with the nonmagnetic conductive layer, a nonmagnetic intermediate layer provided in contact with the second free magnetic layer, a first free magnetic layer provided in contact with the nonmagnetic intermediate layer and antiferromagnetically coupled with the second free magnetic layer to form a ferrimagnetic state together with the second free magnetic layer, and a backed layer provided in contact with the first free magnetic layer and having higher conductivity than the first free magnetic layer, and further comprising a pair of bias layers provided adjacent to the second free magnetic layer on two sides of the laminate, for orienting the magnetization direction of the second free magnetic layer;

wherein a pair of surfaces on one of the sides of the pair of bias layers in the thickness direction are adjacent to the sides of the laminate at any hierarchy position between the two surfaces which define the second free magnetic layer in the thickness direction, and a pair of second surfaces on the other side of the pair of bias layers in the thickness direction are adjacent to the sides of the laminate at a hierarchy position at least on the nonmagnetic conductive layer side of the second free magnetic layer.

2. A spin valve thin film magnetic element according to claim 1, wherein the thickness of the second free magnetic layer provided in contact with the nonmagnetic conductive layer is larger than that of the first free magnetic layer.

3. A spin valve thin film magnetic element according to claim 1, wherein assuming that the saturation magnetization and thickness of the second free magnetic layer are $M_2$ and $t_2$, and the saturation magnetization and thickness of the first free magnetic layer are $M_1$ and $t_1$, respectively, $M_2 \cdot t_2 > M_1 \cdot t_1$ is satisfied.

4. A spin valve thin film magnetic element according to claim 1, further comprising a protecting layer made of a transition metal, which does not dissolve in the backed layer, and arranged on the side of the backed layer opposite to the side in contact with the first free magnetic layer.

5. A spin valve thin film magnetic element according to claim 1, further comprising a pair of conductive layers laminated on the pair of bias layers on two sides of the laminate, for supplying a sensing current to the nonmagnetic conductive layer.

6. A spin valve thin film magnetic element according to claim 5, wherein the pair of conductive layers are formed to extend from two sides of the laminate toward a center of one of two surfaces which define the laminate in a thickness direction, and adhere to the one surface.

7. A spin valve thin film magnetic element according to claim 1, wherein the pinned magnetic layer comprises a nonmagnetic layer, and first and second pinned magnetic layer with the nonmagnetic layer provided therebetween so that the magnetization directions of the first and second pinned magnetic layers are antiparallel to each other to bring the first and second pinned magnetic layers into a ferrimagnetic state.

8. A thin film magnetic head comprising a spin valve thin film magnetic element according to claim 1.

9. A spin valve thin film magnetic element according to claim 1, wherein the backed layer comprises any of Au, Ag and Cu.

10. A spin valve thin film magnetic element according to claim 1, wherein the protecting layer comprises any of Hf, Mo, V, Cr, Nb, Ta and W.

11. A spin valve thin film magnetic element comprising a laminate comprising an antiferromagnetic layer, a pinned magnetic layer provided in contact with the antiferromagnetic layer so that the magnetization direction is pinned by an exchange coupling magnetic field with the antiferromagnetic layer, a nonmagnetic conductive layer provided in contact with the pinned magnetic layer, a second free magnetic layer provided in contact with the nonmagnetic conductive layer, a nonmagnetic intermediate layer provided in contact with the second free magnetic layer, a first free magnetic layer provided in contact with the nonmagnetic intermediate layer and antiferromagnetically coupled with the second free magnetic layer to form a ferrimagnetic state together with the second free magnetic layer, and a backed layer provided in contact with the first free magnetic layer and having higher conductivity than the first free magnetic layer, and further comprising a mirror reflecting layer made of an insulating material and arranged on the side of the backed layer, which is opposite to the side in contact with the first free magnetic layer.

12. A spin valve thin film magnetic element according to claim 11, wherein the thickness of the second free magnetic layer provided in contact with the nonmagnetic conductive layer is larger than that of the first free magnetic layer.

13. A spin valve thin film magnetic element according to claim 11, wherein assuming that the saturation magnetization and thickness of the second free magnetic layer are $M_2$ and $t_2$, and the saturation magnetization and thickness of the first free magnetic layer are $M_1$ and $t_1$, respectively, $M_2 \cdot t_2 > M_1 \cdot t_1$ is satisfied.

14. A spin valve thin film magnetic element according to claim 11, further comprising a pair of bias layers provided adjacent to the second free magnetic layer on two sides of the laminate, for orienting the magnetization direction of the second free magnetic layer;

wherein a pair of surfaces on one of the sides of the pair of bias layers in the thickness direction are adjacent to the sides of the laminate at any hierarchy position between the two surfaces which define the second free magnetic layer in the thickness direction, and a pair of second surfaces on the other side of the pair of bias layers in the thickness direction are adjacent to the sides of the laminate at a hierarchy position at least on the nonmagnetic conductive layer side of the second free magnetic layer.

15. A spin valve thin film magnetic element according to claim 11, further comprising a pair of conductive layers laminated on the pair of bias layers on two sides of the laminate, for supplying a sensing current to the nonmagnetic conductive layer.

16. A spin valve thin film magnetic element according to claim 15, wherein the pair of conductive layers are formed to extend from two sides of the laminate toward a center of one of two surfaces which define the laminate in a thickness direction, and adhere to the one surface.

17. A spin valve thin film magnetic element according to claim 11, wherein the pinned magnetic layer comprises a nonmagnetic layer, and first and second pinned magnetic layer with the nonmagnetic layer provided therebetween so that the magnetization directions of the first and second pinned magnetic layers are antiparallel to each other to bring the first and second pinned magnetic layers into a ferrimagnetic state.

18. A thin film magnetic head comprising a spin valve thin film magnetic element according to claim 11.

19. A spin valve thin film magnetic element according to claim 11, wherein the backed layer comprises any of Au, Ag and Cu.

20. A spin valve thin film magnetic element according to claim 11, wherein the mirror reflecting layer comprises any of $\alpha$-$Fe_2O_3$, NiO, CoO, Co—Fe—O, Co—Fe—Ni—O, T-O (wherein T is any one of Ti, V, Cr, Zr, Nb, Mo, Hf, Ta and W) and L-N (wherein Li is any one of Ti, V, Cr, Zr, Nb, Mo, Hf, Ta and W).

* * * * *